(12) United States Patent
Chikenji et al.

(10) Patent No.: US 6,639,893 B1
(45) Date of Patent: Oct. 28, 2003

(54) COMMUNICATION NETWORK SYSTEM INCLUDING RING NETWORK THAT PERFORMS COMMUNICATION THROUGH MULTIPLE SWITCHING DEVICES

(75) Inventors: Takamitsu Chikenji, Hino (JP); Michiaki Eri, Hino (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/280,057

(22) Filed: Mar. 29, 1999

(30) Foreign Application Priority Data

| Mar. 30, 1998 | (JP) | 10-083968 |
| Apr. 15, 1998 | (JP) | 10-105020 |
| Apr. 23, 1998 | (JP) | 10-113490 |

(51) Int. Cl.[7] .......................... G06F 11/16; H04L 1/22
(52) U.S. Cl. .................. 370/217; 370/222; 370/223
(58) Field of Search ............................ 370/217, 218, 370/219, 220, 221, 222, 223, 224, 225, 226, 227, 228, 452, 395.1

(56) References Cited

U.S. PATENT DOCUMENTS

| 5,218,604 A | * | 6/1993 | Sosnosky | 370/223 |
| 5,379,278 A | * | 1/1995 | Safadi | 370/221 |
| 5,440,540 A | * | 8/1995 | Kremer | 370/223 |
| 5,491,686 A |   | 2/1996 | Sato | 370/223 |
| 5,870,212 A | * | 2/1999 | Nathan et al. | 359/119 |
| 5,909,175 A | * | 6/1999 | Yamasaki et al. | 340/506 |

OTHER PUBLICATIONS

Nguyen, G.D., "Multiple–ring architecture and its FDDI applications", MCOM Oct. 1996, IEEE; vol.: 1; pp: 112–114.*

Yin et al., "Reliability of FDDI's Dual Homing Network Architecture", Univversity of Maryland '94, IEEE; pp. 1382–1389.*

* cited by examiner

Primary Examiner—Hassan Kizou
Assistant Examiner—Saba Tsegaye
(74) Attorney, Agent, or Firm—Finnegan, Henderson, Farabow, Garrett & Dunner, L.L.P.

(57) ABSTRACT

Two between-ring connection node devices are placed between ring networks A and B, these are connected by between-ring transmission lines for which it is possible for each of the items that face each other to switch between current use lines and spare lines, and for each ring network, the two between-ring connection node devices are operated to switch between being a current use system or a spare system. While being able to avoid communication interruptions between ring networks due to faults of the between-ring connection node device itself, it is also possible to avoid communication interruption when line switching fails between-ring transmission lines, and thus to increase fault resistance.

45 Claims, 50 Drawing Sheets

| TRAP TRANSMISSION SOURCE DEVICE SYMBOL STATUS | SYSTEM FAULT INFORMATION RECEIVED BY TRAP | TRAP TRANSMISSION SOURCE DEVICE SYMBOL COLOR |
|---|---|---|
| major | major | RED (NO CHANGE) |
| major | minor | RED → YELLOW |
| major | normal | RED → GREEN |
| minor | major | YELLOW → RED |
| minor | minor | YELLOW (NO CHANGE) |
| minor | normal | YELLOW → GREEN |
| normal | major | GREEN → RED |
| normal | minor | GREEN → YELLOW |
| normal | normal | GREEN (NO CHANGE) |

FIG.19

HARDWARE ALARM (ABNORMAL TEMPERATURE NOTIFICATION = TemperatureAlarm)

| EVENT LOG MESSAGE |
|---|
| HARDWARE ALARM NODE DETAILED DESCRIPTION : $1 SYSTEM DATE AND TIME : $2 STATUS TYPE ALARM MONITOR POINT ID : $4 STATUS TYPE ALARM FAULT NAME : $5 STATUS TYPE ALARM FAULT STATUS (1: FAULT RELEASE NOTIFICATION 2: FAULT GENERATION NOTIFICATION) : $7 |

FIG.21(a)

PHYSICAL LAYER ALARM (LOS NOTIFICATION = LosAlarm)

| EVENT LOG MESSAGE |
|---|
| PHYSICAL LAYER ALARM NODE DETAILED DESCRIPTION : $1 SYSTEM DATE AND TIME : $2 STATUS TYPE ALARM MONITOR POINT ID : $4 STATUS TYPE ALARM FAULT NAME : $5 STATUS TYPE ALARM FAULT STATUS (1: FAULT RELEASE NOTIFICATION 2: FAULT GENERATION NOTIFICATION) : $7 INTERFACE DETAILED DESCRIPTION : $8 |

FIG.21(b)

AAL LAYER ALARM (AAL1RX LOST CELL COUNT NOTIFICATION = Aal1RxLostCellsAlarm)

| EVENT LOG MESSAGE |
|---|
| AAL LAYER ALARM NODE DETAILED DESCRIPTION : $1 SYSTEM DATE AND TIME : $2 GAUGE TYPE ALARM MONITOR POINT ID : $4 GAUGE TYPE ALARM FAULT NAME : $5 GAUGE TYPE ALARM FAULT STATUS (1: FAULT RELEASE NOTIFICATION 2: MINOR GENERATION NOTIFICATION 3: MAJOR GENERATION NOTIFICATION) : $7 INTERFACE DETAILED DESCRIPTION : $8 |

FIG.21(c)

AAL LAYER ALARM (AAL1RX ERRONEOUS DISTRIBUTION CELL COUNT NOTIFICATION = Aal1RxDstErrCellsAlarm)

EVENT LOG MESSAGE

AAL LAYER ALARM NODE DETAILED DESCRIPTION : $1 SYSTEM DATE AND TIME : $2
GAUGE TYPE ALARM MONITOR POINT ID : $4 GAUGE TYPE ALARM FAULT NAME : $5
GAUGE TYPE ALARM FAULT STATUS (1: FAULT RELEASE NOTIFICATION
2: MINOR GENERATION NOTIFICATION 3: MAJOR GENERATION NOTIFICATION) : $7

FIG.22(a)

LOOP BACK (AUTO LOOP BACK EXECUTION NOTIFICATION = LpbkAutoSetNotice)

EVENT LOG MESSAGE

LOOP BACK NODE DETAILED DESCRIPTION : $1 SYSTEM DATE AND TIME : $2
SWITCH LOOP BACK INTERFACE NUMBER : $3 SWITCH LOOP BACK EXECUTION REASON : $4

FIG.22(b)

LOOP BACK (AUTO LOOP BACK RELEASE EXECUTION NOTIFICATION = LpbkAutoRelNotice)

EVENT LOG MESSAGE

LOOP BACK NODE DETAILED DESCRIPTION : $1 SYSTEM DATE AND TIME : $2
SWITCH LOOP BACK INTERFACE NUMBER : $3

FIG.22(c)

LOOP BACK (INTERFACE LOOP BACK RELEASE NOTIFICATION = LpbkIfRelNotice)

EVENT LOG MESSAGE

LOOP BACK NODE DETAILED DESCRIPTION : $1 SYSTEM DATE AND TIME : $2
SWITCH LOOP BACK INTERFACE NUMBER : $3 LOOP BACK TYPE : $4

FIG.23(a)

CLOCK (CLOCK EXTRACTION CHANGE NOTIFICATION = ClkLinChangeNotice)

EVENT LOG MESSAGE

CLOCK NODE DETAILED DESCRIPTION : $1 SYSTEM DATE AND TIME : $2

FIG.23(b)

TEST (TEST OAM CELL RECEIVE NOTIFICATION = TestCsRcvNotice)

EVENT LOG MESSAGE

TEST NODE DETAILED DESCRIPTION : $1 SYSTEM DATE AND TIME : $2

FIG.23(c)

CONTACT POINT ALARM (CONTACT POINT ALARM NOTIFICATION = CctBoxAlarm)

EVENT LOG MESSAGE

CONTACT POINT ALARM NODE DETAILED DESCRIPTION : $1 SYSTEM DATE AND TIME : $2
CONTACT POINT BOX ALARM STATUS : $3 CONTACT POINT NUMBER INDEX : $4
CONTACT POINT ALARM NAME : $5 CONTACT POINT ALARM STATUS : $6

FIG.23(d)

WHEN (BrdBaseType.p = sd15l(4))

WHEN (BrdBaseType.p = sd15u(5))

(BrdBaseType.p = OTHER THAN THE ABOVEMENTIONED)

WHEN (BrdIfType.m = ifea(1))

WHEN (BrdIfType.m = ifeb(2))

WHEN (BrdIfType.m = if63hsd(3))

WHEN (BrdIfType.m = if4wtp(4))

FIG.30(a) WHEN (BrdIfType.m = a150ss(5))
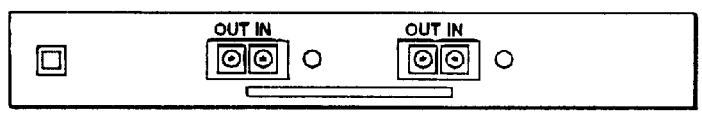
FIG.30(b) WHEN (BrdIfType.m = a150mm(6))
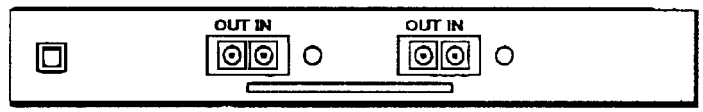
FIG.30(c) WHEN (BrdIfType.m = a150sl(7))
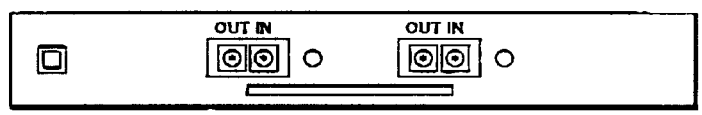
FIG.30(d) WHEN (BrdIfType.m = clk(8))
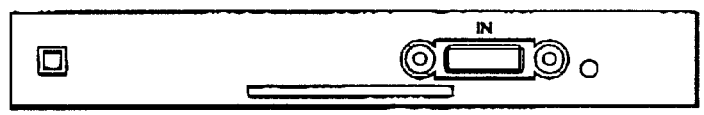
FIG.30(e) WHEN (BrdIfType.m = clk1(9))
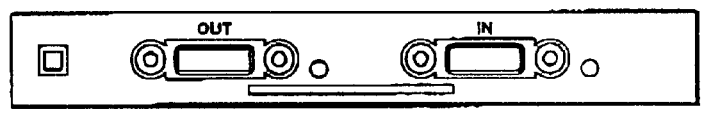
FIG.30(f) WHEN (BrdIfType.m = clk2(10))
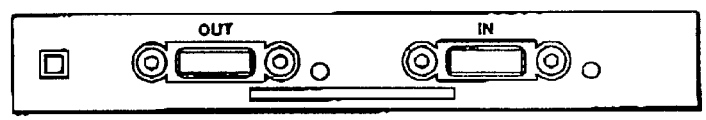
FIG.30(g) WHEN (BrdIfType.m = OTHER THAN THE ABOVEMENTIONED)
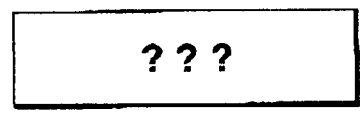
FIG.30(h)
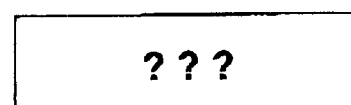

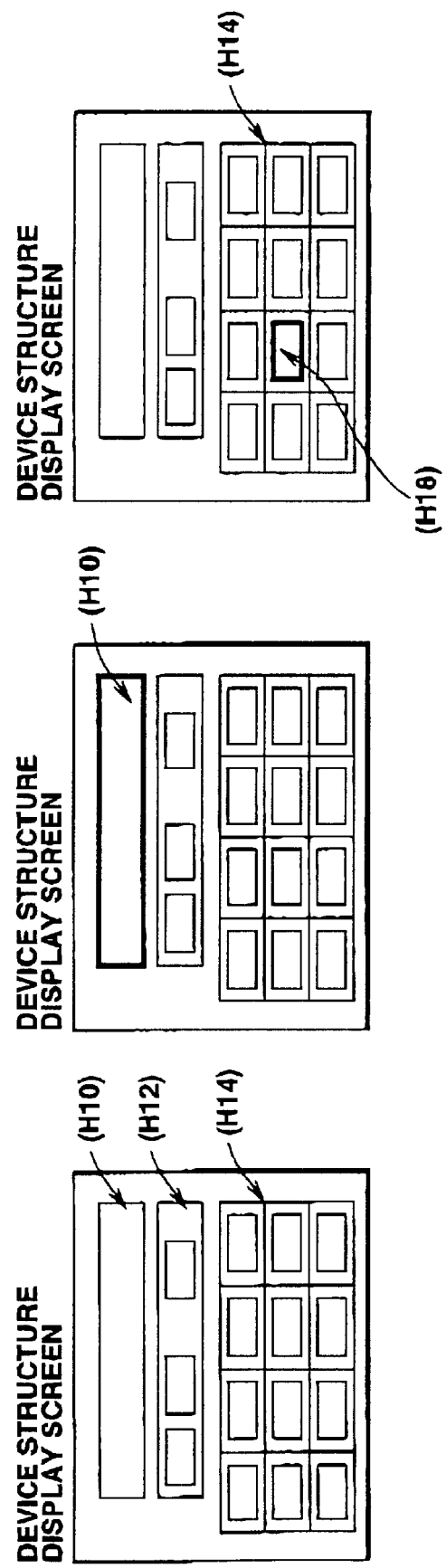

COMMUNICATION NETWORK SYSTEM INCLUDING RING NETWORK THAT PERFORMS COMMUNICATION THROUGH MULTIPLE SWITCHING DEVICES

BACKGROUND OF THE INVENTION

1. Field of the Invention

The present invention relates to a communication network system comprising a network made from a communication device such as an ATM (Asynchronous Transfer Mode) converter and a network management device that manages the communication devices in this network, and more particularly to improvements in switching control between these devices and in control of display of information relating to faults, structure, and operating status, etc. of the abovementioned communication devices for a network management device when a redundant structure of the abovementioned devices or network management devices, etc. is used to increase fault resistance of the system.

2. Description of the Related Art

For example, in the railway management system and highway management system fields, network structures are known whereby multiple communication devices are installed in a distributed manner, information from each of these communication devices is gathered into one management center, and management is performed. With this type of system, because these are systems with a highly public character since they are used for railways and highways, there is also a demand for them to be fault resistant.

FIG. 47 shows one example of a conventional system of this type that took fault resistance into consideration. This system is realized by an ATM ring system that performs communication between a ring network H made from node devices 81H, 82H, 83H, 84H, 85H, and 86H connected by ring transmission line 25H and ring network I made from node devices 81I, 82I, 83I, 84I, 85I, and 86I connected by ring transmission line 25I. Using ATM switching technology.

In FIG. 47, 70 is a network management device which manages all nodes within ring networks H and I via Ethernet 10. Also, a local terminal (in the figure, only local terminals 90H and 90I connected respectively to node devices 85H and 85I are shown) is connected to all node devices within ring networks H and I.

With a system that performs communication between ring networks, if a fault occurs in the transmission line between rings, communication between the rings is cut off, so by providing a duplex transmission line with a current use system and a spare system which can be switched, when a fault occurs in the current use transmission line, by switching to connect to the spare system transmission line, redundancy between the ring networks is achieved with a method that continues communication between rings.

With the ring network system shown in FIG. 47, 84H and 84I are between-ring connection node devices for connecting adjacent ring networks, and these are connected by duplex between-ring transmission line 35 which can be switched to either the current use system or a spare system.

For this between-ring transmission line 35, normally, communication between ring networks is performed using the current use system transmission line 351, but when a fault occurs with the current use system transmission line 351, this is detected by facing between-ring connection node devices 84H and 84I, and by switching transmission line 35 to the spare system transmission line 352 and controlling, it is possible to continue communication between the rings.

In this way, with the ring network system shown in FIG. 47, when a fault occurs in the current use system transmission line, by switching to the spare system transmission line and performing control, it is possible to continue communication between rings.

However, with this conventional system, there is the problem that when line duplex switching fails, or when a fault occurs directly with the between-ring connection node devices 84H and 84I that perform line duplex control, not only is it impossible to perform line duplex switching due to the line fault, or due to a fault of between-ring connection node device 84H and 84I, normal communication between rings is not possible.

FIG. 48 shows another example of this type of conventional system. The basic structure of the system shown in FIG. 48 is also an ATM ring network made from multiple ATM ring networks. In particular with this system, as will be described later, from the fact that the arrangement is such that control node devices are placed within the ring network to manage each node device in the network, this is called a centralized control type ATM ring network system.

With the system shown in FIG. 48, one control node device 81J is allocated within a ring network J, and this control node device 81J performs centralized control of all ring node devices 82J through 86J within the ring network J. Similarly, one control node device 81K is allocated within a ring network K, and this control node device 81K performs centralized control of ring node devices 82K through 86K.

For the ring network J and the ring network K, the node device 84K and the node device 84J (84K and 84J correspond to the between-ring connection node devices 84H and 84I of the system shown in FIG. 47) are connected by a transmission line 36.

With an ATM ring network with this kind of structure, as a measure for improving fault resistance, methods such as duplexing of transmission lines are used.

FIG. 49 shows an example of a duplex transmission line. As shown in FIG. 49(*a*), the ring network J has a duplex structure of the current use system line 251 and the spare system line 252 for the transmission line that connects the control node device 81J and the ring node devices 82 through 86.

For this ring network J, for example, when a fault occurs at the transmission line 25J between the ring node device 84J and the ring node device 85J, as shown in FIG. 49(*b*), by executing loop back for each of the ring node device 84J and the ring node device 85J (the standby system line 252 is turned back and connected to the current use system line 251), a detour is made around the location where the fault has occurred using the standby system line 252.

As described above, with a centralized control type ATM ring network system, by making duplex transmission lines, even when a fault occurs in a transmission line, the reliability is guaranteed, and even when a fault occurs at the ring node device, it is possible to minimize the effect of the fault by performing loop back with the adjacent ring node device.

However, with centralized control type ATM ring network systems, as a rule, the abovementioned loop back control is implemented under the control of the control node device, and when a fault occurs with a control node device, until the control function is restarted by replacing or repairing the control node device, since it is not possible to perform ring node device control, the ring node device does not operate, causing the problem that all communication is stopped.

However, with the ring network system (FIGS. 47 and 48) described above, a network management device 70 is installed and with this network management device, there is a function that manages the devices to be managed such as the control node devices, ring node devices, and between-ring connection node devices within each ring system.

Here, the network management device performs management of the devices to be managed by methods such as displaying self notification information from each device to be managed based on that information, or based on this display, by controlling to a specified operating state of the applicable devices to be managed by sending the control information.

When we consider this structure, it is extremely important not only to install multiple network management devices for the devices to be managed, but also to perform firm network management in order to increase the fault resistance of the system overall.

FIG. 50 shows a conventional communication network system that realizes the viewpoint discussed here.

This system has a network structure that performs management of all devices to be managed 110L, 111L, 112L, and 113L within ring network L using two network management devices 70A and 70B.

For this system, devices to be managed 110L, 111L, 112L, and 113L within ring network L have a self notification function that notifies both network management devices 70A and 70B via the ring transmission line 20L and the Ethernet 10, when a fault occurs at the concerned device or when that fault is repaired, of the information that shows that state (fault management information).

On the other hand, the network management devices 70A and 70B receive fault management self notification information from the devices to be managed 110L, 111L, 112L, and 113L, and perform management of each device by displaying the contents, etc.

In this way, with the conventional system shown in FIG. 50, devices to be managed 110L, 111L, 112L, and 113L within the ring network L perform self notification to both the network management devices 70A and 70B, which have a redundant structure.

Because of this, compared to when performing network management with a single network management device, there has to be twice as much traffic for network management. This increase in traffic for network management tends to become more marked as the network scale gets larger, so there is the problem of inhibition of original communication such as data transmission between each node device, etc. within the network L.

As shown in FIG. 51, there are also systems of this type of conventional network system with the structure shown in the figure. This system has a network structure such that one network management device 100M manages multiple ATM switching devices 112M, 113M, and 114M via duplex structure ATM switching devices 110M and 111M that have a network connecting function (hereafter referred to as network connection devices).

For this system, as a network connection device, 110M and 111M are given a redundant structure, and these are connected to the network management device 100M via the Ethernet 10. These network connection devices 110M and 111M which have a redundant structure operate with one as the current use system and the other as the spare system.

In FIG. 51, when the network connection device 110M operates as the current use system and the network connection device 111M operates as the spare system, as path information for reaching the ATM ring transmission line 20M within the ring network M, the fact that the next hop is the network connection device 110M is registered to the network management device 100M.

In this state, when switching has occurred for the systems between the redundant structure network connection devices 110M and 111M, as path information for reaching the ATM ring transmission path 20M, it is necessary to change so that the next hop network connection device is 111M.

In such a case, as a protocol for dynamically performing switching operation of path information, RIP (Routing Information Protocol) that decides the optimal path based on the hop count up to the destination (in this case, the ring transmission path 20M) is widely used.

However, for a system structure such as that shown in FIG. 51, when the abovementioned RIP is used, looking from the network management device 100M, the metrics (distance function) for reaching the ATM ring transmission path 20M by the network connection devices 110M and 111M are equivalent, so the state of the next hop (for example, the applicable network connection device 110M when the network connection device 110M has switched from the current use system to the spare system) first registered to the network management device 100M will continue to be valid for some time, so there is the problem that because the next hop change is not immediately reflected, the system switch is also not performed immediately.

However, for the various forms of systems described above, normally the network management device placed within a network obtains various types of information from each communication device subject to management (devices to be managed), and based on this obtained information, has a function that displays the results of management on a display screen.

Here, as information obtained from the device to be managed by the network management device, an example would be information related to a fault in the device to be managed. Generally, information relating to a fault in this device to be managed would be obtained by self notification from each device to be managed, and based on this self notification, the information relating to the fault of each device to be managed would be displayed. Regarding this self notification display, with the network management device, for example, there was a method of displaying as is the self notification characters notified automatically from the device to be managed, With this method, self notification characters are simply listed on the display screen, so there was a tendency for a delay in awareness by the administrator of the occurrence of a fault with a device to be managed.

As a countermeasure for this problem, conventionally, there was a method with which an icon that represents the devices to be managed was prepared, and based on self notification of fault occurrence from each device to be managed, a color that represents the occurrence of that fault would be reflected in the icon of the concerned device to be managed. With this method, each device to be managed is thought of as an icon, and the fault status could also be thought of as a change in color of the applicable icon, so compared to when displaying only the self notification characters, the time until the administrator becomes aware of a fault with a device to be managed can be shortened.

However, regarding this self notification display using this icon, conventionally, a color that represented the occurrence of a fault was reflected in the icon that represented a device to be managed, and a color representing the repair of a fault was not reflected, so significant time passed before the administrator was aware that the fault had been repaired.

Besides this, as information that the network management device obtains from the devices to be managed, there was also information related to the device to be managed structure or the operating status, etc. when this structure is a prerequisite. Regarding the screen display regarding this device to be managed structure and status, conventionally, display relating to the structure using an icon like that described above was performed, or the process ended with display of a simple diagram (such as a square, etc.) representing the substrate on which the device to be managed is mounted.

With this method, the display contents on the display screen of the network management device is completely different from the actual image of the device to be managed, so the administrator could not get an accurate understanding of the structure or status of a device to be managed, which was a problem in terms of the risk of inviting confusion about the maintenance and management tasks.

SUMMARY OF THE INVENTION

A first object of the present invention is to provide a communication network system that, for a system for which ring networks are connected to each other by facing between-ring connection node devices, and for which it is possible to switch between duplex lines with one being a current use system and the other a spare system provided between these between-ring connection node devices (FIG. 47), can maintain normal communication between rings when the line duplex switching fails or when a fault occurs with the between-ring connection node device itself that performs control of the line duplexing, and which further improves fault resistance.

A second object of the present invention is to provide a communication network system that, for a centralized control type system that centrally manages all node devices within a network by control node devices placed within the ring network (FIG. 48), can maintain communication while controlling the ring node devices even when a fault has occurred with the control node device.

A third object of the present invention is to provide a communication network system that, for a system for which network management devices have been made redundant and installed for the network (FIG. 50), prevents increased traffic for network management used during self notification from each node device within the network to the abovementioned network management devices, and even if the scale of the network increases, can smoothly execute the original communication within the network (communication other than that for the abovementioned network management).

A fourth object of the present invention is to provide a communication network system that, for a system that has redundant network connection devices placed between a network management device and a network, can immediately select the optimal path for reaching a transmission path within a network via one or the other when a switch is made between systems between the abovementioned redundant network connection devices.

A fifth object of the present invention is to provide a communication network system that, for a system that includes a network management device that displays information gathered from each device to be managed within a network and manages each of these devices to be managed, has a network management device that can accurately grasp the occurrence of or repair of a fault in each device to be managed within a network based on the contents of the abovementioned display, and can realize fast handling of maintenance tasks.

A sixth object of the present invention is to provide a communication network system that, for a system that includes a network management device that displays information gathered from each device to be managed within a network and manages each of these devices to be managed, has a network management device that can accurately recognize as much as possible the structure and status of the devices to be managed based on the abovementioned display contents, and can perform maintenance and management tasks even more smoothly.

To achieve the abovementioned first object, the invention is characterized by A multiple switching devices being connected on a ring transmission line, this including a first and second ring network that perform communication via the multiple switching devices, the abovementioned first and second ring networks comprising first and second between-ring connection devices connected by a between-ring transmission line that includes a between-ring connection device facing each other within the other party ring network and a duplex line, the abovementioned duplex line having one be a current use system and the other a spare system, and the connection devices performing line switching control with the other party ring network, and a control device that performs switching control for operating one of the abovementioned between-ring connection devices as a current use system, and the other as a spare system, and the invention performing current use communication via the between-ring transmission line that connects the between-ring connection devices that operate as the abovementioned current use system between the abovementioned first and second ring networks, and that has in standby a spare between-ring transmission line that connects the between-ring connection devices that operate as the abovementioned spare system.

The invention is characterized by comprising a means for communication between rings that mutually communicates first control information between facing between-ring connection devices, a means of communication within a ring that mutually communicates second control information between the abovementioned between-ring connection devices and the abovementioned control devices, and by the abovementioned between-ring connection device performing the abovementioned line switching control through the abovementioned between-ring communication means, and the abovementioned control device performing the abovementioned system switching control through the abovementioned ring internal communication means.

The control device comprises a survival confirmation means that confirms survival of the between-ring connection device through the abovementioned ring internal communication means between the current use system and the abovementioned between-ring connection device, and when it is not possible to confirm survival of the between ring connection device, sends instructions to shift to the spare system to the abovementioned between-ring connection device of the current use system and sends instructions to shift to the current use system to the abovementioned between ring connection device of the spare system through the abovementioned ring internal communication means.

The invention characterized by between-ring connection device, when operating as a current use system, comprises an operation recognition means that recognizes the operating status of the facing between-ring connection device during operation of a between-ring connection device as the current use system through the abovementioned between-ring communication means, and an error notification means that notifies the abovementioned control device through the abovementioned ring internal communication means that an error has occurred at the facing between-ring connection device when such an error occurs, and the abovementioned control device sending to the spare system between-ring connection device instructions to shift to the current use system based on notification from the abovementioned notification from the abovementioned error notification means.

The invention characterized by the between-ring connection device, when operating as a current use system, comprises a monitoring means that monitors the abovementioned line switching control performed between facing between-ring connection devices through the abovementioned between-ring communication means, and a switching failure notification means that notifies the abovementioned control device that the abovementioned line switching control has failed through the abovementioned ring internal communication means when such a failure has occurred, and the abovementioned control device sending instructions to shift to the current use system based on the notification of the abovementioned switching failure notification means to the spare system between-ring connection device through the abovementioned ring internal communication means.

The invention characterized by the between-ring connection device, comprises a current use system shift instruction means that, when starting operation as the abovementioned current use system, sends instructions to shift to the current use system through the abovementioned between-ring communication means to the facing between-ring connection device, a spare system shift instruction means that, when starting operation as the abovementioned spare system, sends instructions to shift to the spare system through the abovementioned between-ring communication means to the facing between-ring connection device, and a control means that starts the switching operation from the spare system to the current use system or from the current use system to the spare system by receiving from the abovementioned control device or the abovementioned facing between-ring connection device either the abovementioned current use system instructions or the abovementioned spare system instructions.

The ring internal communication means sends and receives the abovementioned first control information using user cells which have information on the open paths in the ring (VPI/VCI values) on a virtual path in the abovementioned ring transmission path, and includes in the abovementioned first control information at least the information including requests to shift to either the current use system or the spare system to the facing between-ring connection device, the current operating status of the concerned between-ring connection device, and the time stamp that is updated with each communication.

The between-ring communication means sends and receives the abovementioned second control information using user cells which have information on the open paths between rings (VPI/VCI values) on a virtual path in the abovementioned between-ring transmission path, and includes in the abovementioned second control information at least the information including requests from the abovementioned control device to shift to either the current use system or the spare system to the abovementioned between-ring connection device, and information on facing between-ring connection device errors from the abovementioned between-ring connection device to the abovementioned control device.

The invention characterized by the control device comprises a priority level maintenance means that maintains the system switch priority level relating to the abovementioned system switching control, a priority switching control means that performs the abovementioned system switching control when there is a system switching request to the between-ring connection device within the concerned ring network, there is also a system switching request in the control device in the other part ring network, and the system switching priority level of the concerned device is higher than the system switching priority level of the control device in the abovementioned other party ring network.

The switching device, the first and second between-ring connection devices, and the control devices are ATM switching equipment that perform asynchronous transfer mode (ATM) switching processing.

By installing two between-ring connection node devices each in the first and second ring networks, and installing a control device that performs switching operation of these two between-ring connection node devices as a current use system or a spare system, two sets of between-ring communication means that can maintain communication by switching to a spare line when the current use line is not passable are provided between the first and second ring network, so, for example, when the between-ring transmission line between between-ring connection node devices that face each other and operate as the current use system can not be passed due to some kind of fault, the between-ring connection node devices that face each other and are on standby as the spare system start up as the current use system, and communication is maintained by using the between-ring transmission line between both of these node devices.

Therefore, with the first invention, while it is possible to avoid interruption of communication between ring networks due to a fault of the between-ring connection node device itself, it is also possible to avoid communication interrupt when there is a failure of switching the duplex lines in the between-ring transmission line of the between-ring connection node devices operating as the current use system, so it is always possible to guarantee normal communication between ring networks.

To achieve the abovementioned second object, the invention is characterized by connecting multiple switching devices on a ring transmission line, and having a ring network that performs communication via those multiple switching devices, installing on the abovementioned ring transmission line first and second control devices that control the abovementioned multiple switching devices, the abovementioned first control device operating as a current use system control device that actually controls the abovementioned multiple switching devices, the abovementioned second control device monitoring the abovementioned first control device, and when a fault occurs with that first control device, operating as the standby system control device that performs control of the abovementioned multiple switching devices in place of the first control device.

The second control device performs polling for the abovementioned first control device at specified intervals, and based on whether there is a response from the abovementioned first control device for the polling, monitors whether or not there is a fault in that first control device.

The first control device sends updated management information to the abovementioned second control device for each update of the management information for controlling the abovementioned multiple switching devices, and the abovementioned second control device keeping as the latest management information the received management information when the abovementioned management information is received.

The second control device starts control of the abovementioned multiple switching devices in place of the abovementioned first control device and also establishes a virtual channel connection for those multiple switching devices.

The second control device establishes the abovementioned virtual channel connection for the abovementioned multiple switching devices and at the same time notifies those multiple switching devices that the control device has been switched.

The first control device and second control device are placed adjacent to each other, and the abovementioned second control device starts control of the abovementioned multiple switching devices in place of the abovementioned first control device, while loop back of the abovementioned ring transmission line is performed on the opposite side of the abovementioned first control device, and when the adjacent device is the abovementioned first control device when the abovementioned notification is received by the abovementioned switching device from the abovementioned second control device, loop back of the abovementioned ring transmission line is performed on the opposite side of this first adjacent device.

The first control device and second control device are placed with at least one switching device between them, and when the adjacent device is the abovementioned first control device when the abovementioned notification is received by the abovementioned switching device from the abovementioned second control device, loop back of the abovementioned ring transmission line is performed on the opposite side of this first adjacent device.

The switching devices, the first control device, and the second control device are ATM switching equipment that perform asynchronous transfer mode (ATM) switching processing.

The first and second control devices are made redundant and provided on a ring network to control this ring network, and during normal operation, the first control device operates as the current use system and the second control device operates as the standby system, and survival confirmation for the first control device and control information inheritance is performed from the second control device, and when survival is not confirmed for the first control device, the second control device starts operating as the current use system, while at the same time, the system is structured so that the first control device for which survival was not confirmed is cut off from the ring network, so not only when a fault occurs on the transmission line, but also when a fault occurs with the control device, it is possible to communicate on the network, which is an improvement in fault resistance. There is also the advantage that it is not necessary to stop the network when performing maintenance and switching of control devices.

To achieve the abovementioned third object, the invention is characterized by comprising multiple switching devices connected on a transmission line and being composed from a network that performs communication via these multiple switching devices and a first management device and a second management device that are connected to the abovementioned network via one of the abovementioned switching devices, each of which manages all switching devices within this network, the abovementioned first and second management devices comprising a self notification destination switching instruction means that issues self notification destination switching instructions to the abovementioned switching devices saying to switch the notification destination of the self notification, and the abovementioned switching devices comprising a self notification means that performs self notification of the concerned device operating status only to the management device instructed as the self notification destination of the abovementioned first and second management devices, and a self notification destination switching means that switches the self notification destination according to the abovementioned self notification destination switching instructions issued from the abovementioned first or second management device.

The invention is characterized by the first and second management devices comprising a control means that operates the concerned devices as a current use system or a standby system, a fault monitoring means that monitors whether there is a fault on another management device operating as the current use system during operation as the spare use system, and when starting operation as the current use system due to occurrence of a fault with the abovementioned other management device, issuing to all of the abovementioned switching devices self notification destination switching instructions saying to switch the abovementioned self notification destination to the concerned device.

The first and second management devices comprises a means of setting attribute information that indicates when operating as the current use system, and when operating as the current use system, also monitor whether there is a fault on the other management device operating as the current use system as well as the setting status of the abovementioned attribute information, and issue the abovementioned self notification destination switching instructions only when an error occurs in the concerned other management device and when the abovementioned attribute information is set.

The first and second management devices comprise an input means that inputs identification information for the abovementioned switching devices, and when the abovementioned identification information is input, issues self notification destination switching instructions saying to switch the abovementioned self notification destination to the concerned device only to the switching device which has this identification information.

The switching devices comprise an end status monitoring means that monitors whether the abovementioned self notification destination switching ended normally or not, and at least when an error occurs, send to the management device that was the source of the issue of the abovementioned self notification destination switching instructions an error end response that includes the reason for this error.

The first and second management devices comprise an error end reporting means that reports when the abovementioned error end response is received.

The error end notification means is a display control means that displays a screen that displays the name of the switching device for which the error occurred and the reason for the error.

The display control means comprises a function that displays re-execution instruction information for giving instructions to re-execute the self notification switching instructions on the abovementioned display screen, and the abovementioned self notification destination switching instruction means re-issuing self notification destination switching instructions to the switching device corresponding to the name of the switching device displayed on the abovementioned display screen by the abovementioned re-execution instruction information being selected on the abovementioned display screen.

The switching device which is the device to be managed switches the self notification destination and performs self notification according to self notification destination switching instructions from the network management device, so as a result of the self notification destination switching device always is restricted to one network management device, even when the network management device has a redundant structure, it is possible to avoid using extra traffic for network management, and by allocating this part of traffic to the original communication purpose, it is possible to realize more efficient network operation.

To achieve the abovementioned fourth object, the invention is characterized by having multiple switching devices connected on a transmission line, and being composed from a network that performs communication via these multiple switching device, a management device that manages all the switching devices within the aforementioned network, and a first and second network connection device that that is placed on the abovementioned transmission line and that has a function for connecting each of the abovementioned management devices to the abovementioned network, the abovementioned first and second network connection devices comprising a path information notification means that notifies path information for reaching the abovementioned transmission line via the concerned device on the abovementioned management device, and a path information variable setting means that can make variable settings that manages by weighting the abovementioned path information while also making variable settings for the abovementioned weighting, the abovementioned management device comprising a path selection means that selects a path via the path information notification source that has the smallest weight, having referred to the abovementioned path information weighting notified from the abovementioned first and second network connection devices.

The first and second network connection devices comprise a control means that operates the concerned device as the spare system when the other is the current use system, and when the other is the spare use system, switches the concerned device to the current use system and operates it, where the abovementioned path information variable setting means makes a variable setting of the abovementioned path information weighting during the abovementioned system switching.

The first and second network connection devices comprise a control means that operates the concerned device as the spare system when the other is the current use system, and when the other is the spare use system, switches the concerned device to the current use system and operates it.

The first and second network connection devices, when the concerned device is operating as the current use system, notify path information with a hop count of N, and when the concerned device is operating as the spare system, notify path information with a hop count of N+1, while on the other hand when the concerned device is switched from the current use system to the spare use system, notify path information with the hop count changed from N to N+1, and when the concerned device is switched from the spare system to the current use system, notify path information with the hop count changed from N+1 to N−1.

The management device managing receives path information for each of the abovementioned first and second network connection devices, and when new path information is notified, updates the old information with the contents of the newly notified information.

The first and second network connection devices execute notification of the abovementioned path information regularly at timed intervals.

The first and second network connection devices, after notifying path information for which the hop count has been changed from N+1 to N−1 along with switching of the concerned device from the spare system to the current use system, after a specified time has elapsed, notify path information for which the hop count has been changed from N−1 to N.

Path information notified from the redundant structure first and second network connection devices to the network management devices for selecting a path is weighted, and when there is a switching or the like of the current use system and spare use system between the first and second network connection devices, the system is set to variably control the abovementioned weighting on each network connection device and notify the network management device, so it is possible to immediately reflect the appropriate path information between the first and second network connection devices along with the abovementioned system switching, etc. for the path selection control function of the network management device, and this makes it possible to immediately select the path with the minimum cost for reaching the ring transmission line for the network management device.

To achieve the abovementioned fifth and sixth objects, the invention is characterized by being composed of a network that connects multiple switching devices on a transmission line, and performs communication via these multiple switching devices, and a management device that manages issues related to special management items of all switching devices within the network, these being connected to the abovementioned network, the abovementioned switching device comprising a means of processing management to be done that performs substitute management of management information relating to the abovementioned special management items of the concerned device while also transmitting the abovementioned management information using a specified protocol to the abovementioned management device, the abovementioned management device comprising a management processing means that manages the abovementioned management information obtained by a specified protocol that is substitute managed by the abovementioned means for processing management to be done, and a display processing means that performs display processing for the display means based on the abovementioned management information managed by the abovementioned management processing means.

The means of processing management is done holding fault management information relating to faults of the concerned device as the abovementioned management information, and when a fault occurs or is repaired for the concerned device, makes self notification to the abovementioned management device the abovementioned fault management information relating to the fault occurrence or repair.

The management processing means obtains fault management information self notified from the abovementioned switching device and correlates this fault management information with a device icon representing the switching device which was the source of sending the self notification and managing this, and the abovementioned display processing means, based on the abovementioned fault management information managed by the abovementioned management processing means, displays the abovementioned device icon that corresponds to the switching device that was the source of sending the self notification in a color that indicates that the concerned fault either occurred or was repaired.

The means for processing management is done holding structure and status management information relates to the structure of the concerned device and the status of the structure as the abovementioned management information, and transmits the abovementioned structure/status management information to the abovementioned management device according to a fetch request from the abovementioned management device.

The management processing means, by issuing the abovementioned fetch request to the abovementioned device to be managed, obtains the abovementioned structure/status management information from the abovementioned means for processing management to be done, and the abovementioned display processing means, based on the obtained abovementioned structure/status management information, draws on the abovementioned display means an actual device image of the same actual structure and status of the concerned switching device with the structure and status of the switching device that was the source of the fetching.

The management control means regularly fetches the abovementioned structure/status management information, and when there is a change in this fetched abovementioned structure/status management information, updates already fetched structure and status management information with those contents, and the abovementioned display processing means, based on the updated abovementioned structure/status management information, updates and displays the image in the display of the abovementioned display means.

The structure/status management information includes at least the interface slot structure, the structure and operating status of the internal substrate connected to the interface slot, the power supply status, and alarm occurrence status for the abovementioned switching device.

The means of processing management to be done holds as the abovementioned management information fault management information relating to faults in the concerned device and structure/status management information relating to the structure of the concerned device and status of the structure, and when a fault occurs or is repaired for the concerned device, self notifies the abovementioned fault management information relating to the occurrence or repair of a fault to the abovementioned management device while also transmitting the abovementioned structure/status management information to the abovementioned management device according to a fetch request from the abovementioned management device.

The invention characterized by the management processing means fetching the abovementioned fault management information with self notification from the abovementioned switching device, while also correlating and managing the abovementioned fetched fault management information with a device icon corresponding to all switching devices subject to management, and the abovementioned display processing means, based on the abovementioned management means management results, displaying the device icons that correspond to all switching devices in a form for which the connection structure of the concerned switching devices within the abovementioned network is identifiable, and performing display processing on the display screen so that each of the abovementioned device icons is shown in a color that reflects fault occurrence, fault repair, or normal status for the switching device corresponding to that icon.

The management device comprises a first selection means that selects by a first operation the abovementioned device icon displayed on the abovementioned display screen, and the abovementioned display processing means, when the device icon is selected by the abovementioned first operation, detecting fault management information corresponding to the selected device icon, and displaying the contents of that fault management information as character information.

The management device comprises a second selection means that selects by a second operation the abovementioned device icon displayed on the abovementioned display screen, the abovementioned management processing means, when the device icon is selected by the abovementioned second operation, detecting fault management information corresponding to the selected device icon, obtaining the abovementioned structure/status management information from the abovementioned means for processing management to be done by issuing the abovementioned fetch request to the applicable switching device, and the abovementioned display processing means, based on the fetched abovementioned structure/status management information, drawing to the abovementioned display means an image of the actual device that is the same as the actual structure and status of the applicable switching device for the structure and status of the switching device of the source of fetching.

The management device comprises a third selection means that selects the applicable structural element on the display screen of the abovementioned actual device image, and the abovementioned display processing means, when the abovementioned structural element is selected by the abovementioned third selection means, detecting information corresponding to the abovementioned structural element of the abovementioned structure/status information, and based on this information displaying a detailed structural image of the concerned structural element.

The management device comprises an operation instruction input means that inputs specified operating instructions on the display screen of the abovementioned detailed structural image, and the abovementioned management processing means, according to the operating instructions input by the abovementioned operation instruction input means, sending control signals for controlling the abovementioned structural element to the means for processing management to be done of the applicable switching device.

The means of processing management to be done, by receiving the abovementioned control signals, executes a specified control according to the abovementioned operating instructions on the abovementioned structural element.

The specified control may be a control to start or stop operation of the abovementioned structural element.

For a network management device, a switching device which is a device to be managed is made into an icon and displayed on a display screen, while at the same time based on self notification from the switching device, the system is made to reflect a color corresponding to occurrence or repair of a fault on the concerned switching device in the icon of the switching device that is the source of the self notification, so the administrator can of course recognize the occurrence of faults on the device to be switched, but also recognize repair of faults when appropriate from the contents of the display on the abovementioned display screen, making it possible to manage the network efficiently.

Also, with this invention, for the network management device, information relating to the structure of or status for which the structure is prerequisite of the switching device that is the device to be managed is fetched from the switching device, and based on this fetched information, the system is set to display on a display screen an image of the actual device as is of the structure and status of the switching device that is the source of fetching, so the administrator, from the contents displayed on the abovementioned display screen, can precisely recognize with the same accuracy as when the structure and status of the switching device becomes an actual device, and can prevent confusion about maintenance management tasks.

Furthermore, with this invention, for a network management device, switching device structure information and status information is fetched regularly from the switching device, and the system is set to reflect changes on the abovementioned display screen when there are changes from previously fetched contents, so the administrator, by viewing these display contents, can immediately understand changes in structure and status of the switching device.

BRIEF DESCRIPTION OF THE DRAWINGS

FIG. 19 is a chart showing the relationship of the device symbol status for a device symbol color operation and the received system fault status;

FIGS. 21(a) to 21(c) show an example of settings for part of the information subject to display for obtaining the display screen shown in FIG. 20;

FIGS. 22(a) to 22(c) show an example of settings for other information subject to display for obtaining the display screen shown in FIG. 20;

FIGS. 23(a) to 23(d) show an example of settings of yet another information subject to display for obtaining the display screen shown in FIG. 20;

FIGS. 30(a) to 30(h) show a display image of other types of interface substrate;

FIGS. 32(a) to 32(c) show a drawing area selection operation image on a display screen for displaying the display screens shown in FIG. 24 and FIGS. 26 through 31;

DESCRIPTION OF THE PREFERRED EMBODIMENTS

Figure 1:
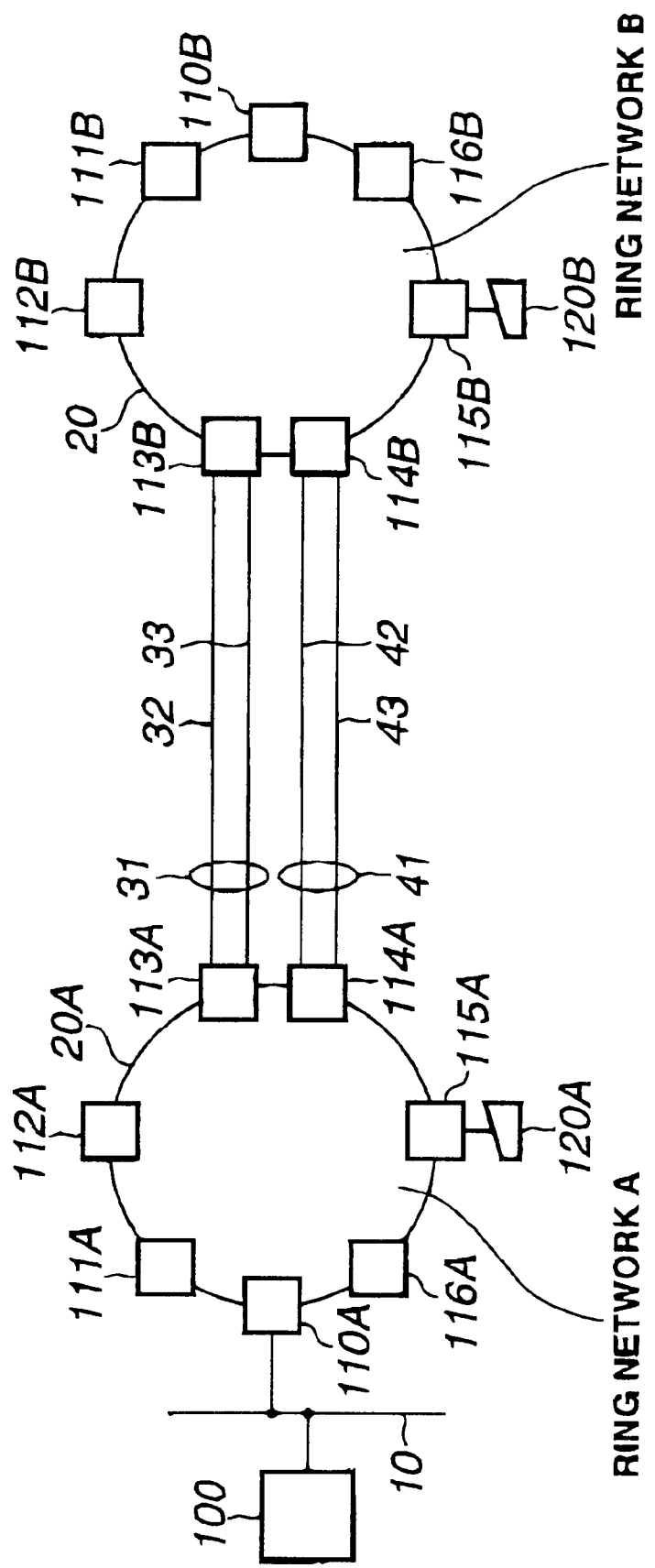
FIG. 1 is an overall structural diagram of an ATM network system according to the first invention.

FIG. 1 shows the overall structure of an ATM network system according to the first invention. In FIG. 1, one control node device 110A, two between-ring connection node devices 113A and 114A, and four ring node devices 111A, 112A, 115A, and 116A are installed in ring network A, and each of these node devices are connected in a ring shape by a ring transmission line 20A.

Similarly, one control node device 110B, two between-ring connection node devices 113B and 114B, and four ring node devices 111B, 112B, 115B, and 116B are installed in ring network B, and each of these node devices are connected in a ring shape by a ring transmission line 20B.

In each of the abovementioned node devices that construct the ring networks A and B, it is possible to house one or multiple local terminals, but specifically in FIG. 1, only a local terminal 120A housed in the ring node device 115A and a local terminal 120B housed in the ring node device 115B are shown.

Between the ring network A and the ring network B, the between-ring connection node device 113A and facing between-ring connection device 113B are connected by a between-ring transmission line 31. Similarly, the between-ring connection node device 114A and facing between-ring connection device 114B are connected by a between-ring transmission line 41. Here, the between-ring transmission line 31 is composed from two communication paths 32 and 33 that can be use as either the current use system or the spare system, and in the same way, the between-ring transmission line 41 is also composed from two communication paths 42 and 43.

Furthermore, with this system, a control node device 110A for the ring network A is connected to a network management device 100 via an Ethernet 10.

As shown in FIG. 1, for this system with its overall structure, ATM switching equipment is used as the control node devices 110A, 110B, the ring node devices 111A, 112A, 115A, 116A, 111B, 112B, 115B, 116B, and the between-ring connection node devices 113A, 114A, 113B, and 114B.

The ATM switching equipment is realized by a VP (Virtual Path) and VC (Virtual Channel) two-level system that is connected to an ATM transmission line, and has a function that performs switching processing of fixed length cells (ATM cells) fetched from an input port to an output port according to a VPI (Virtual Path Identifier) and VCI (Virtual Channel Identifier) contained within this ATM cell.

Figures 2A, 2B:
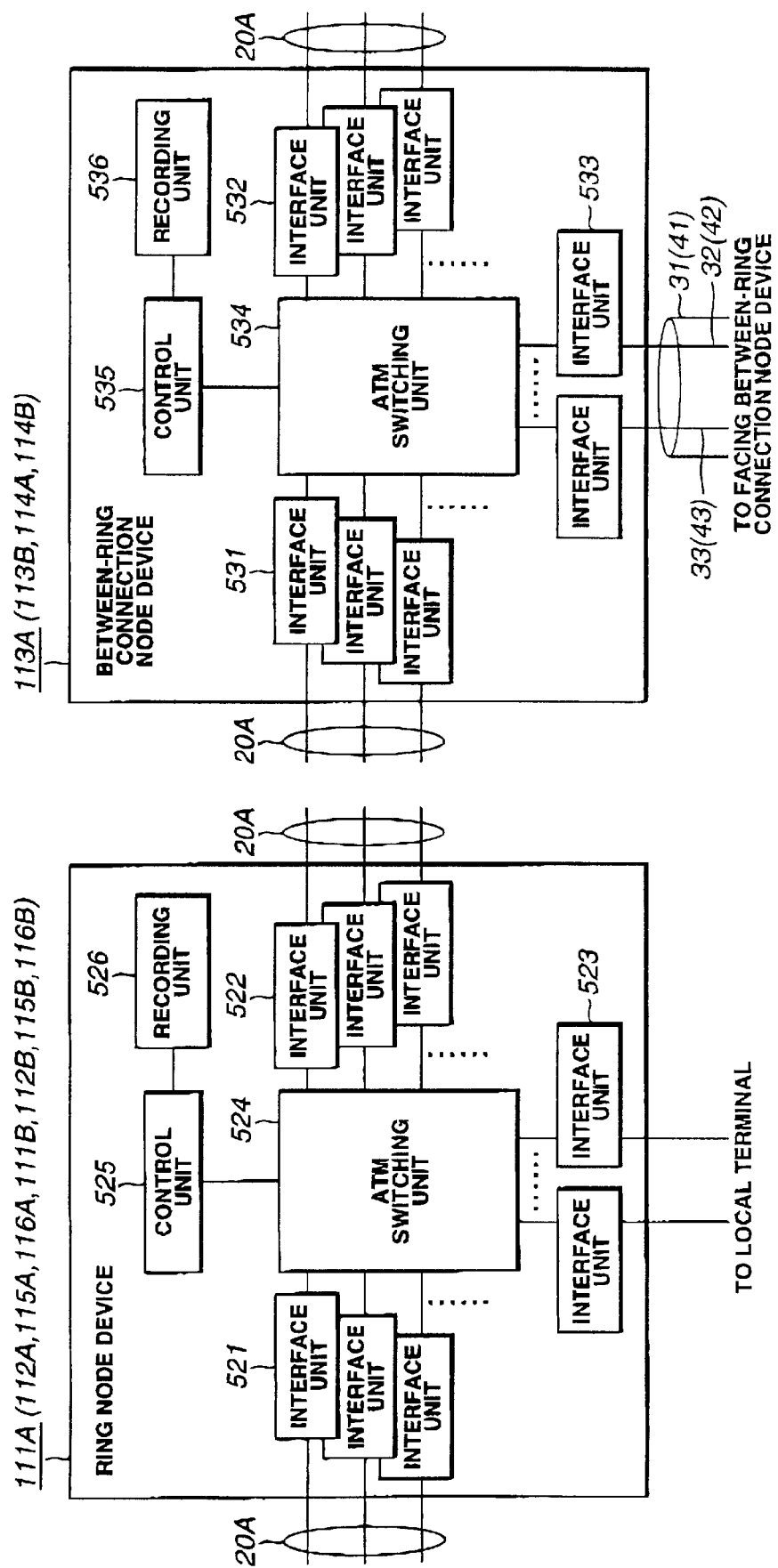
FIGS. 2(a) and 2(b) are block diagrams showing the structure of a ring node device and between-ring connection node device according to the first invention.

The ring node device A (same for 112A, 115A, 116A, 111B, 112B, 115B, and 116B as well) performs data interrupt between adjacent node devices and between local terminals using the abovementioned switching processing function, and, for example, has a structure like that shown in FIG. 2(a).

In FIG. 2(a), an interface unit 521 and 522 perform control relating to sending and receiving of data (ATM cells) between each virtual path on the ring transmission line 20A which is an ATM transmission line, and an interface unit 523 performs control relating to sending and receiving of data between low speed lines housed within the local terminal 120.

An ATM switching unit 524 performs a cell switching operation that sends cells input from the interface unit 521, interface unit 522, or interface unit 523 via the output port that corresponds to the input port of that cell to the interface unit 521, interface unit 522, or interface unit 523.

Switching tables on which are recorded cell input ports and output ports correlated to VPI and VCI are housed within a recording unit 526, and a control unit 525 performs control of the abovementioned switching operation for an ATM switching unit 524 according to these switching tables.

The between-ring connection node devices 113A and 113B (same with 114A and 114B as well), besides performing data interrupt between adjacent node devices and between local terminals, also perform data interrupt between facing between-ring connection node devices using the abovementioned switching processing function, and for example, have a structure such as that shown in FIG. 2(*b*).

In FIG. 2(*b*), the basic functions of the interface units 531 and 532, the ATM switching unit 534, the control unit 535, and the recording unit 536 are the same as those of the corresponding units of the ring node device 11A in FIG. 2(*a*).

However, with these between-ring connection node devices 113A and 113B (114A and 114B), the interface unit 533 does not perform control relating to sending and receiving of data between low speed lines housed in the local terminal 120, but rather performs control relating to the sending and receiving of data between communication paths 32 and 33 of the between-ring transmission path 31 (communication paths 42 and 43 of the between-ring transmission path 41) realized by an ATM transmission line. Regarding this structure, the control unit 535 further comprises a function for switching control between the abovementioned communication paths 32 and 33 (communication paths 42 and 43) as current use and spare transmission lines.

Specifically, for this system (FIG. 1), the between-ring connection node devices 113A and 113B have the responsibility of controlling switching between the duplexed communication paths 32 and 33 within the between-ring transmission path 31 as the current use system and the spare system, and the between-ring connection node devices 114A and 114B have the responsibility of controlling switching between the duplexed communication paths 42 and 43 within the between-ring transmission path 41 extended between rings as the current use system and the spare system.

Figure 3:
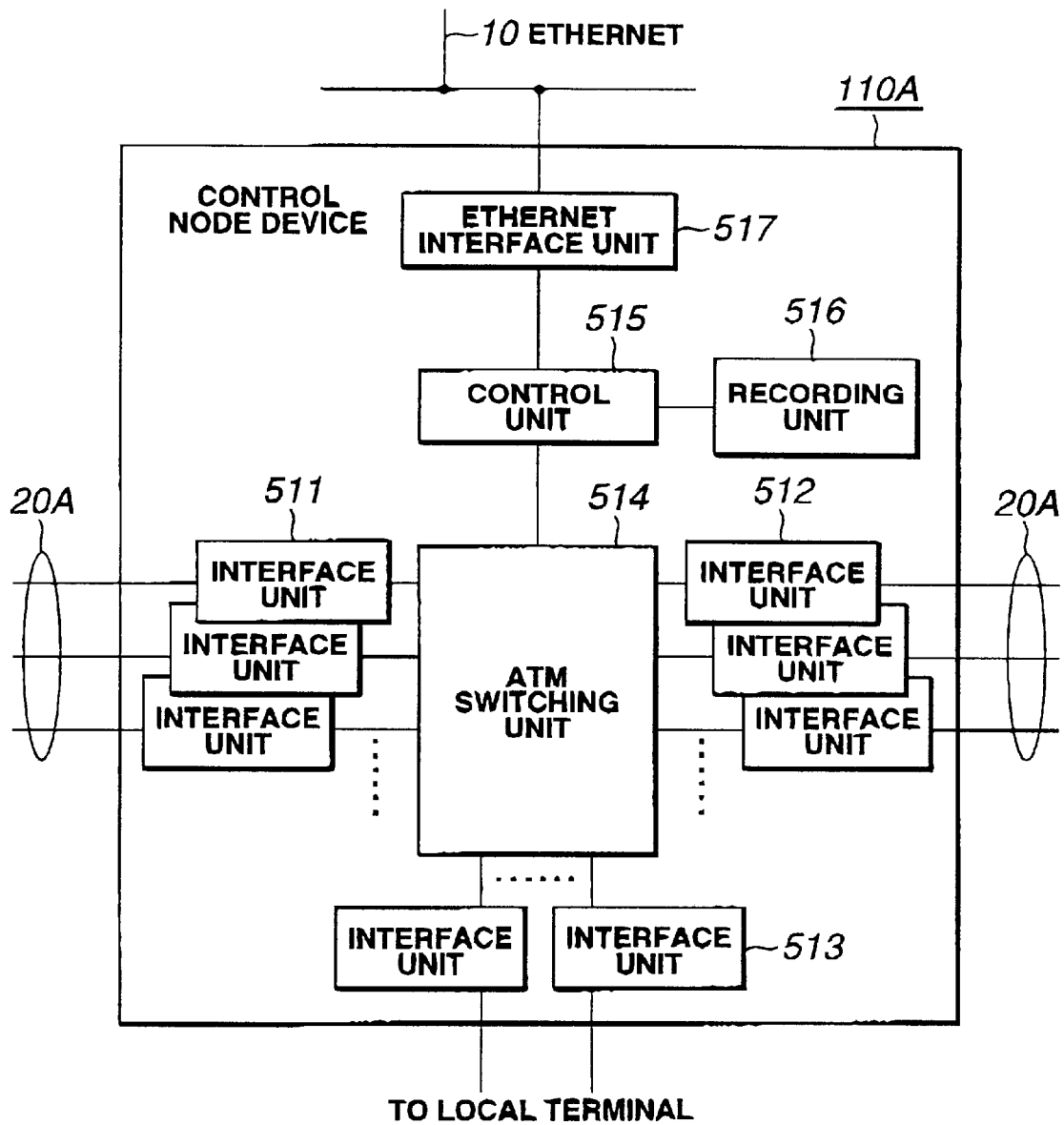
FIG. 3 is a block diagram showing the structure of a control node device according to the first invention.

The control node device 110A (same for 110B as well), besides performing data interrupt between adjacent node devices and between local terminals, also performs interrupt of data used for maintenance management between the network management device 100 via the Ethernet 10 using the abovementioned switching processing function, and has, for example, a structure as shown in FIG. 3.

In this FIG. 3, the basic functions of the interface units 511, 512, and 513, the ATM switching unit 514, the control unit 515, and the recording unit 516 are the same as the corresponding units of the ring node device 111A in FIG. 2(*a*).

Besides this, the control node device 110A (same for 110B as well) comprises an Ethernet interface unit 517 for connecting to the Ethernet 10. Also, the control unit 515 of this control node device 110A (110B) is further provided with a function for switching control between the two between-ring connection node devices 113A and 114A (113B and 114B) within the concerned network as the current use system and the spare system.

Specifically, for this system (FIG. 1), the control node device 110A has the responsibility of controlling the operation of the two between-ring connection node devices 113A and 114A provided on the ring transmission line 20A as the current use system and the spare system, and the control node device 110B has the responsibility of controlling the operation of the two between-ring connection node devices 113B and 114B provided on the ring transmission line 20B as the current use system and the spare system.

Also for this system, the network management device 100 gathers management information related to faults, etc. of all node devices within the ring networks A and B via the control node device 110A, and based on this management information performs management relating to monitoring, maintenance, etc. operations of all of these node devices.

Figure 4:
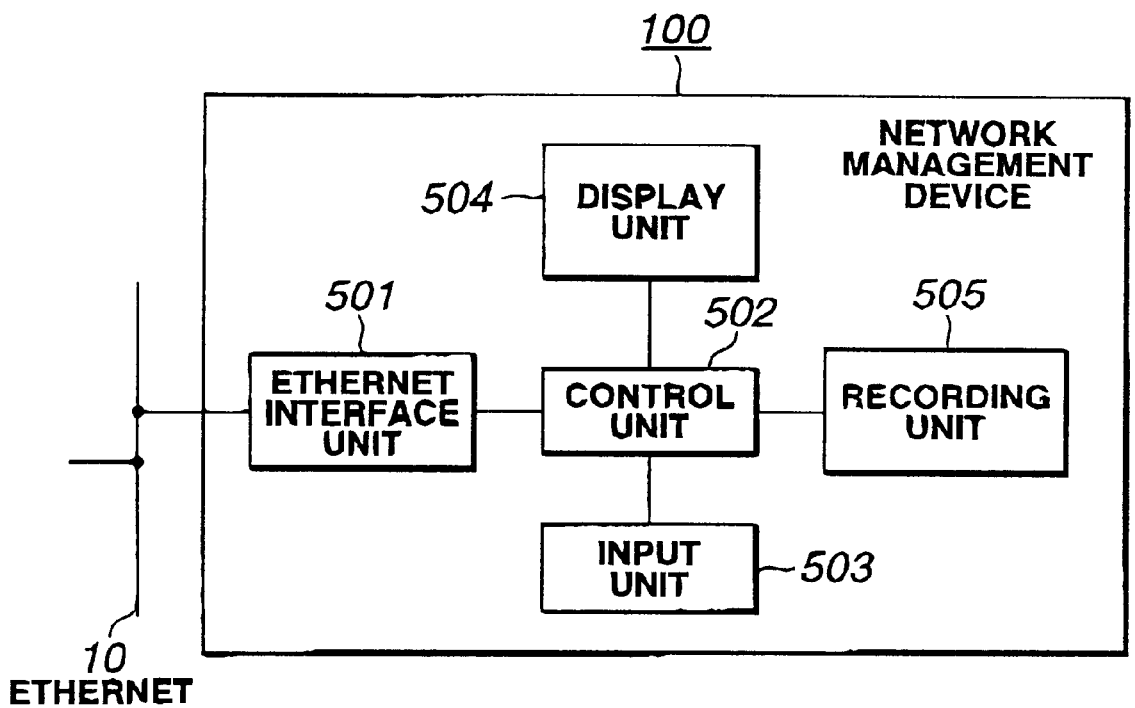
FIG. 4 is a block diagram showing the structure of a network management device according to the first invention.

FIG. 4 is a block diagram showing the structure of the network management device 100 of this system, and comprises an Ethernet interface unit 501, a control unit 502, an input unit 503, a display unit 504, and a recording unit 505.

With this network management device 100, by performing communication with the control node device 110A via the Ethernet 10, while gathering management information that shows the operating status, etc. of each node device within the ring networks A and B and displaying this on the display unit 504, based on the fault, etc. status of each node device grasped from the contents of the display, it issues the necessary control data, and controls operation of each node device.

Also, though not shown specifically in FIG. 1, the same kind of network management device is connected to the control node device 110B of the ring network B as well, and it is possible to have a structure whereby management of each node device is performed in units of each ring network.

In this way, with the system according to the first invention, by providing two between-ring connection node devices each (having a function for switching lines between the current use line and spare line between facing between-ring connection node devices) for each ring network A and B, and a control node device that operates to switch these two between-ring connection node devices as the current use system or the spare system, the structure is characterized by being provided with two sets of between-ring communication means (use divided between a current use system and spare system) that can maintain communication between the ring networks A and B by switching to the spare line when communication is not possible with the current use line.

With this structure, for example, even if communication stops due to some fault with the between-ring transmission line 31 between the between ring connection node devices 113A and 113B operating as the current use system, the between ring connection node devices 114A and 114B standing by as the spare system are started up as the current use system, so communication can be maintained using the between-ring transmission line 41 between these node devices 114A and 114B.

Therefore, with the first invention, while making it possible to avoid communication interrupt between ring networks due to a fault at the between-ring connection node devices 113A, 114A, 113B, and 114B themselves that control switching of duplexed lines, it is also possible to avoid communication interrupt due to duplex line switching failure, and thus to always be able to guarantee normal communication between ring networks.

Also, for the first invention, which of the two sets of either between-ring connection node devices 113A and 113B or between-ring connection node devices 114A and 114B is to be used as the current use system and the spare system is set in advance.

The control node devices 110A and 110B operate the between-ring connection node devices as the current use system based on the abovementioned advance setting to perform communication between ring networks, and when communication becomes impossible due to a fault, etc. of these current use system node devices, control the between-ring connection node devices that were in standby as the spare system until now to start working as the current use system.

Here, the control node devices 110A and 110B implement control of switching operation as the current use system or spare system between the set of between-ring connection node devices 113A and 114A and the set of between-ring connection node devices 113B and 114B in cases such as those following.

(1) When the control node devices 110A and 110B themselves perform a regular survival confirmation for the between-ring connection node devices 113A and 114A and the between-ring connection node devices 113B and 114B and an error is found in the current use system (2) When the current use system between-ring connection node device performs regular communication with the facing between-ring connection node device and a judgment is made whether there is a communication error (such as the time stamp error to be described later), and based on this judgment, there is a notification to the control node devices 110A or 110B that there is a communication error (3) When the current use system between-ring connection node device monitors the line switching status with the facing between-ring connection node device and judges whether there is a failure in line switching, and based on this judgment, there is a notification to the control node device 110A or 110B that line switching has failed To realize switching control between current use system and spare system between-ring connection node devices that match these examples (1), (2), and (3), with this system, a control path is set in advance between the between-ring connection node devices 113A and 113B and the between-ring connection node devices 114A and 114B as a between-ring control communication means to send and receive user cells (control cells) that have between-ring open VPI/VCI values.

Also, between the control node 110A and the between-ring connection node devices 113A and 113B and between the control node 110B and the between-ring connection node devices 113B and 114B, a control path is set in advance as a ring internal control communication means that can send and receive user cells (control cells) that have ring internal open VPI/VCI values.

Figure 5:
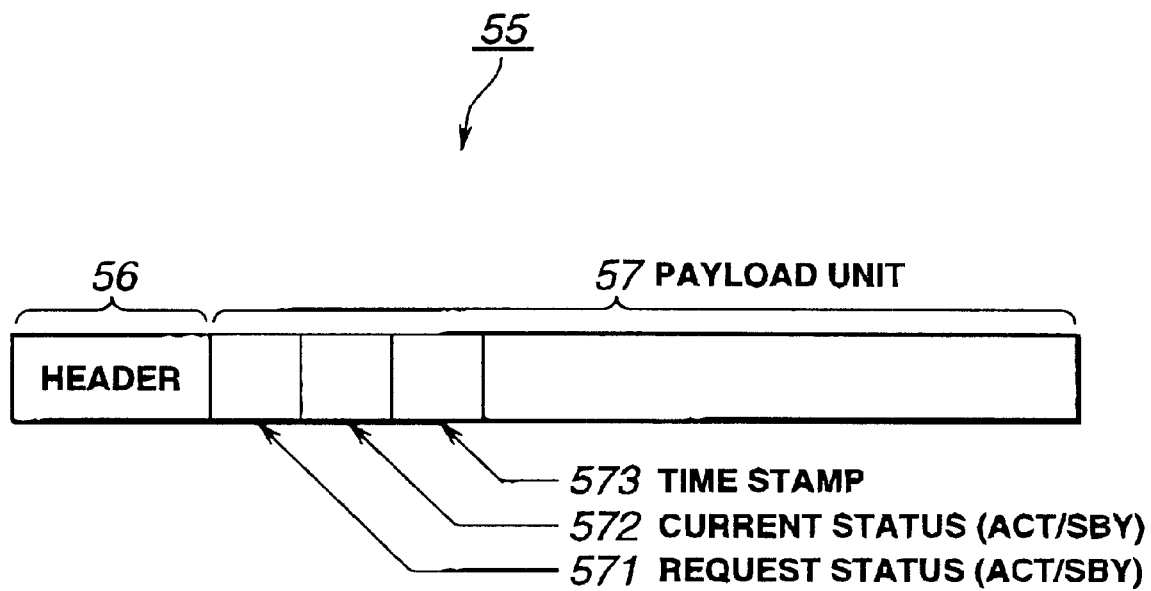
FIG. 5 shows a structural example of the user cell that has the between-ring open VPI/VCI values which are sent and received between the line duplexed node devices in each ring with a system according to the first invention.

FIG. 5 shows an example of control cell 55 that sends and receives between the between-ring connection node devices 113A and 113B and the between-ring connection node devices 114A and 114B, and that has between-ring open VPI/VCI values. As shown in FIG. 5, this control cell 55 is composed from a header unit 56 and an information field (payload unit) 57 that stores user information. In the payload unit 57 are stored a request status (ACT/SBY) 571 for requesting to the facing party to be the current use system (ACT) or spare system (SBY), a current status (ACT/SBY) 572 for notifying either the current use system (ACT) or spare system (SBY) status for the concerned node to the facing party, and a time stamp 571 for judging if the concerned node is normal or in error for the facing party.

When these between-ring connection node devices are operating as the current use system between the between-ring connection node devices 113A and 113B and between the between-ring connection node devices 114A and 114B, the abovementioned control cell 55 performs regular sending and receiving between parties.

With the between-ring connection node device that receives this control cell 55, the contents of the time stamp 571 within this control cell 55 are analyzed, and when this time stamp 571 is regularly updated, the facing between-ring connection node device is judged to be normal and operation continues, but in other cases, when the facing between-ring connection node device is judged to have an error, this is notified to the control node device 110A or 110B within the concerned ring network.

On the other hand, with the control node devices 110A and 110B that have received this notification, a switching instruction is issued to switch to the current use system to the between-ring connection node device that is standing by as the spare system.

This issuing of switching instructions can be performed using the control cell that has ring internal open VPI/VCI values that sends and receives via a control path (ring internal control communication means) set between the between-ring connection node devices.

This control cell does not absolutely have to have the same structure as that of control cell 55 (FIG. 5) that has between-ring open VPI/VCI values, but at least it must have information that correlates to the request status 571 in the concerned control cell 55.

Thus, with the control node devices 110A and 110B, the contents of request status 571 in the control cell that has the abovementioned ring internal open VPI/VCI values is sent to the between-ring connection node device that is subject to switching from SBY to ACT, and thus it is possible to perform switching control of this node device from the standby system to the current use system.

When using a cell with the same structure as that of control cell 55 shown in FIG. 5 as the control cell that has the ring internal open VPI/VCI values, by regularly sending and receiving this control cell between the current use between-ring connection node devices and analyzing the contents of time stamp 573 in the received control cell, it is possible for the current use system between-ring connection node device to realize it has an error itself, and this can handle the abovementioned situation (1).

Figure 6A:
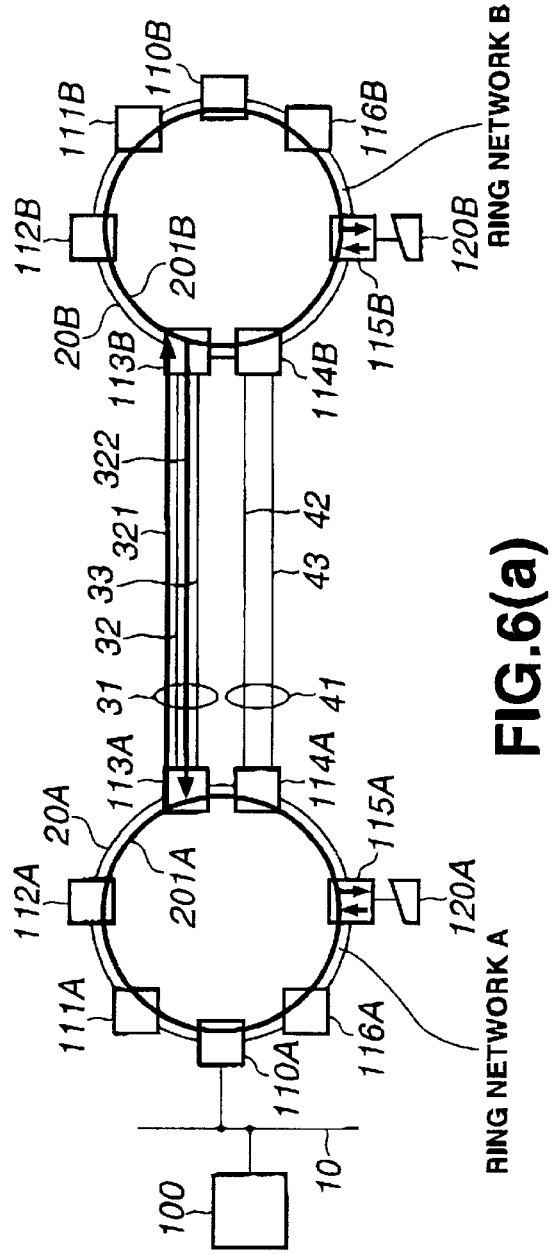
FIGS. 6(a) and 6(b) explain the operation for switching between the current use system and spare system for the one between-ring transmission line of a system according to the first invention.
Figure 6B:
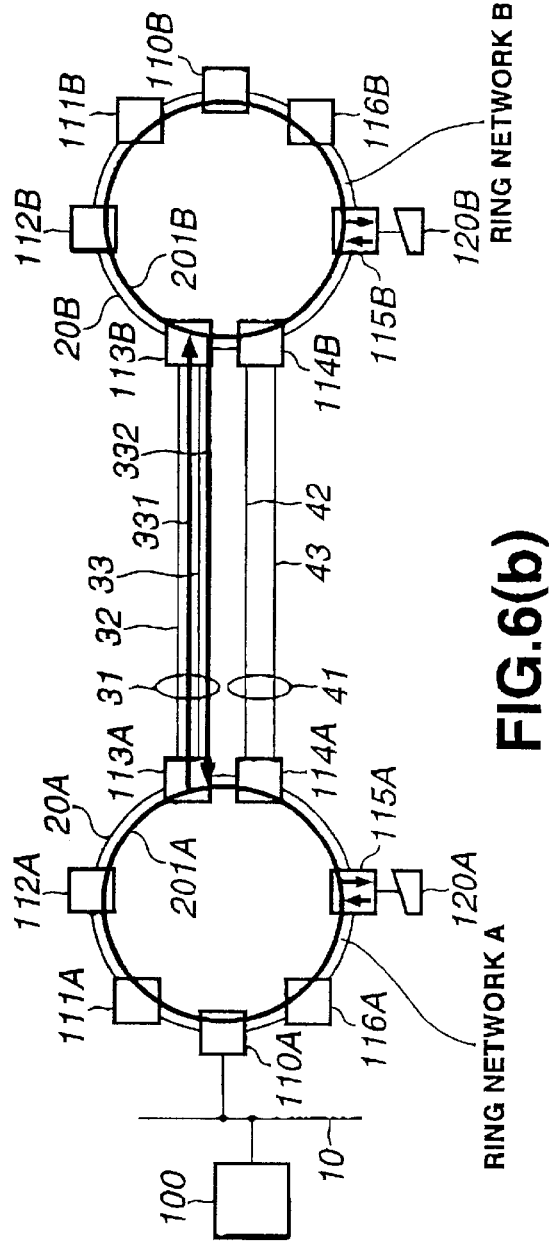
Figure 7:
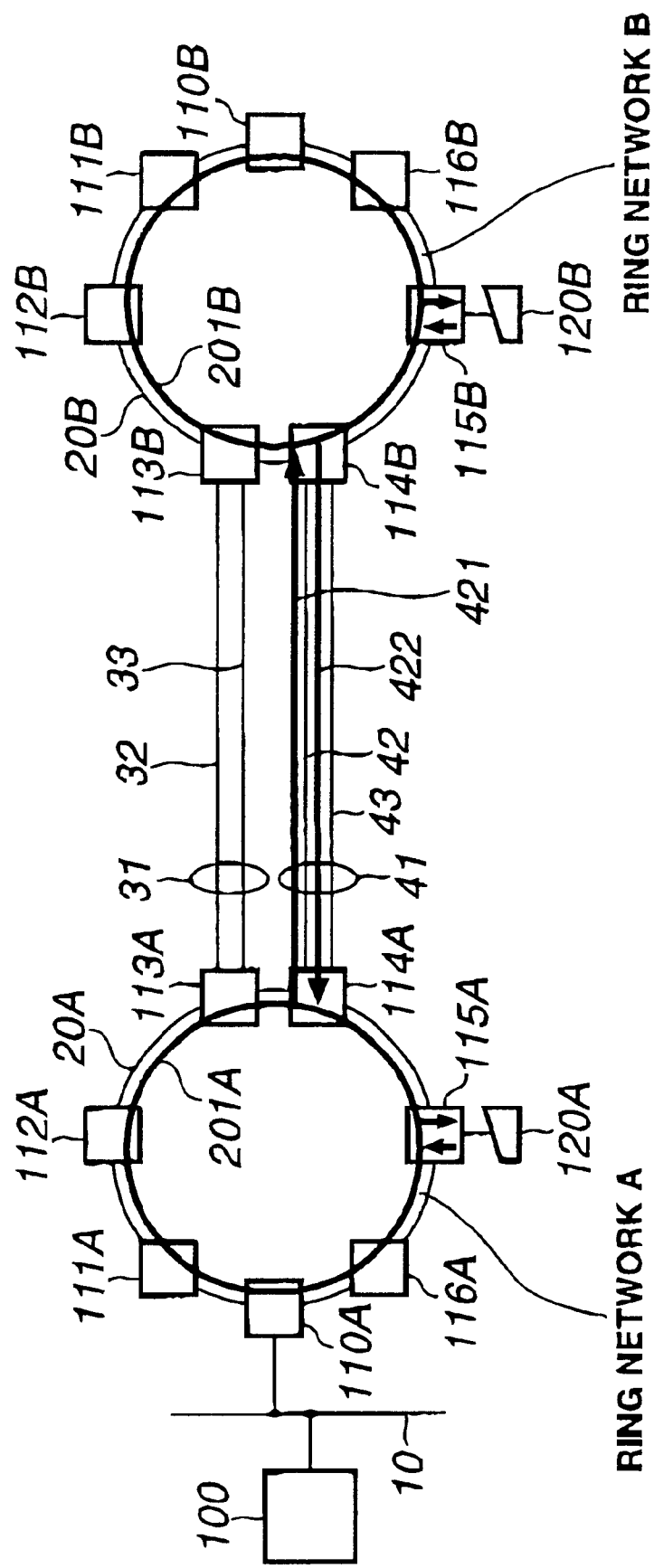
FIG. 7 explains the operation for switching between the current use system and spare system of two between-ring transmission lines for a system according to the first invention.

Taking into consideration the basic control described above, following we will explain a specific example of switching control between a current use system and spare system for a between-ring connection node device of this system while referring to FIGS. 6 and 7. In this example, we are assuming a case when the it becomes impossible to use this between-ring transmission line 31 when the local terminal 120A connected to the ring node device 115A within ring network A is communicating with the local terminal 120B connected to the ring node device 115B within ring network B via the between-ring transmission line 31.

In FIG. 6, the between-ring connection node devices 113A and 113B are operating as the current use system by the control described above for the control node devices 110A and 110B. At this time, a communication path is set between the local terminals 120A and 120B via path 201A within the ring internal transmission line 20A of the ring network A, paths 321 and 322 within the current use system path 32 of the between-ring transmission line 31, and via the path 201B within the ring internal transmission line 20B of the ring network B, and communication is performed between the local terminals 120A and 120B using this communication path.

In this state, using the between-ring connection node device 113A, when it is recognized that a fault has occurred at the current use communication path 31 because a specified cell is not received by the communication path 322, at that point, the communication path 33 that is standing by is started as the current use system, and control is performed to switch the communication path 32 for which a fault occurred to the standby system, and thus the communication path setting is switched as shown in FIG. 6(b).

By doing this the local terminals 120A and 120B can communicate with each other using the path of node device 115A to 116A to 110A to 111A to 112A to 113A to path 331 within transmission line 33 to node device 113B to 112B to 111B to 110B to 116B to 115B to 114B to 113B to path 332 within transmission line 33 to node device 114A to node device 115A.

Thus, during this time, for example, if it is recognized that the time stamp is not updated from the analysis results of time stamp 573 of the user cell (FIG. 5) received by the communication means described above by the between-ring connection node device 113A from the between-ring connection node device 113B, and we assume a fault has occurred in the between-ring connection node device 113B, this is notified to the control node device 110A in relation to the abovementioned communication means.

The control node device 110A that receives this notification issues instructions via the abovementioned communication means for the spare system between-ring connection node device 114A to switch to the current use system.

On the other hand, the spare system between-ring connection node device 114A that receives the instructions from the control node device 110A to switch to the current use system executes duplex switching and starts up as the current use system while also sending to the facing spare system between-ring connection node device 114B a cell for which the settings are changed for request status 571 of the user cell shown in FIG. 5 to go from the spare system (SBY) to the current use system (ACT) and for current status 572 to go from the spare system (SBY) to the current use system (ACT), and for which time stamp 573 has been updated.

The spare system between-ring connection node device 114B that receives this cell executes duplex switching and starts up as the current use system, and while notifying this to the control node device 110B, also sends to the between-ring connection node device 114A which has already started as the current use system a cell for which the settings are changed for request status 571 to go from the spare system (SBY) to the current use system (ACT) and for current status 572 to go from the spare system (SBY) to the current use system (ACT), and for which time stamp 573 has been updated.

Then, the current use system between-ring connection node device 114A that receives this cell gives notification to the control node device 110A that duplex switching has ended. After this, the control node device 110A gives duplex switching instructions to the between-ring connection node device 113A that had been the current use system until now to become the spare system.

This current use between-ring connection node device 113A that received the duplex switching instructions to change to the spare system executes duplex switching and while becoming the spare system, sends to the facing current use system between-ring connection node device 113B a cell for which the settings are changed for request status 571 to go from the current use system (ACT) to the spare system (SBY) and for current status 572 to go from the current use system (ACT) to the spare system (SBY), and for which time stamp 573 has been updated.

Then, the current use system between-ring connection node device 113B that receives this cell (or that receives instructions to become the spare system from the control node device 110B) executes duplex switching, and while becoming the spare system, notifies the control node device 110B of this, and sends to the facing current use system between-ring connection node device 113A a cell for which the settings are changed for request status 571 to go from the current use system (ACT) to the spare system (SBY) and for current status 572 to go from the current use system (ACT) to the spare system (SBY), and for which time stamp 573 has been updated.

Thus, the current use system between-ring connection node device 113A that receives this cell sends notification to the control node device 110A that switching control has ended.

From the situation shown in FIG. 6(b), by performing operational control as described above, a communication path status such as that shown in FIG. 7 is established. With this arrangement, the local terminals 120A and 120B can communicate with each other even after the between-ring transmission line 31 can no longer be used by using a path from ring node device 115A to 116A to control node device 110A to ring node device 11A to ring node device 112A to between-ring connection node device 113A to between-ring connection node device 114A to path 421 in transmission line 41 to between-ring connection node device 114B to between-ring connection node device 113B to ring node device 112B to ring node device 11B to control node device 110B to ring node device 116B to ring node device 115B and a path from ring node device 115B to between-ring connection node device 114B to path 422 in transmission path 41 to between-ring connection node device 114A to ring node device 115A.

After this, when communication is impossible due to occurrence of a fault, etc. at the between-ring transmission line 41, as explained with reference to FIG. 6, by performing switching control between the current use system and spare system, within the concerned between-ring transmission line 41, the spare system transmission line 43 is switched with the current use system transmission line 42 to be the new current use system, and it is obvious that it is possible to maintain the concerned communication by using the paths 431 and 432 in that system.

In the explanations of FIGS. 6 and 7, we explained a case when the current use system between-ring connection node device (in this example, 113A) recognizes a fault in the facing between-ring connection node device (113B) and notifies this to the control node device (110A), so instructions to switch the current use system and spare system were issued from the control node device (110A), but this control is merely one example that corresponds to the control (2) described above.

Besides this, with the first invention, using the abovementioned control (1), the control node devices 110A and 110B perform regular survival confirmations for the between-ring connection node devices 113A and 114A and the between-ring connection node devices 113B and 114B, and when it is recognized that there is an error in the current use system, it is also possible to realize a method that starts up the spare system between-ring connection node device as the current use system.

Also, applying the abovementioned control (3), after giving instructions to start up as the spare system, the current use system between-ring connection node device monitors the line switching execution status between the spare system between-ring connection node devices, and when this line switching fails, this is notified to the control node device, and the control node devices 110A and 110B, when they receive the abovementioned notification, can once again perform control so that the spare system between-ring connection node device starts up as the current use system.

Also, while setting in advance the control node device 110A as a primary station and the control node device 110B as a secondary station, the system is also set so that these control node devices 110A and 110B can recognize the status of generation of a switching request between the current use system and spare system relating to the between-ring connection node devices for each other, and when the abovementioned switching request occurs simultaneously for both the control node device 110A and 110B, the structure can be such that a switch is implemented so that the higher priority primary station is switched before the lower priory secondary station. With this structure, when a request to switch between the current use system and spare use system occurs simultaneously for the control node devices 110A and 110B for the between-ring connection node device, it is possible to prevent in advance the occurrence of repeated switching.

Figure 8:
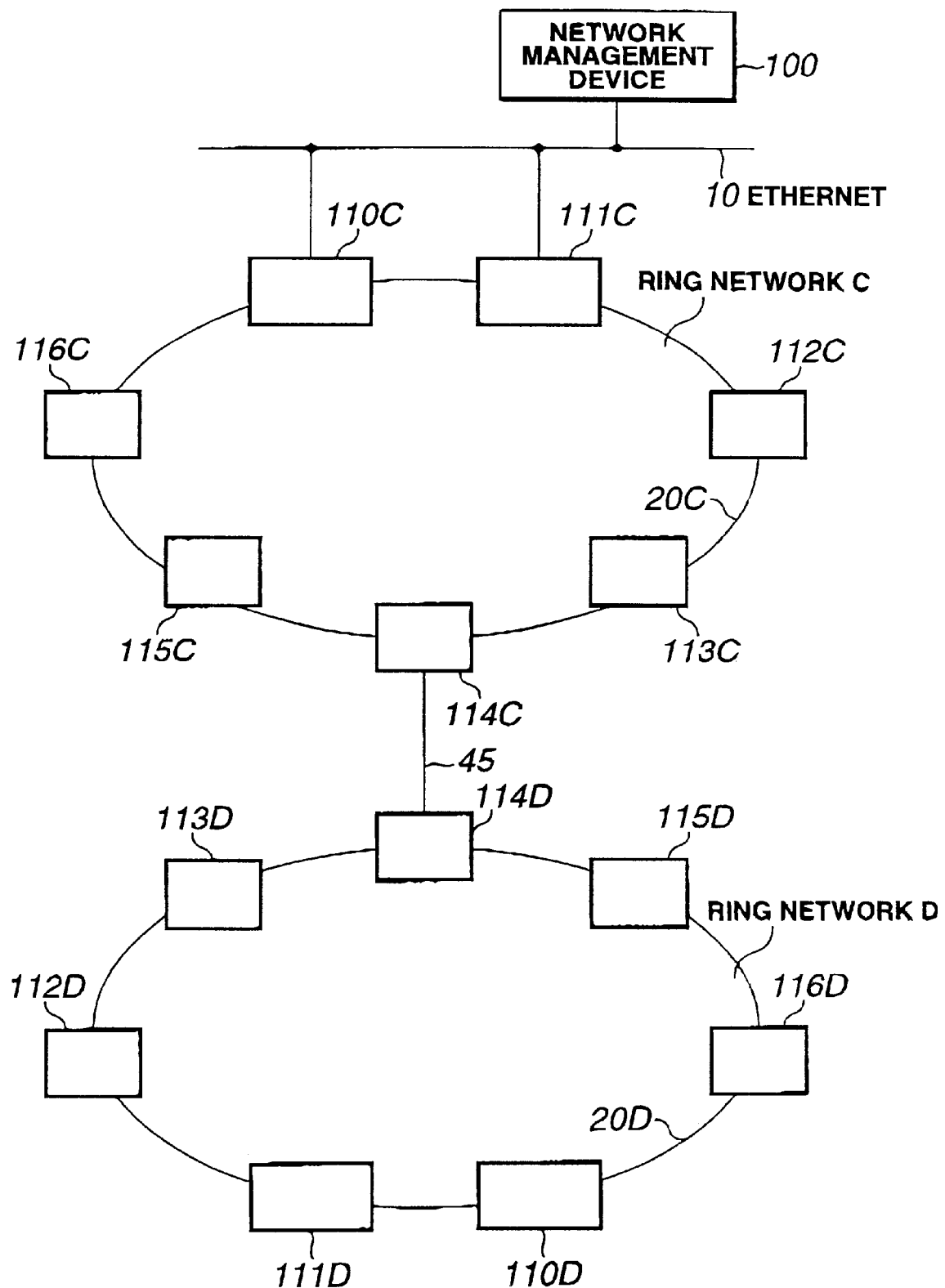
FIG. 8 is an overall structural diagram of a centralized control type ATM ring network system according to the second invention.

Next we will explain the second invention. FIG. 8 shows the overall structure of an ATM network system according to the second invention. For this second invention, ring networks C and D have control node devices and ring node devices connected in ring form, so that a so-called central control ATM ring network structure is formed with which the control node device controls each ring node device. Then, with the first invention, for this central control type ATM ring network structure, two redundant control node devices are provided for each ring network A and B.

Specifically, in FIG. 8, the ring network C has control node devices 110C and 111C and ring node devices 112C through 116C (112C, 113C, 114C, 115C, 116C) connected in ring form by a transmission line 20C, and similarly, the ring network D has control node devices 110D and 111D and ring node devices 112D through 116D (112D, 113D, 114D, 115D, 116D) connected in ring form by a transmission line 20D. Furthermore, the ring network C and ring network D are connected via a transmission line 45 between ring node devices (corresponding to the between-ring connection node devices in the first invention) 114C and 114D.

Figure 48:
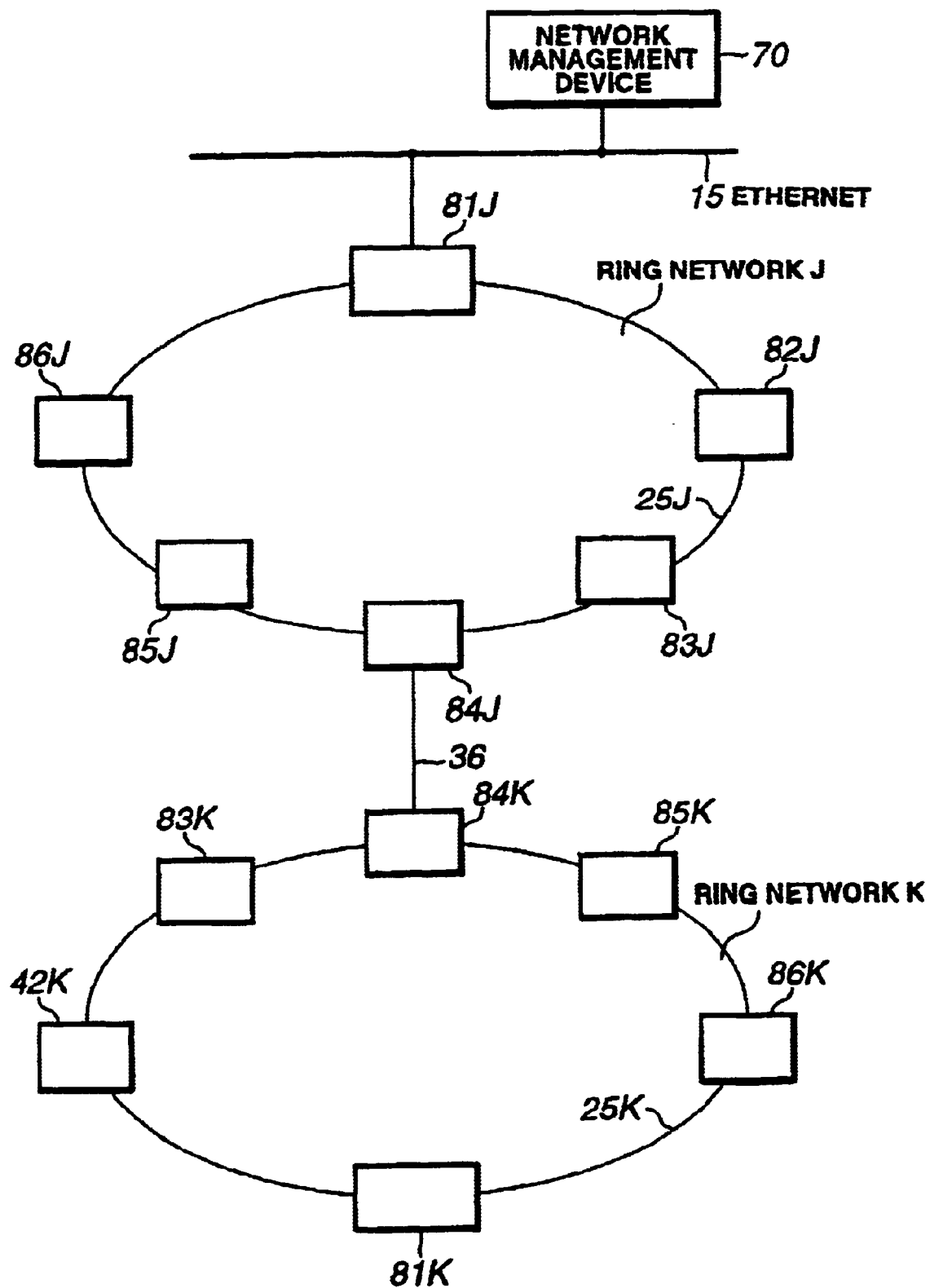
FIG. 48 is an overall structural diagram of a centralized control type system that performs central management of a ring node device within a network with a control node device provided within a ring network.
Figure 49A:
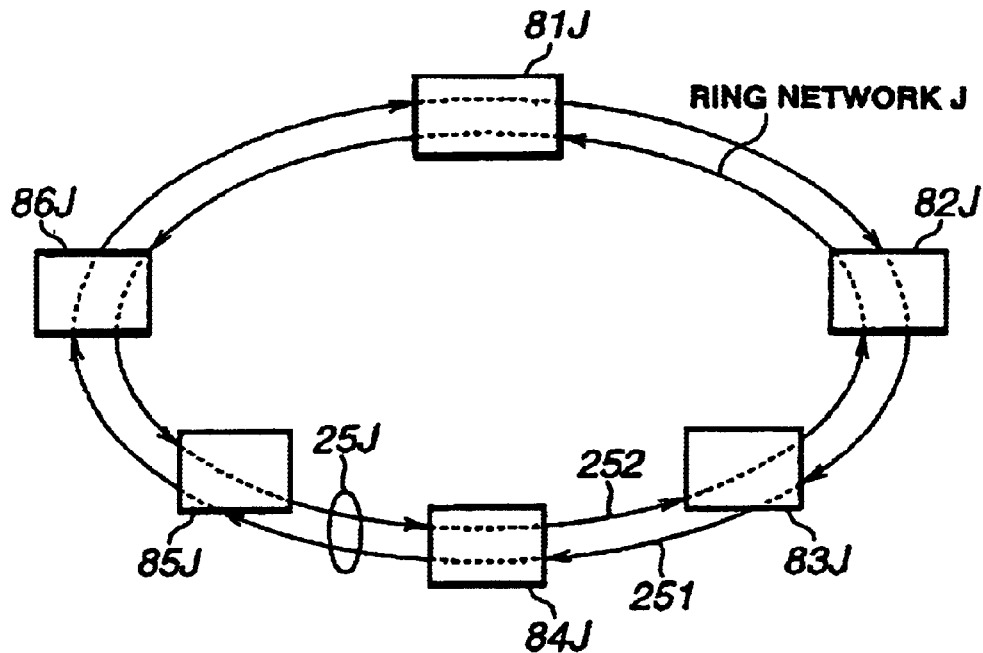
FIGS. 49(a) and 49(b) show an example of duplexing of transmission lines within the ring network of FIG. 48.
Figure 49B:
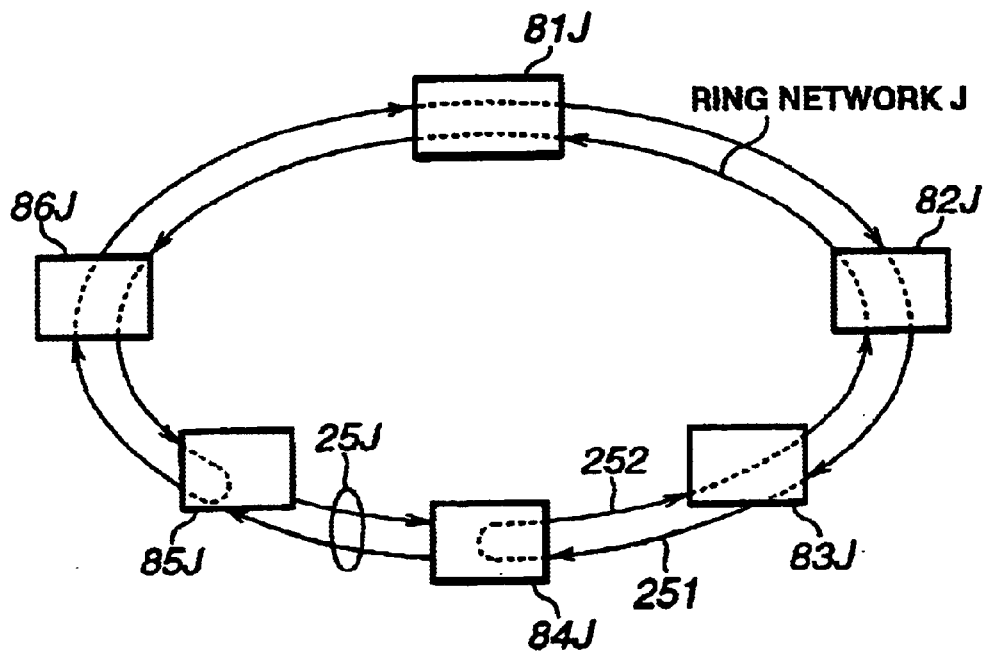
Figure 50:
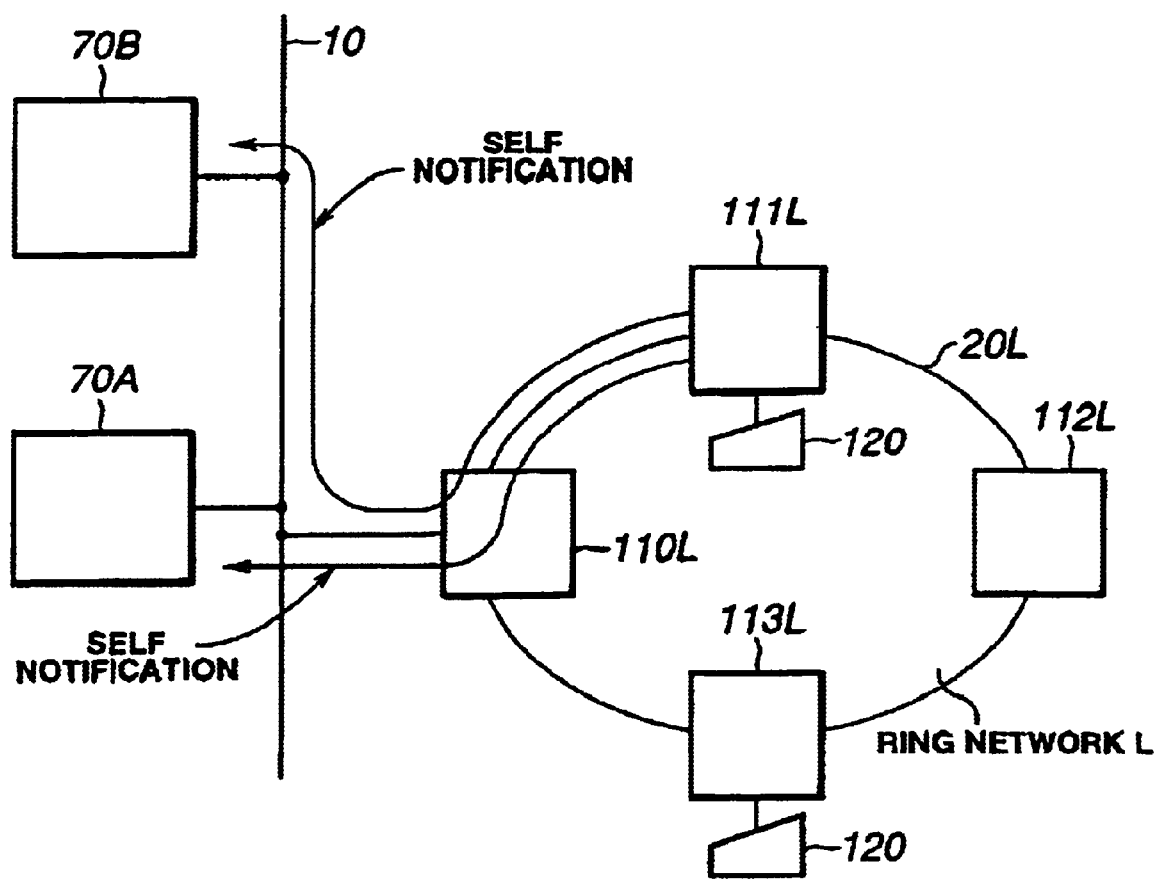
FIG. 50 is an overall structural diagram of a conventional system made by placing redundant network management devices for each device to be managed within a ring network.
Figure 51:
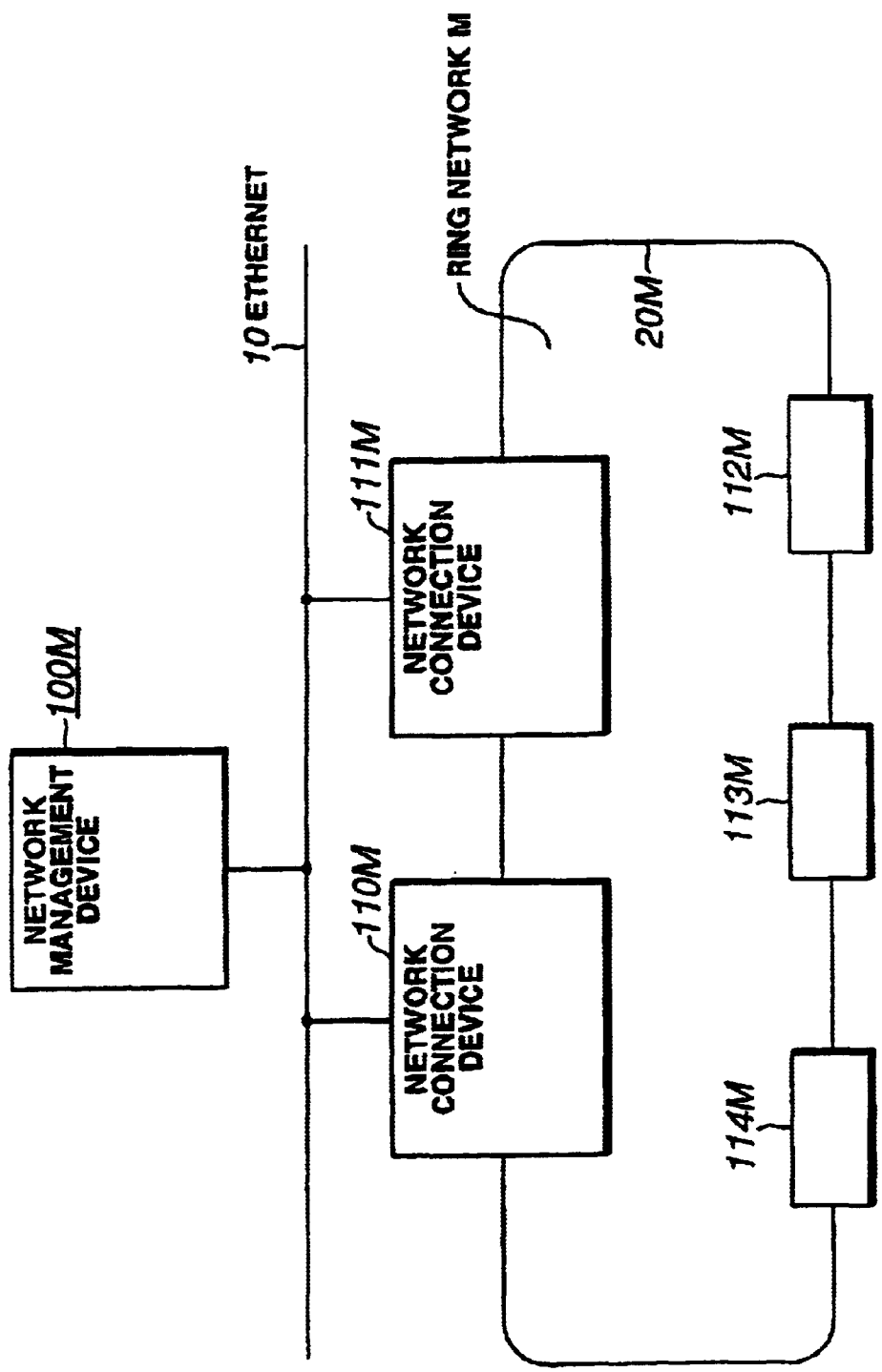
FIG. 51 is an overall structural diagram of a conventional system made by placing redundant network connection devices for network management devices.

Here, the transmission lines 20C and 20D, in the same manner as this type of conventional ring network J and K (FIG. 48), are duplexed by a current use system line and standby system line that are not illustrated. Also, the duplex structure of the current use system line and standby system line of this second invention is shown specifically in FIG. 13 as the structure of the current use system line 202C and spare system line 203C for the transmission line 20C.

For the system according to the second invention, the basic structure of the ring node devices (112C, 113C, 115C, 116C, 112D, 113D, 115D, and 116D) is the same as that of the ring node devices (FIG. 2(a)) of the first invention, and the between-ring connection node devices (114C and 114D) are the same as the between-ring connection node devices of the first invention (FIG. 2(b)). Also, the basic structure of the control node devices (110C, 111C, 110D, and 111D) is the same as that of the control node devices of the first invention (FIG. 3).

However, the control node devices used with the second invention (110C, 111C, 110D, 111D), for devices that have a basic structure such as that shown in FIG. 3, must have a control function such that they can shift from the current use system to the spare system by restricting the functions related to ATM cell switching, etc. in the concerned device within the control unit 515, as described later, and when operating as the spare system, perform survival confirmation of the other party current use system control node device, and be able to switch the concerned device from the spare system to the current use system according to that result.

For a system according to the second invention (FIG. 8), the control node device 110C and the control node device 111C perform control of the ring node devices 112C through 116C within each ring network C, but of these, the control node device 110C operates as the current use system and the control node device 111C operates as the standby system.

Figure 9:
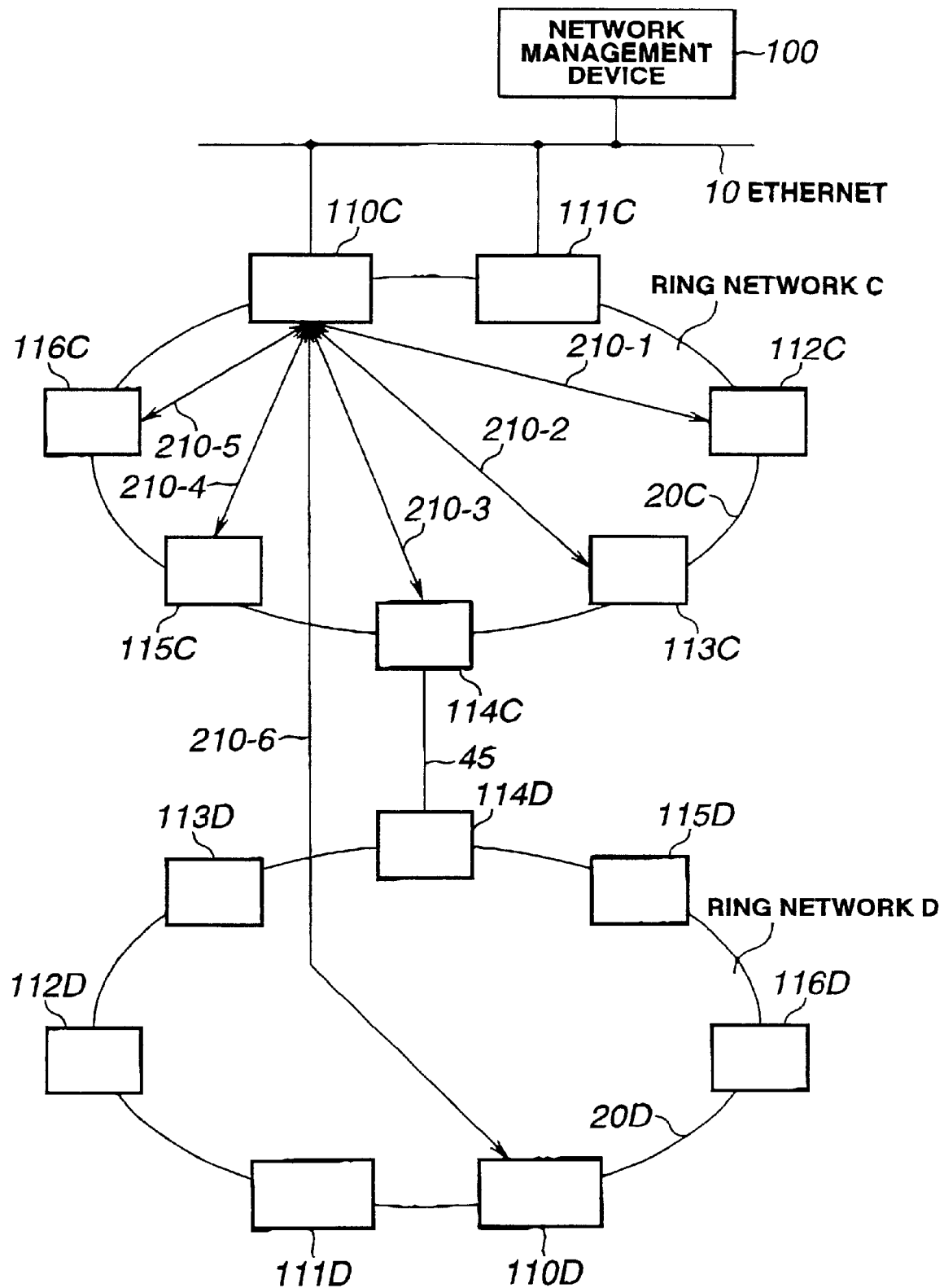
FIG. 9 shows the VC connection established by a control node device according to the second invention.

For this kind of structure, the control node device 110C establishes VC connections 210-1 through 210-5 for each management control between the ring node devices 112C through 116C as shown in FIG. 9, and during operation issues a control command using this VC connection, gathers fault information, and sends and receives management commands. Also, the control node device 110C establishes VC connection 210-6 for management control between the current use system control node device 110D of the adjacent ring network D.

However, with this ring network C and D, an IP (Internet Protocol) address is allocated to each of these control node devices 110C, 111C, 110D, and 111D and each ring node device 112C through 116C and 112D through 116D, and each control node device 110C, 111C, 110D, and 111D performs ATM cell routing based on this IP address.

Because of this, the control node device 110C does not need to establish a VC connection between each ring node device 112D through 116D for the ring network D, and only needs to establish a VC connection between the current use system control node device 110D of the ring network D. Therefore, even if more ring networks are connected, the structure is such that VC connections need only be established with the current use system control node device of the adjacent ring network.

For the ring network C, normally, the control node device 110C operates as the current use system control node device, and the control node device 111C operates as the standby system control node device, and when a fault occurs in the control node device 110C, the control node device 111C operates as the current use system control node device, so it is possible to avoid an effect by the fault.

The control node device 111C that normally operates as the standby system has the same functions as the control node device 110C that is the current use system, but by restricting those functions it operates as the standby system.

Figure 10:
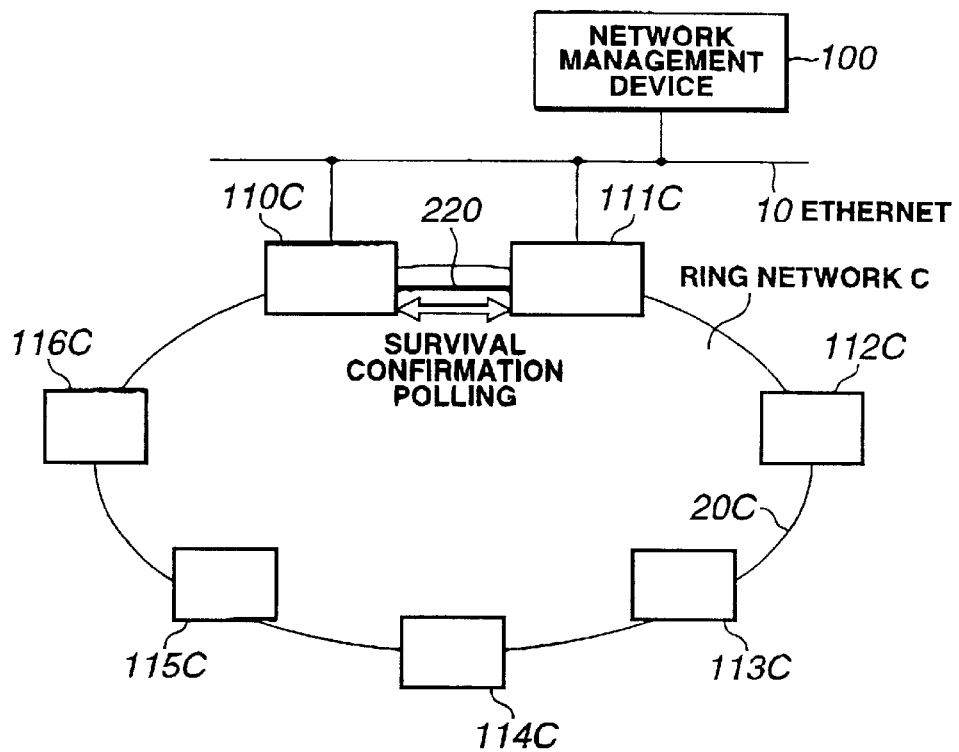
FIG. 10 shows an example of survival confirmation polling communication with a system according to the second invention.

During normal times as shown in FIG. 10, the control node device 110C operating as the current use system establishes VC connection 220 for duplexing between the control node device 111C, and uses this VC connection 220 to perform survival confirmation polling to confirm survival (state with no faults occurring) of the other party between the control node devices 110C and 111C. This survival confirmation polling is performed regularly at designated intervals.

Figure 11:
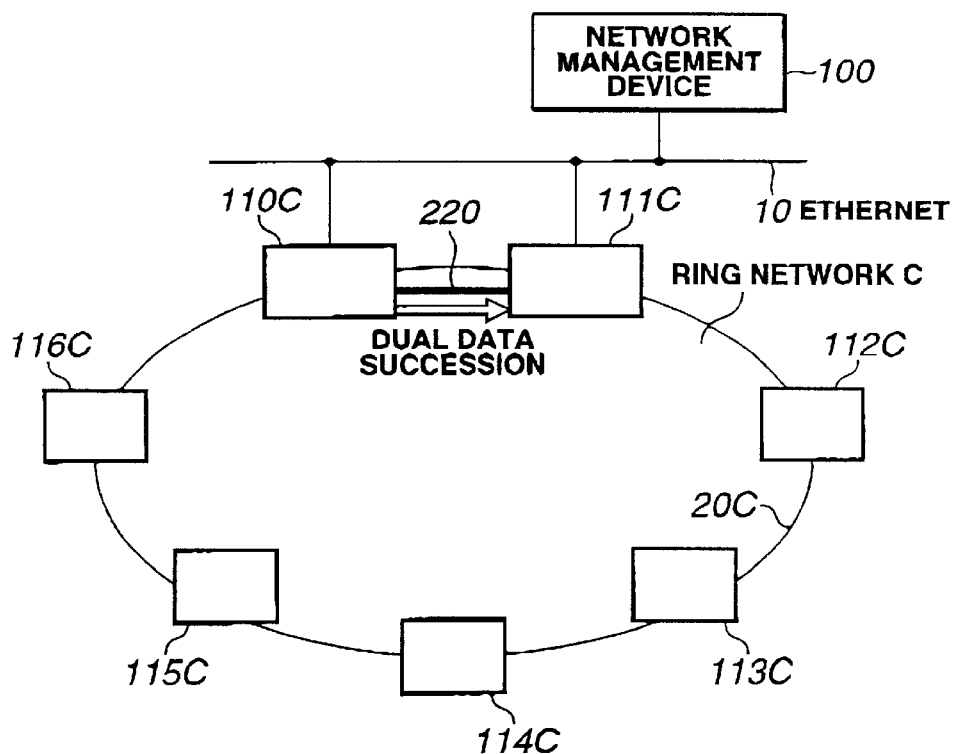
FIG. 11 shows an example of communication with inherited control information for a system according to the second invention.

Also, this control node device 110C notifies the control node device 111C of management control information using the VC connection 220 as shown in FIG. 11, and continues management control information for duplexing, but this notification is performed when management control information is updated for the control node device 110C.

Figure 12:
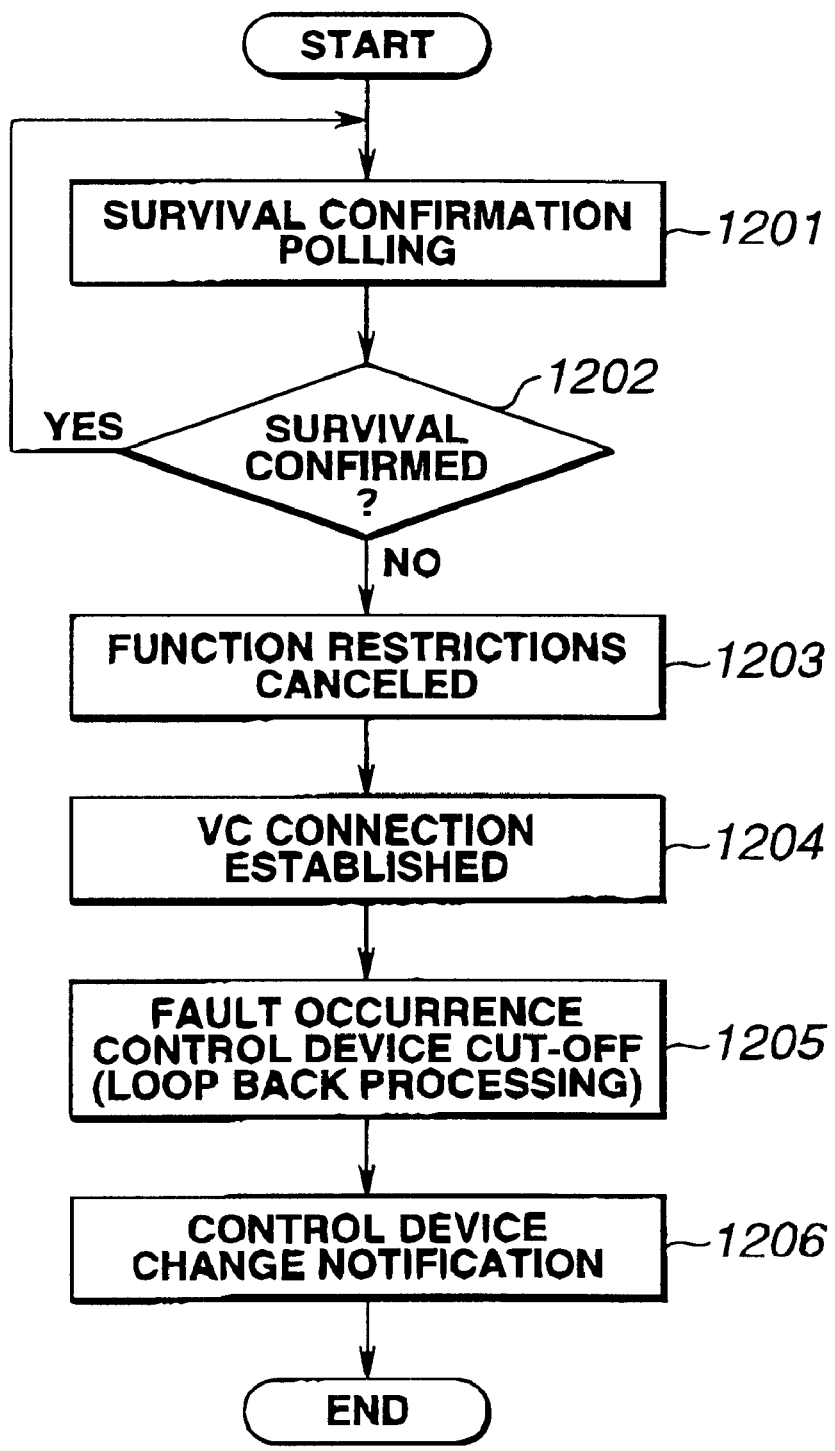
FIG. 12 is a flow chart showing the flow of operation of another one control node device when a fault occurs at the control node device of a system according to the second invention.

Here, referring to FIG. 12, we explain the operation of the control node device 111C when a fault occurs at the control node device 110C.

FIG. 12 is a flow chart showing the operation flow of the control node device 111C when a fault occurs at the control node device 110C.

The control node device 111C normally operates as the standby system control node device, and performs at specified intervals survival confirmation polling for confirming survival to the control node device 110C using the VC connection 220 established with the control node device 110C (step 1201).

If no fault has occurred at the control node device 110C, the survival of the control node device 110C is confirmed by the response of the control node device 110C in relation to the survival confirmation polling (Yes at step 1202), and survival confirmation polling is again performed at specified intervals (step 1201).

If some kind of fault has occurred at the control node device 110C, a response to the survival confirmation polling will not be returned (No at step 1202), so the control node device 111C confirms the occurrence of a fault at the control node device 110C, and starts processing to operate as the current use system control node device.

As the process for operating as the current use system control node device, first, the functional restrictions that restricted operation as the standby system control node device are canceled (step 1203). Next, the control node device 111C pulls the management control VC connections established by the control node device 110C to itself, but the control node device 110C is down in a state with the management control connections pulled, so the control node device 111C establishes VC connections between the ring node devices 112C through 116C and the control node device 110D (step 1204), the same loop back processing as with conventional technology is performed with the control node device 111C and the ring node device 116C, and the control node device 110C is cut off (step 1205).

The control node device 111C which has pulled management control VC connections notifies all of the connected nodes, in other words, the ring node devices 112C through 116C and the control node device 110D that the control node device (of ring network C) has been changed (step 1206), and each node that receives this notification (the ring node devices 112C through 116C and the control node device 110D) updates the control node device address (IP address) of the ring network C from the address of the control node device 110C that was the old current use system control node device to the address of the control node device 111C, and thus all of the processing for the control node device 111C to become the current use system control node device is completed.

Figure 13:
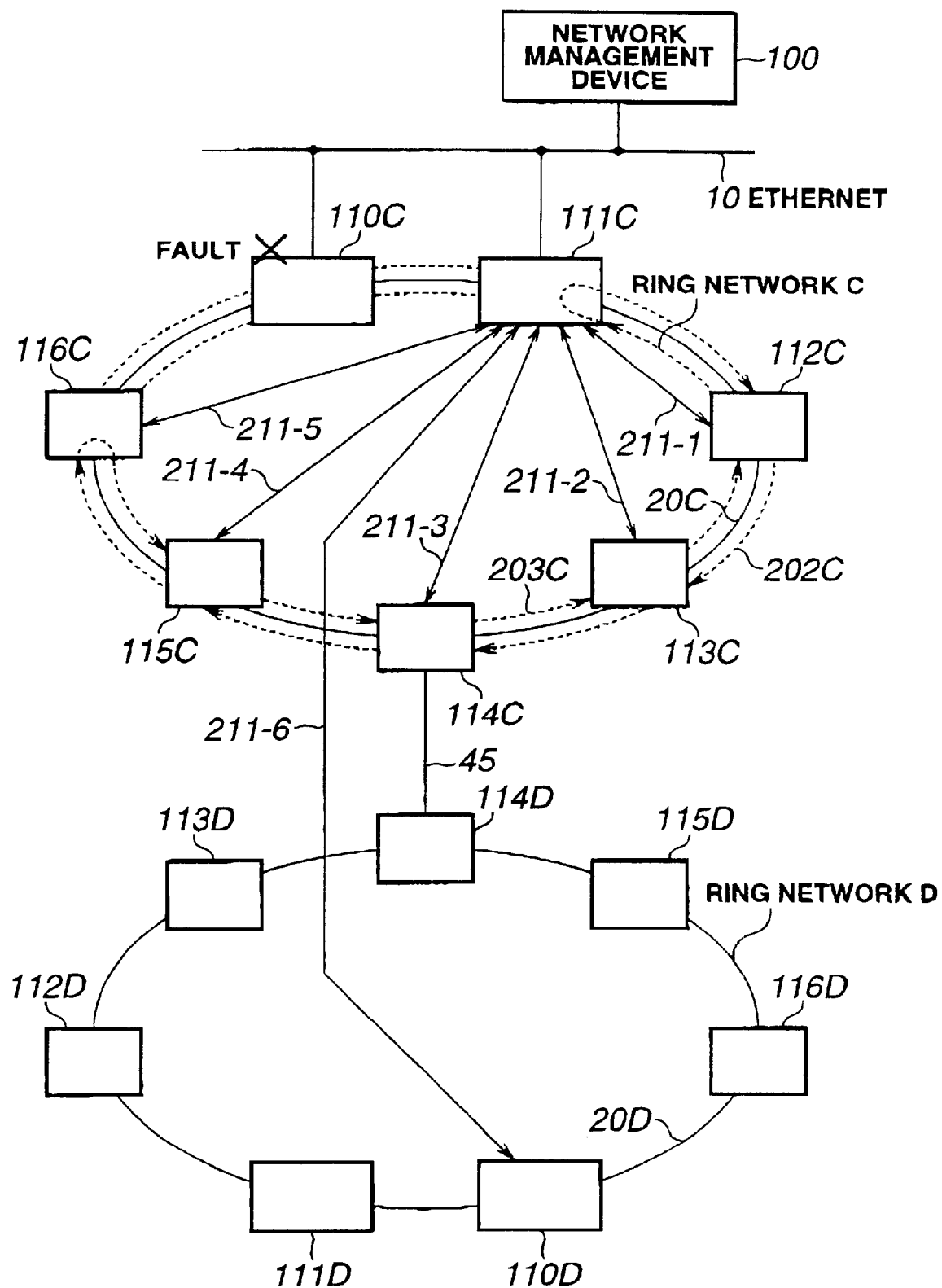
FIG. 13 shows the VC connection after the control node device has changed from the standby system to the current use system for a system according to the second invention.

FIG. 13 shows the VC connections after the control node device 111C has changed from the standby system to the current use system. As shown in FIG. 13, when a fault has occurred at the control node device 110C and the control node device 111C is operating as the current use system, the transmission line 20C undergoes loop back processing for the control node device 111C and the ring node device 116C (a connection is made between the current use system line 202C and the spare system line 203) and the control node device 110C becomes cut off from the ring network C.

In this state, the control node device 111C establishes management control VC connections 211-1 through 211-5 between each of the ring node devices 112C through 116C, and furthermore establishes a management control VC connection 211-6 with the control node device 110D of the ring network D.

With this preferred embodiment, a system is shown with which an IP address is allocated to each node connected to the ring network (control node devices and switching equipment) and communication is performed, but it is also possible to have a structure where the allocated address is not limited to being an IP address, and the control node device establishes VC connections for all nodes.

Also, though this is obvious, the duplexed control node devices do not have to be physically connected adjacent to each other within the ring network as shown in FIG. 8, but can also be connected with switching equipment between both control node devices.

With the abovementioned preferred embodiment, with a case when the control node device 110C and the control node device 111C are placed adjacent to each other and a case when between these one or more ring node devices is interposed, when the control node device 111C operates as the current use system because a fault occurred at the control node device 110C, methods such as those below, for example, can be used to handle the loop back process for cutting off this control node device 110C.

Specifically, in the former case, the control node device 111C starts management control of multiple ring node devices in place of the control node device 110C, while loop back is performed between the current use system line 202C and the spare system line 203C opposite the control node device 110C, and at the same time at the ring node device that is adjacent to the control node device 110C, by receiving the abovementioned notification sent from the control node device 111C (to the effect that the control node device has been switched from 110C to the concerned device 111C), loop back can be performed between the current use system line 202C and the spare system line 203C opposite the control node device Also, in the latter case, for the two ring node devices adjacent to the control node device 110C, by receiving the abovementioned notification sent from the control node device 111C (to the effect that the control node device has been switched from 110C to the concerned device 111C), loop back can be performed between each of the current use system line 202C and the spare system line 203C opposite the control node device 110C.

As described above, with the second invention, the structure is such that a redundant control node device that controls the ATM ring network is placed in the ARM ring network, and during normal operation, one of the control node devices operates as the current use system and the other control node device operates as the standby system, while confirmation of survival between both control node devices and continuation of control management information is performed, and when the survival of the current use system control node device is not confirmed, the standby system control node device starts operating as the current use system, and at the same time, the control node device for which survival was not confirmed is cut off from the ATM network, so not only when a fault occurs at the transmission line, but even when a fault occurs at a control node device, communication is possible on the network, improving fault resistance.

There is also an advantage in that it is not necessary to stop the network when performing maintenance or switching of the control node devices.

Figure 14:
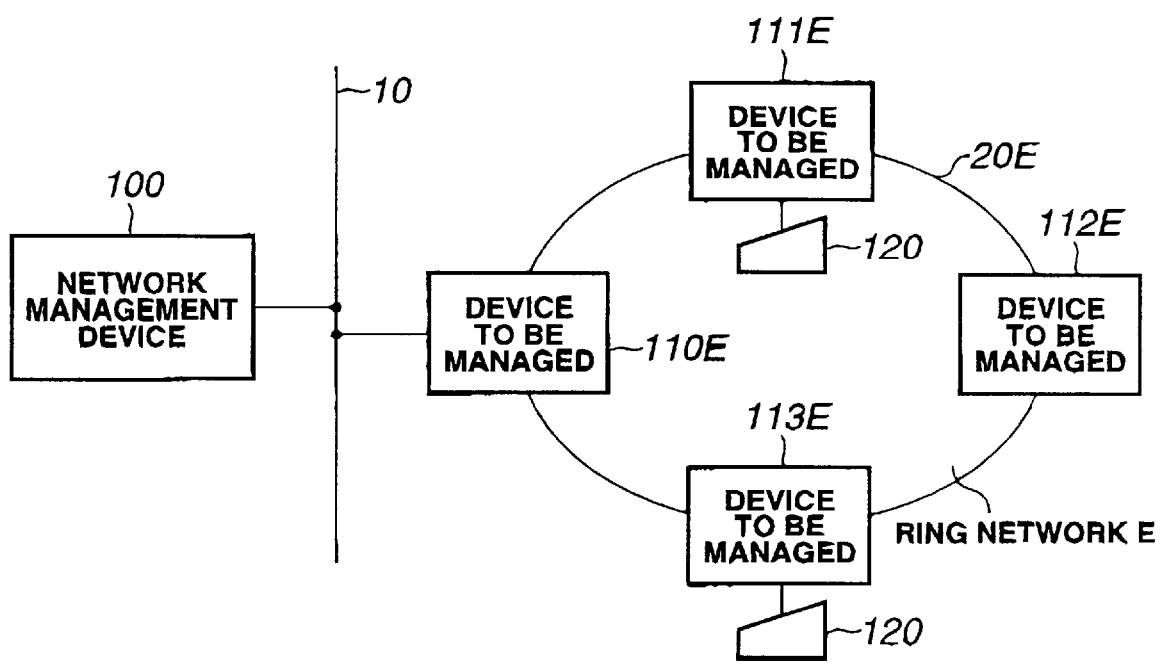
FIG. 14 is an overall structural diagram of a communication network system according to the third invention.

Next, we will explain a third invention. FIG. 14 shows the overall structure of an ATM network system according to the third invention. This system is composed from a ring network F made from devices to be managed 110E, 111E, 112E, and 113E connected in ring form by a transmission line 20E and a network management device 100 connected via an Ethernet 10 by the device to be managed 110E within this ring network E.

In FIG. 14, the ring network E is formed as a central control type ATM ring network similar to the ring networks A and B of the first invention and the ring networks C and D of the second invention.

Specifically, for the ring network E, the device to be managed 110E correlates to the control node device described for the first and second invention, and similarly, the devices to be managed 111E, 112E, and 113E correlate to the ring node devices, and these devices to be managed 110E, 111E, 112E, 113E can be realized, for example, using ATM switching equipment The devices to be managed 110E, 111E, 112E, and 113E each house a local terminal 120, but in FIG. 14, only the devices to be managed 111E and 113E are shown connected to local terminal 120.

Figure 15:
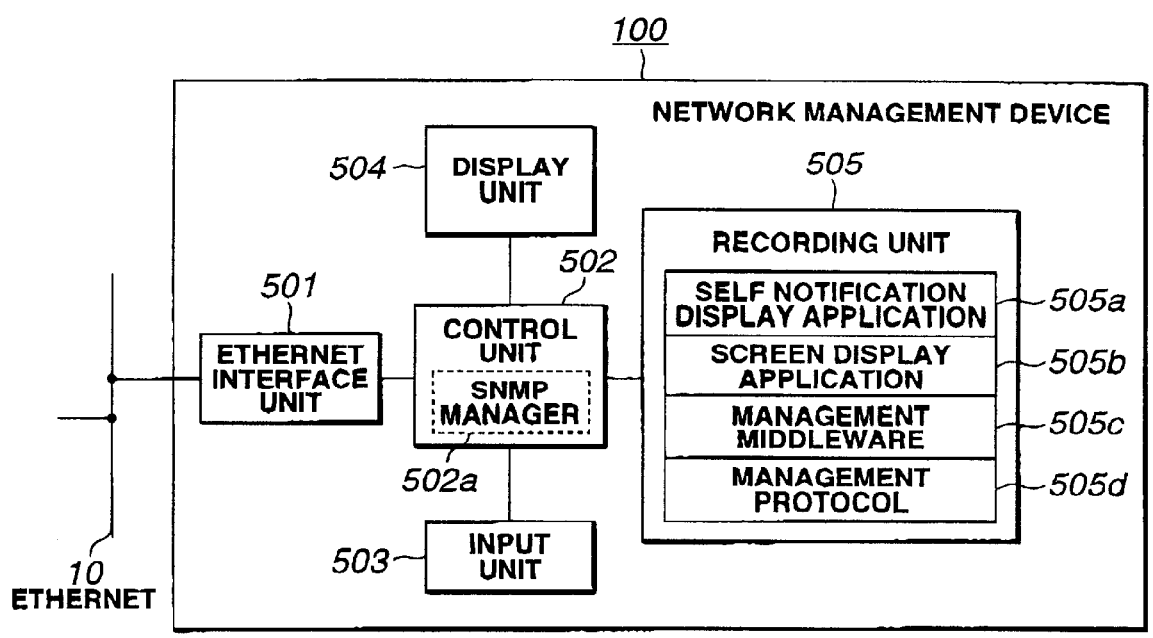
FIG. 15 is a block diagram showing the functional structure of a network management device according to the third invention.
Figure 16:
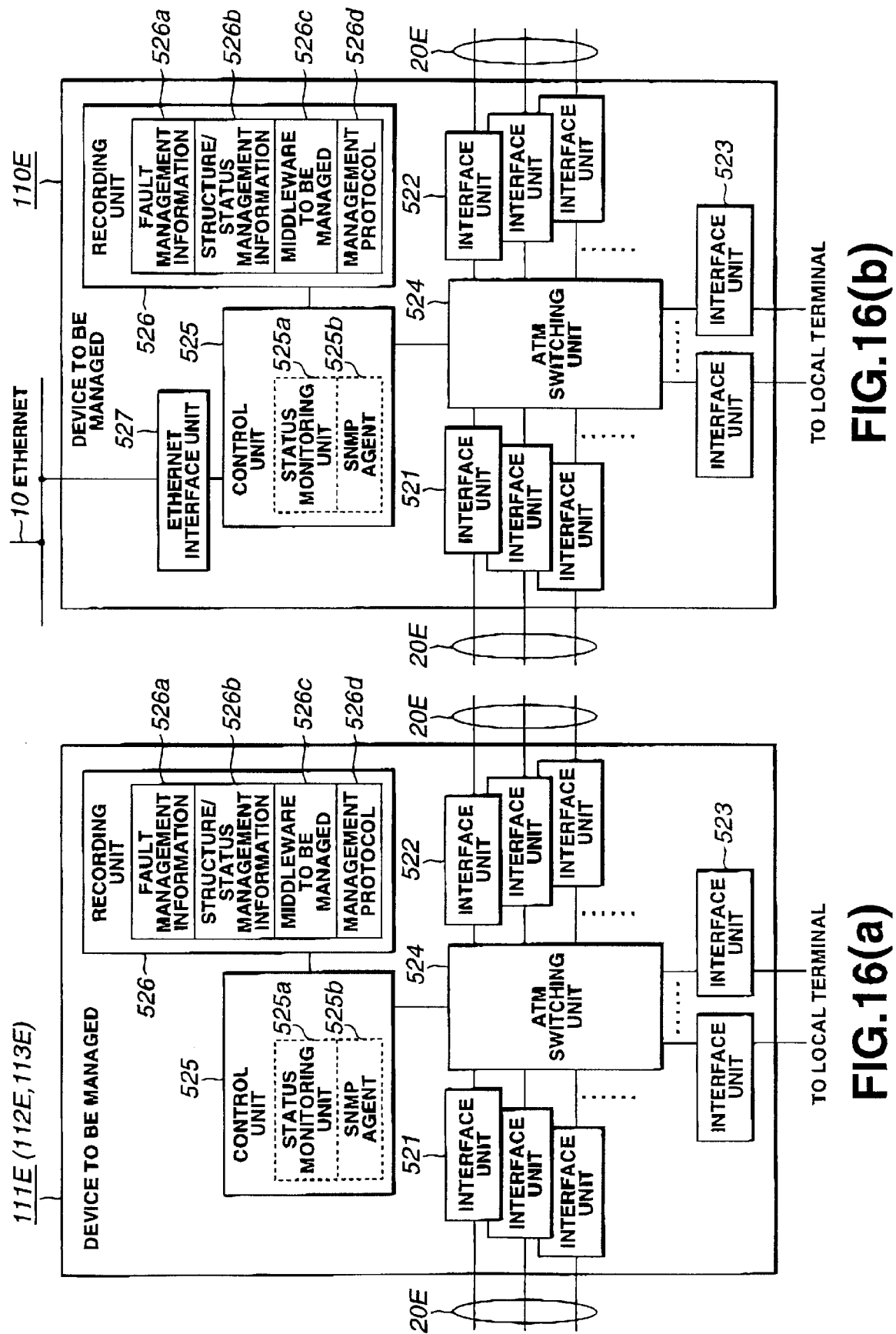
FIGS. 16(a) and 16(b) are block diagrams showing the functional structure of a device to be managed according to the third invention.

FIG. 15 is a block diagram showing the structure of the network management device 100 of the system according to the third invention. FIG. 16 is a block diagram showing the structure of the devices to be managed (110E, 111E, 112E, and 113E) for this system.

In FIG. 15, the network management device 100 is composed from items such as an Ethernet interface unit 501 that acts as an interface with the Ethernet 10, a control unit 502 that controls the overall device, a mouse, and a keyboard, and comprises an input unit 503 that performs input operation of various instructions for network management, a display unit 504 that displays information relating to network management, etc., and a recording unit 505 that records various types of information necessary for network management in cooperation with the devices to be managed (110E, 111E, 112E, and 113E).

In the recording unit 505 are stored at least a self notification display application 505a, a screen display application 505b, a management middleware 505c, and a management protocol 505d.

The self notification display application 505a is an application that performs display processing on the display unit 504 based on information related to faults (fault management information 526a, FIG. 16) self notified from the devices to be managed (110E, 111E, 112E, and 113E).

The screen display application 505b is an application that performs display processing on the display unit 504 based on information relating to various status such as the structure of the interface slot, etc. of the devices to be managed (110E, 111E, 112E, and 113E) and internal substrate operation status or alarm operation status with this structure as a prerequisite (structure/status management information 526b, FIG. 16).

As management middleware 505c, for example, it is possible to use an SNMP (Simple Network Management Protocol) manager, and as management protocol 505d it is possible to use, for example, SNMP/UDP/IP (Internet Protocol), etc. The abovementioned applications 505a, 505b, management middleware 505c, and management protocol 505d are written into the control unit 502, and are executed by the control of this control unit 502. In FIG. 15, the SNMP manager 502a residing within the control unit 502 indicates the management middleware 505c that is read from the recording unit 505 and is in the process of executing.

FIG. 16(a) shows the structure of devices to be managed (111E, 112E, and 113E) that are not directly involved in communication with the Ethernet 10 within the network E. FIG. 16(b) shows the structure of a device to be managed (110E) which is directly involved in communication with the abovementioned Ethernet.

In FIG. 16(a), the devices to be managed (111E, 112E, and 113E) comprise as their major structural elements the interface units 521 and 522 that perform control relating to sending and receiving of data (ATM cells) between each virtual path on the ring transmission line 20E realized by an ATM transmission line, the interface unit 523 that performs control relating to sending and receiving data between low speed lines that store local terminal 120, the ATM switching unit 524 that performs cell switching operations that send to the interface unit 521, interface unit 522, or interface unit 523 via the output port that corresponds to the input port of these cells the cells input from the interface unit 521, interface unit 522, or interface unit 523, the control unit 525 that performs switching operations of the abovementioned cells for the ATM switching unit 524 according to switching tables (items registered with a correlation given for cell input ports and output ports to the VPI and VCI), and the recording unit 526 that records each type of information that includes the abovementioned switching tables.

The recording unit 526, besides the abovementioned switching tables, as various types of information necessary for network management working together with the network management device 100, also stores the fault management information 526a which is a collection of information relating to each type of fault of the concerned device, the structure/status management information 526b which is a collection of information relating to each type of status such as the interface slot structure of the concerned device and the internal substrate operating status or alarm operating status, etc. with this structure as a prerequisite, the middleware to be managed 526c, and the management protocol 526d.

As the middleware to be managed 526c, for example, an SNMP agent can be used, and as the management protocol 526d, for example, SNMP/UDP/IP can be used. The middleware to be managed 526c and the management protocol 526d are read into the control unit 525 and are executed by the control of the control unit 525.

Also, besides the control relating to the cell switching described above, in the control unit 525 is included a control function that monitors changes in status of faults that occur on the concerned device, operating status, etc., and issues a self notification based on the monitoring results. Within the control unit 525 is provided a status monitoring unit 525a and SNMP agent 525b that realize this control function.

The status monitoring unit 525a monitors changes in the status of faults that occurred in the concerned device, operating status, etc. The SNMP agent 525b is responsible for control that self notifies the network management device 100 of information obtained by the abovementioned monitoring (the fault management information 526a and the structure/status management information 526b kept in the recording unit 526). In this FIG. 16(a), the SNMP agent 525a residing within the control unit 525 indicates the middleware to be managed 526c that is read from the recording unit 526 and is in the process of execution.

In FIG. 16(b), the device to be managed 110E, in addition to each structure of the devices to be managed (111E, 112E, and 113E) shown in FIG. 16(b), has an Ethernet interface unit 527 for connection to the Ethernet 10. Other structures are the same as the devices to be managed (111e, 112E, and 113E) shown in FIG. 16(b).

In the system according to the third invention (FIG. 14), the display control process to the display unit 504 relating to the fault management of the devices to be managed (110E, 111E, 112E, and 113E) for the network management device 100 is performed waiting for self notification from these devices to be managed (110E, 111E, 112E, and 113E).

Specifically, with the devices to be managed (110E, 111E, 112E, and 113E), if a fault occurs or is repaired for the concerned device, the status monitoring unit 525a detects this and conveys it to the control unit 525. The control unit 525 manages these detected results as the fault management information 526a, and also judges for the overall concerned device if it was a fault occurrence or fault repair based on these detected results, and requests issue of self notification of fault occurrence or fault repair according to these judgment results to the SNMP agent 525b. By receiving this request, the SNMP agent 525b issues a self notification to the network management device 100 including the abovementioned fault management information 526a using the management protocol 526d.

On the other hand, with the network management device 100, the self notification report relating to the fault occurrence or fault repair from the devices to be managed (110E, 111E, 112E, and 113E) are received using the management protocol 505d, and the self notification information contained therein (the fault management information 526a) is transferred to the SNMP manager 502a.

The SNMP manager 502a correlates this self notification information to a report source address (the IP address of the device to be managed (110E, 111E, 112E, and 113E) that issued the self notification) and records this in the recording unit 526 and keeps it.

Here, the SNMP manager 502a also has a function that manages as device icons representing the concerned devices to be managed each of the devices to be managed (110E, 111E, 112E, and 113E) that are subject to control. Also, through linking this function and the self notification display application 505a, while displaying as device icons each device to be managed (110E, 111E, 112E, and 113E) on the display unit 504, it also controls to display on display unit 504 the device icons relating to the device to be-managed that is the source of issuing changed according to the contents of the self notification information contents that were issued.

Specifically, the self notification display application 505a, when the abovementioned self notification report is received, references the issue source address and searches for the device icon that the SNMP manager 502a is managing, while at this time referencing the fault management information 526a within the self notification report, and based on this value, performs display on the display unit 504 reflecting a color showing occurrence of a fault or a color showing repair of a fault on the device icon which has already been found as abovementioned.

This self notification display process is performed when the self notification report is received from the devices to be managed (110E, 111E, 112E, and 113E), and thus, at this time, the device icon color display for the report source device to be managed (110E, 111E, 112E, and 113E) is updated.

In this way, the SNMP manager 502a supports a drawing processing function that performs display of the self notification information received from the devices to be managed (110E, 111E, 112E, and 113E) using the device icons that represent these devices to be managed (110E, 111E, 112E, and 113E). Following, we will explain this self notification drawing processing function using device icons.

Figure 17:
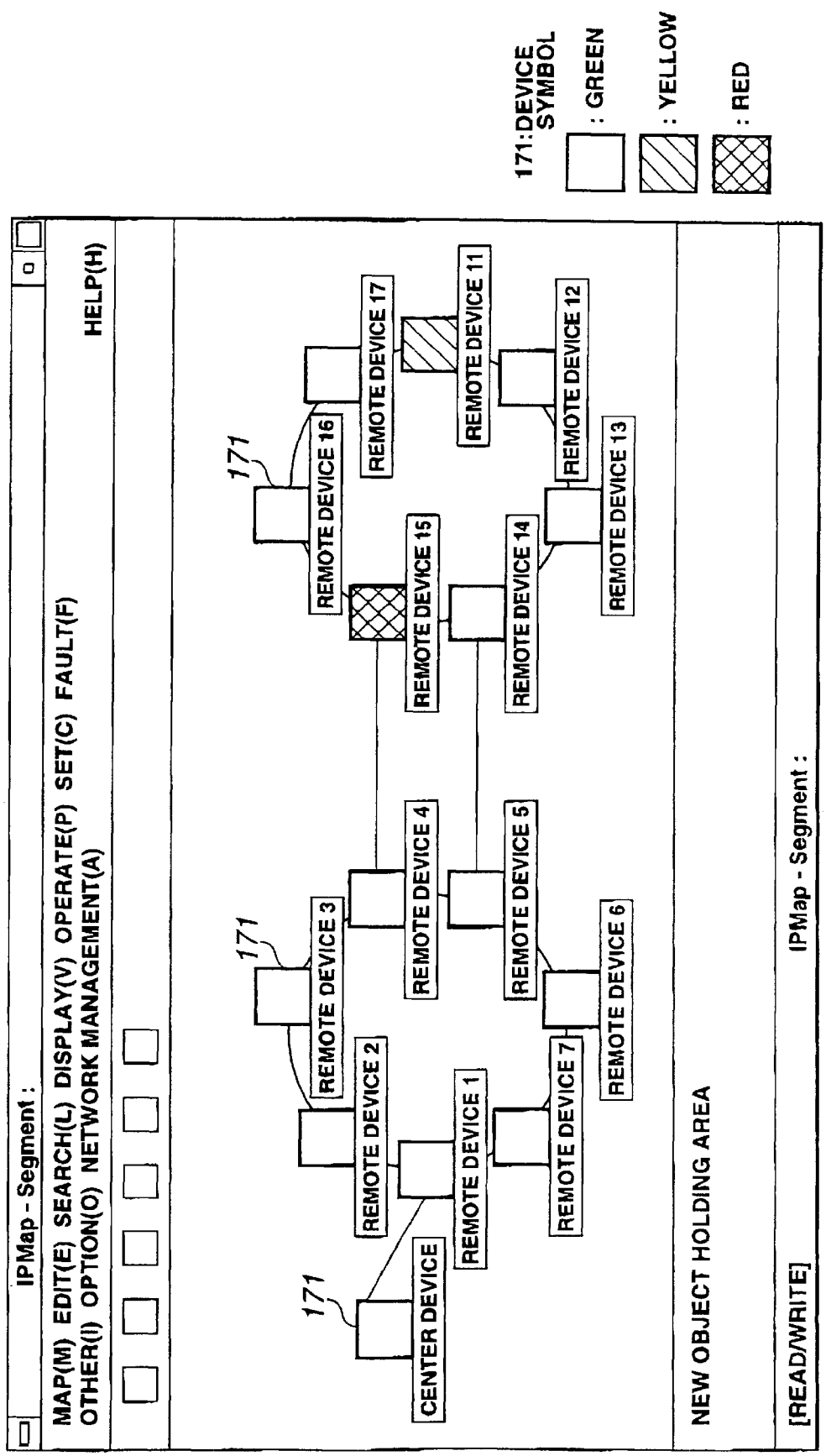
FIG. 17 shows an example of an iconization display screen of the self notification information of a device to be managed for a network management device according to the third invention.

FIG. 17 shows an example of a display screen on the display unit 504 using the drawing application "IPMaP" supported by the SNMP manager 502a. This "IPMaP" makes icons of each device to be managed (110E, 111E, 112E, and 113E) which are subject to management by the concerned device and displays them as device symbols 171, while also performing the process of changing the color and displaying the device symbol 171 according to the sending source device to be managed (110E, 111E, 112E, and 113E) according to the information that shows the system fault status within the self notification information (FIGS. 20 to 23) received from these devices to be managed (110E, 111E, 112E, and 113E).

For the "IPMaP", the original function was to display as device symbol 171 each device to be managed according to the network structure (FIG. 14) managed by the concerned network management device 100, but in FIG. 17, there is a special disclosure of an example of display according to the network structure (FIG. 1) relating to the first invention.

Specifically, in the display screen of FIG. 17, the center device corresponds to the network management device 100 of FIG. 1 (in other words, the concerned device in the process of executing this self notification drawing process). Also, the remote device 1 corresponds to the control node device 110A within the ring network A in FIG. 1, and the remote devices 4 and 5 correspond to the between-ring connection node devices 113A and 114A. The remote device 11 corresponds to the control node device 110B within the ring network B in FIG. 1, and the remote devices 14 and 15 correspond to the between-ring connection node devices 114B and 113B. The remote devices 2 and 16, etc. other than the abovementioned items on the display screen correspond to the ring node devices 111A, 111B, etc. within the ring networks A and B in FIG. 1.

Regarding the operation of the device status color of the device symbol 171 placed in the "IPMaP", for example, it is possible to set green for normal areas, yellow for warning areas, and red for danger areas. In the example in FIG. 17, according to these settings, for example, the remote device 11 that issues a self notification report showing an error of a warning area is displayed using yellow, the remote device 15 that issues a self notification report showing an error of a danger area is displayed using red, and remote devices other than remote devices 11 and 15 that issue a self notification report showing no errors at all are displayed using green showing normal areas.

Here, as can be seen from the fact that reports are also received from remote devices (devices to be managed) that show no error at all, in this example, regular self reports are received from devices to be managed for times other than when a fault occurs or a fault is repaired. Besides this, specified self notification request instructions are input from the network management device 100 side, and at this time, it is possible to have a self notification sent from the device to be managed.

With the self notification display control according to the third invention, if the network structure is in a form with which the network management device manages the devices to be managed, this network is not limited to being a ring network for which devices to be managed are connected in ring form, but can also be used in a form such as the devices to be managed being connected directly or connected in a star form, and can be connected in various forms.

Figure 18:
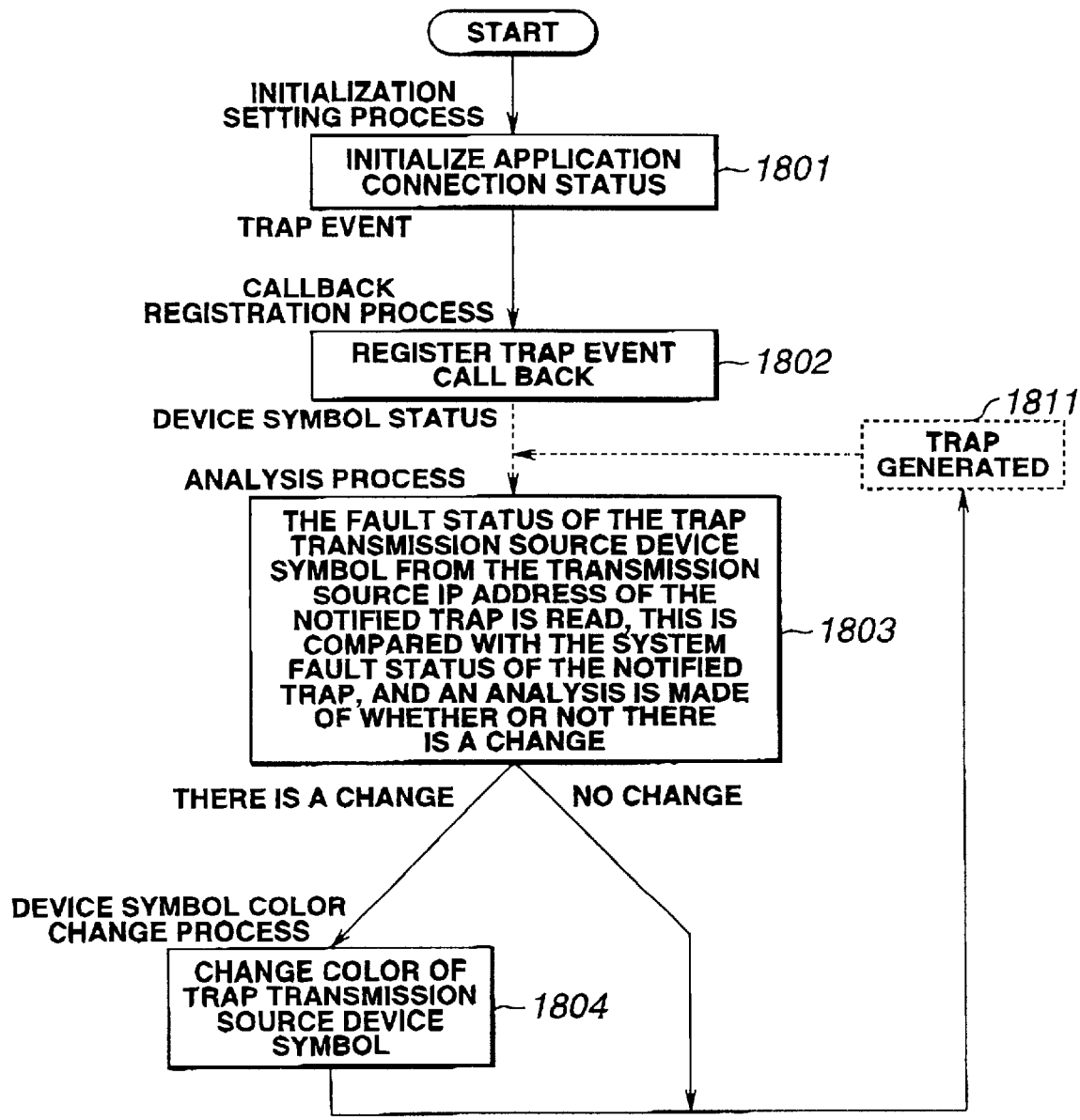
FIG. 18 is a flow chart showing the device symbol color operating process on the display screen shown in FIG. 17.

Next, we will use the flow chart shown in FIG. 18 to explain the device symbol color operating process based on the self notification (hereafter called Trap) information on this "IPMaP". When realizing this device symbol color operation, first, initial setting processing is performed (step 1801), then trap event call back registration processing is performed (step 1802). Specifically, with the initial setting processing, to make it possible to use the API (Application Program Interface) function of the self notification display application 505a from the trap (self notification) process by starting the process from the SNMP manger 502a, connection status initialization is performed between these items (OVwInit). Also, with the trap event call back registration process, to receive a trap (call back call) from the SNMP manager 502a, trap event call back registration is performed (OVsnmpEventOpen).

After the above processing is completed, with the "IPMaP", using the receiving of the trap (step 1811) from the device to be managed (110E, 111E, 112E, and 113E) through the management protocol 505d as an opportunity, the status analysis process of device symbol 171 is performed (step 1803). Specifically, the current fault status of the trap sending source device symbol 171 is read from the notified trap sending source IP address, this is compared with the system status of the notified trap, and an analysis is made of whether or not there is a change or not.

As a result of this analysis, when there is no change in status, monitoring of trap occurrence (step 1811) is continued, and if there is a change in status, then device symbol color change processing is performed (step 1804). For this device symbol color change processing, only when a change is detected with the device symbol status analysis processing of step 1803 is the color of the trap sending source device symbol 171 changed according to the system fault received by the trap (OVwSetStatusOnSymbol).

FIG. 19 is a table showing the relationship of the system fault status received by a trap with the trap sending source device symbol color changed from the status of the trap sending source device symbol 171.

As can be seen from the table in FIG. 19, with the third invention, with the status of the trap sending source device symbol as, for example, "normal: normal area", when fault information indicating status of "major: danger area" is received by the trap, this trap sending source device symbol color changes from green to red, and with the status of the trap sending source device symbol as "major: danger area", when the trap receives information showing a status of "minor: normal area", this trap sending source device symbol color undergoes processing that changes it from red to green.

In other words, with the network management device 100 according to the third invention, there is a function that displays as a color change of the device symbol 171 representing these devices to be managed (110E, 111E, 112E, and 113E) not just fault occurrence but also fault repairs relating to the devices to be managed (110E, 111E, 112E, and 113E).

Because of this, the administrator can recognize at the appropriate time both fault occurrence and repairs of the devices to be managed (110E, 111E, 112E, and 113E). Furthermore, by combining this display using the device symbol 171 with a self notification history display to be described later using the SNMP manager 502a, it is possible to realize a structure that can make judgments even relating to past fault occurrence or repairs.

As described above, with the network management device 100 according to the third invention, the following function (I) is supported.

(I) A processing function that, based on the trap received from the devices to be managed (110E, 111E, 112E, and 113E), makes displays on the display screen of display unit 504 as shown in FIG. 17 (the trap sending source is represented by a device symbol 171 placed to correspond with that network structure and a color according to the trap contents is reflected in that device symbol 171).

Also, with this network management device 100, the following function (II) is supported.

(II) A processing function that displays as character information (FIG. 20) the trap contents relating to the device to be managed corresponding to the concerned device symbol 171 on the display screen of FIG. 17 by clicking a specific device symbol 171.

Also, with this network management device 100, the following function (III) is supported.

(III) A processing function that displays as an actual device image (FIGS. 24 through 31) the structure/status information relating to the device to be managed corresponding to the concerned device symbol 171 on the display screen of FIG. 17 by double clicking a specific device symbol 171.

Following, we will give a sequential explanation of the display processing functions of items (II) and (III).

First, for the processing function of item (II), as with the processing function of the abovementioned item (I), the function is performed by linking of the SNMP manager 502a and the self notification display application 505a.

As described above, with the network management device 100 according to the third invention, the self notification information (trap event) sent from each device to be managed (110E, 111E, 112E, and 113E) is received by the management protocol 505d, this is held within the recording unit 5050 and managed by the SNMP manager 502a, while at the same time based on this trap event, with the processing of the abovementioned item (I), this is displayed on the screen as shown in FIG. 17.

On this display screen when a specified display operation (for example, clicking the device symbol 171) is performed from the input unit 503 by the administrator, the self notification display application 505a opens an event browser window to be described later on the display unit 504, reads the trap event of the device to be managed that corresponds with the device symbol 171 that is clicked as mentioned above from within the trap event that is managed by the SNMP manager 502a, and processing is performed that displays this trap event as character information on the abovementioned event browser.

Figure 20:
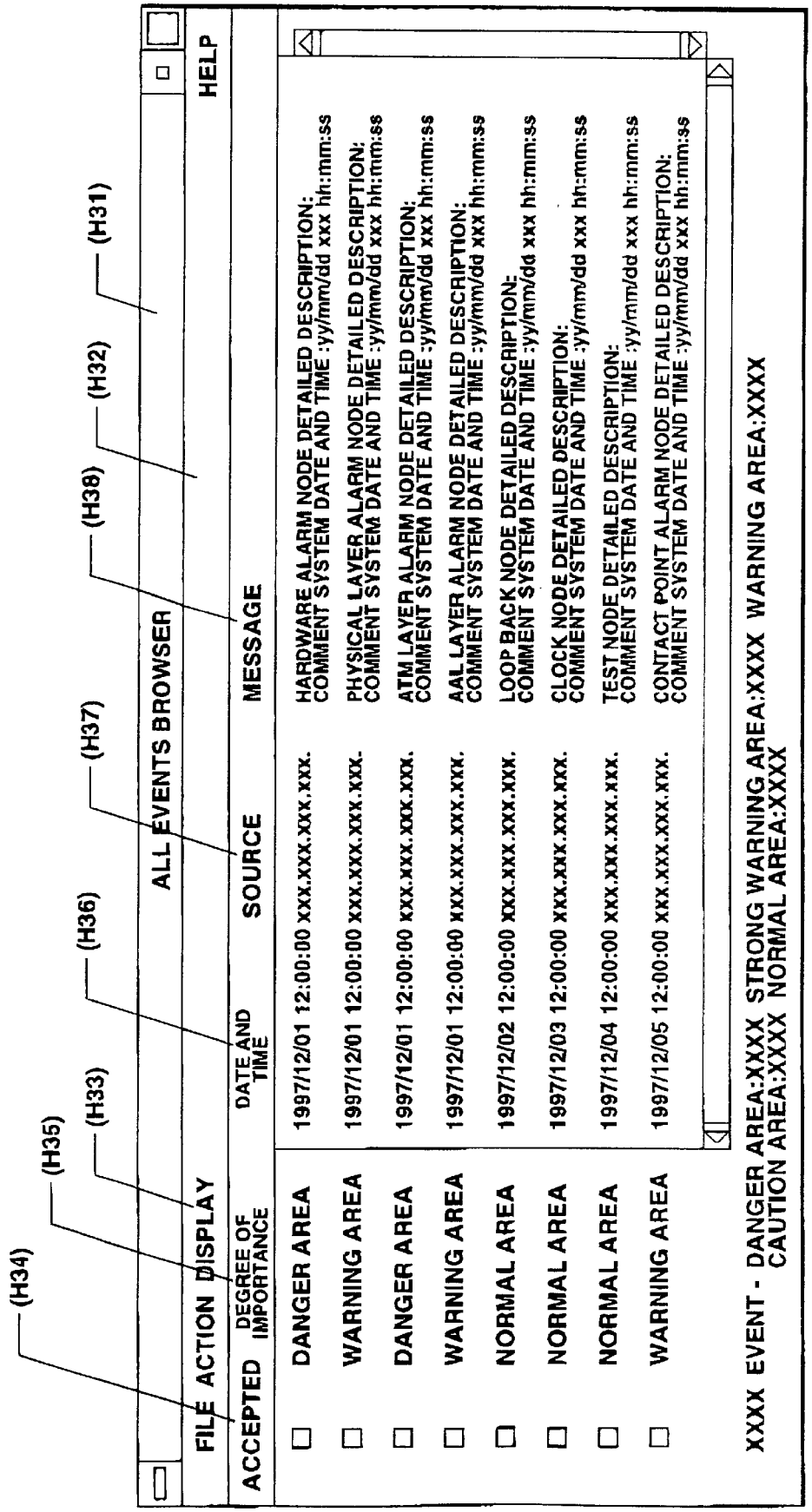
FIG. 20 shows an example of the character display screen of the self notification information of a device to be managed for a network management device according to the third invention.

FIG. 20 shows an example of an event browser display screen supported by the self notification display application 505a. This event browser functions to display characters of the received trap event contents and the screen items and display contents are as follows.

The screen name is displayed in the (H31) title bar. The menu items are displayed in the (H32) menu bar. By clicking within a concerned item in the (H33) menu items, it is possible to display a pull down menu. At the (H34) receiving area, a check mark space is displayed for showing whether or not an event was received. The classes of importance level includes normal area, caution area, warning area, major warning area, danger area, not recognizable, not subject to management, etc. At date and time (H36), the day of the week, date, and time that the event occurred is displayed. At (H37) source, a network object identifier (name of the device to be managed, etc.) for which the event occurred is displayed. At (H38) message, an event description is displayed.

As described above, the trap event from the devices to be managed (110E, 111E, 112E, and 113E) are displayed in the event browser window on the self notification display application 505a.

To display a trap event on this event browser window, it is necessary to set in advance as an event log message the event ID and its corresponding displayed trap message of the trap event that is subject to display on the event setting screen (or event adding screen). When for the event ID, the event ID corresponding to the trap event defined by the system is set, and for the event log message, the data received by the trap is displayed on the event browser window with the headline part input directly, the position of the data that is subject to display is specified immediately after a $ sign.

Following, we will explain an example of setting an event log message and the displayed contents while referring to FIGS. 21 through 23.

First, in the event displayed in the window shown in FIG. 20, for hardware alarms (temperature error notification=TemperatureAlarm), there are the following items, node detail description (comment (maximum of 35 full width characters) (NodeDescr)), the system data and time (yy/mm/dd xxx hh:mm:ss (NodeDateTime)), a status type alarm monitoring point ID (xxxxxxxx (8 hexadecimal digits) (LaImObsId)), a status type warning fault name (warning name corresponding to the status type warning monitoring point ID (maximum of 35 full width characters) (LaImName)), a status type warning fault status (1: fault repair notification, 2: fault occurrence notification)((1: normal (LaImStatus=normal (1)), 2: error (LaImStatus=alarm (2)), and these can be displayed, for example, in the form shown in FIG. 21(a).

For physical layer alarms (LOS communication=LosAlarm), there are the following items, node detail description (comment (maximum of 35 full width characters) (NodeDescr)), the system data and time (yy/mm/dd xxx hh:mm:ss (NodeDateTime)), a status type alarm monitoring point ID (xxxxxxxx (8 hexadecimal digits) (LaImObsId)), a status type warning fault name (warning name corresponding to the status type warning monitoring point ID (maximum of 35 full width characters) (LaImName)), a status type warning fault status (1: fault repair notification, 2: fault occurrence notification)((1: normal (LaImStatus=normal (1)), 2: error (LaImStatus=alarm (2)), and an interface detail description (comment (maximum of 128 full width characters) (IfDefDescr)) and these can be displayed, for example, in the form shown in FIG. 21(b).

For AAL layer alarms (AALLRX loss cell count notification=AallRxLostCellsAlarm), there are the following items, node detail description (comment (maximum of 35 full width characters) (NodeDescr)), the system data and time (yy/mm/dd xxx hh:mm:ss (NodeDateTime)), a gauge type alarm monitoring point ID (xxxxxxxx (8 hexadecimal digits) (GaImobsld)), a gauge type warning fault name (warning name corresponding to the gauge type warning monitoring point ID (maximum of 35 full width characters) (GaImName)), a gauge type warning fault status (1: fault repair notification, 2: minor occurrence notification, 3: major occurrence notification) (1: normal (GaImStatus=normal (1)), 2: minor (GaImStatus=minor (2)), 3: major (GaImStatus=major (3))), and an interface detail description (comment (maximum of 128 full width characters) (IfDefDescr)), and these can be displayed, for example, in the form shown in FIG. 21(c).

For AAL layer alarms (AAL1RX erroneously distributed cell count notification=Aal1RxDstErrCellsAlarm), there are the following items, node detail description (comment (maximum of 35 full width characters) (NodeDescr)), the system data and time (yy/mm/dd xxx hh:mm:ss (NodeDateTime)), a gauge type alarm monitoring point ID (xxxxxxxx (8 hexadecimal digits) (GaImObsld)), a gauge type warning fault name (warning name corresponding to the gauge type warning monitoring point ID (maximum of 35 full width characters) (GaImName)), and a gauge type warning fault status (1: fault repair notification, 2: minor occurrence notification, 3: major occurrence notification) (1: normal (GaImStatus=normal (1)), 2: minor (GaImStatus=minor (2)), 3: major (GaImStatus=major (3))), and these can be displayed, for example, in the form shown in FIG. 22(a).

For loop back (auto loop back execution notification=LpbkAutoSetNotice), there are the following items, node detail description (comment (maximum of 35 full width characters) (NodeDescr)), the system data and time (yy/mm/dd xxx hh:mm:ss (NodeDateTime)), a switch loop back interface number (an interface number corresponding with the trunk line set for the switch loop back (LpbkSwIfIndex)), and a switch loop back execution reason (1: manual operation, 2: LOS detection, 3: LOF detection, 4: LAIS detection, 5: LRDI detection, 6: LOP detection, 7: LCD detection, 8: PAIS detection, 9: PRDI detection (LpbkSwReason))), and these can be displayed, for example, in the form shown in FIG. 22(b).

For loop back (auto loop back release execution notification=LpbkAutoRelNotice), there are the following items, node detail description (comment (maximum of 35 full width characters) (NodeDescr)), the system data and time (yy/mm/dd xxx hh:mm:ss (NodeDateTime)), and a switch loop back interface number (an interface number corresponding with the trunk line set for the switch loop back (LpbkSwIfIndex)), and these can be displayed, for example, in the form shown in FIG. 22(c).

For loop back (interface loop back release notification=LpbkIfRelNotice), there are the following items, node detail description (comment (maximum of 35 full width characters) (NodeDescr)), the system data and time (yy/mm/dd xxx hh:mm:ss (NodeDateTime)), a switch loop back interface number (an interface number corresponding with the trunk line set for the switch loop back (LpbkSwIfIndex)), and various types of switch loop back items, and these can be displayed, for example, in the form shown in FIG. 23(a).

For the clock (clock extraction change notification=ClkLinChangeNotice), there are the following items, node detail description (comment (maximum of 35 full width characters) (NodeDescr)) and the system data and time (yy/mm/dd xxx hh:mm:ss (NodeDateTime)), and these can be displayed, for example, in the form shown in FIG. 23(b).

For testing (test OAM cell receive notification=TestCsRcvNotice), there are the following items, node detail description (comment (maximum of 35 full width characters) (NodeDescr)) and the system data and time (yy/mm/dd xxx hh:mm:ss (NodeDateTime)), and these can be displayed, for example, in the form shown in FIG. 23(c).

For contact point alarms (contact point alarm notification=CctBoxAlarm), there are the following items, node detail description (comment (maximum of 35 full width characters) (NodeDescr)), the system data and time (yy/mm/dd xxx hh:mm:ss (NodeDateTime)), a contact point box alarm status (1: normal, 2: contact point warning occurring) (overall contact point alarm status for connected contact point box, 1: normal (LaImStatus=normal (1)), 2: contact point alarm occurring (LaImStatus=alarm (2)), a contact point alarm name (contact point alarm name (maximum of 20 full width characters) (CctBoxPntAImName)), and a contact point alarm status (1: normal, 2: contact point alarm status) (alarm status of the concerned contact point in the contact point box (CctBoxPntNumIndex)) 1: normal (LaImStatus normal (1)) 2: contact point alarm occurring (LaImStatus=alarm (2)) and these can be displayed, for example, in the form shown in FIG. 23(d).

The above FIGS. 20 through 23, of the trap event display functions supported by the SNMP manager 502a of the network management device 100, are display examples when trap events are displayed as character information.

Next, we will explain the processing function of the abovementioned item (III).

The network management device 100 according to the third invention, besides having the trap event display function described above, also has a structure/status display function that displays information relating to the structure and status of the devices to be managed (110E, 111E, 112E, and 113E). The structure mentioned here means, for example, the structure of the interface slot or each user port therein on the front of the box of the device to be managed (110E, 111E, 112E, and 113E), and status means, for example, the operating status of the internal substrate connected to the abovementioned interface slot, the power supply status, or the alarm occurrence status. The screen display application 505b is responsible for the processing related to this structure/status display function.

Following, we will explain the structure/status display processing operation relating to the devices to be managed (110E, 111E, 112E, and 113E) for this network management device 100. The structure/status display processing at the screen display application 505b of the network management device 100 can be, for example, started according to a specified structure/status confirmation operation from the input unit 503.

One possible example of this structure/status confirmation operation would be to view the color of the device symbol 171 corresponding to each device to be managed (110E, 111E, 112E, and 113E) on the "IPMaP" screen as shown in FIG. 17, for example, and after confirming the operation status thereof, to perform the operation of double clicking within the area of a device symbol 171 corresponding to a specified device to be managed for which a color is displayed for fault occurrence.

As another example of this structure/status confirmation operation, the administrator could directly input the IP address of the device to be managed that is to be confirmed using the input unit 503, and then perform the operation of giving instructions to start the display processing.

By doing this, for example, if of the devices to be managed (110E, 111E, 112E, and 113E) on the abovementioned "IPMaP" screen, for example, the device symbol 171 corresponding to 110E is double clicked, the screen display application 505b uses the SNMP manager 502a and the management protocol 505d to make a request to the SNMP agent 525b of the concerned device to be managed 110E for information relating to the structure and status of the device to be managed 110E.

In this case, the SNMP manager 502a has a table for which an IP address was allocated in advance for each device to be managed (110E, 111E, 112E, and 113E), and based on this table, reads the IP address of the device to be managed 110E selected this time, for example, and then accesses the device to be managed 100E using this IP address.

With this request sending destination device to be managed 100E, using the management protocol 526d, the request from the abovementioned screen display application 505b is received, and the concerned request is transferred to the SNMP agent 525b. The SNMP agent 525b, by receiving this request, reads structure/status management information 526b (information reflecting contents such as the externally connected slot structure for the concerned device, the operating status of the internal substrate, the power supply status, or the alarm occurrence status) relating to the concerned device from the recording unit 526, and performs a response process of sending the information 526b to the network management device 100 using the management protocol 526d.

In relation to this, with the network management device 100, using the management protocol 505d, receives the abovementioned structure/status management information 526b sent as a response from the device to be managed 100E, and stores in the recording unit 52 this information 526b using the SNMP manager 502a. Furthermore, the screen display application 505b executes drawing processing to the display unit 504 based on the abovementioned structure/status management information 526b stored by the SNMP manager 502a.

For this drawing process, the screen display application 505b draws on the display unit 504 an actual device image as is of the concerned device to be managed 100E for the image showing the structure and status corresponding to each item in the structure/status management information 526b fetched by the device to be managed 100E.

Generally, regarding the structure of the actual device of the device to be managed (110E, 111E, 112E, and 113E), besides having an interface slot, etc. provided on the front of the box, for example, display elements, etc. are provided that display the operating status of the internal substrate connected to this interface slot, etc., the power supply status, or the alarm occurrence status, etc. The abovementioned actual device image means the image description that can be known the same as when viewing the actual device structure of these devices to be managed (110E, 111E, 112E, and 113E) from the actual box front.

The network management device 100, after drawing an actual device image for the structure and status of the device to be managed 100E as noted above, using the same process, regularly fetches structure/status management information 526bc of the device to be managed 100E.

On the other hand, with the device to be managed 100E, in response to a request to fetch information regularly from the network management device 100, structure/status management information 526b that reflects the newest contents based on the monitoring results of the status monitoring unit 525a is returned.

Furthermore, with the network management device 100, the screen display application 505b uses the regularly fetched abovementioned structure/status management information 526b, updates the past contents with the newest contents, and continues drawing using the abovementioned actual device image.

As a result, even if there is a change in the structure or status of the device to be managed 100E, the latest structure and status relating to the device to be managed 100E is always drawn as an actual device. Thus, the administrator can have absolutely the same awareness as when the latest structure and status of the device to be managed 100E actually becomes the concerned device to be managed and the administrator views the front of the box thereof, so it is possible to progress smoothly with maintenance and management tasks for the concerned device to be managed 100E.

With a similar operation, it is obvious that it is possible to display an actual device image by fetching the structure/status management information 526b of the concerned device for other devices to be managed (111E, 112E, and 113E) as well.

Next, we will explain a specific display example of a drawing image relating to the structure and status of a device to be managed (110E, 111E, 112E, and 113E) for the network management device 100 according to the third invention.

Figure 24:
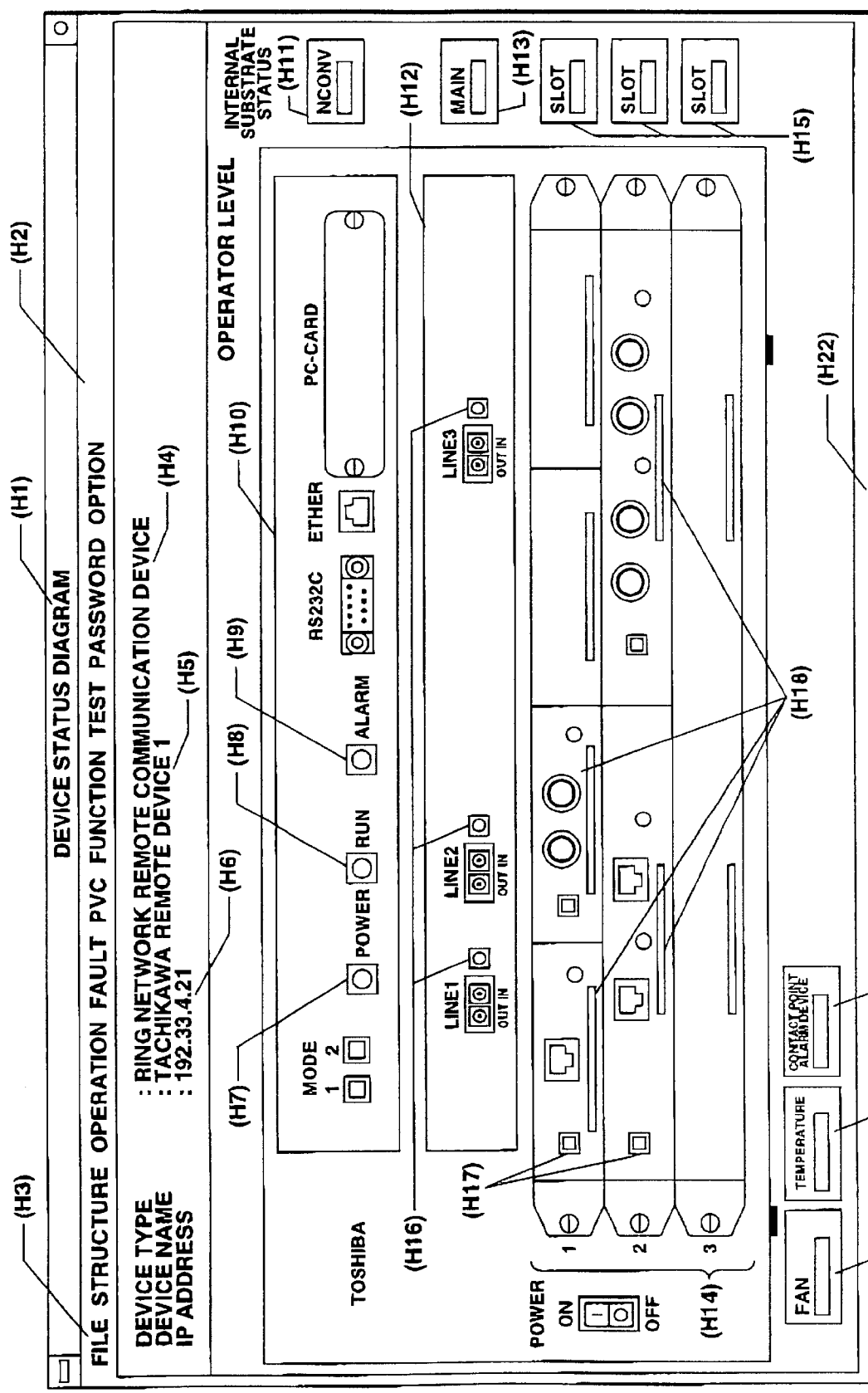
FIG. 24 shows an example of a structure/status display screen of a device to be managed for a network management device according to the third invention.
Figure 25:
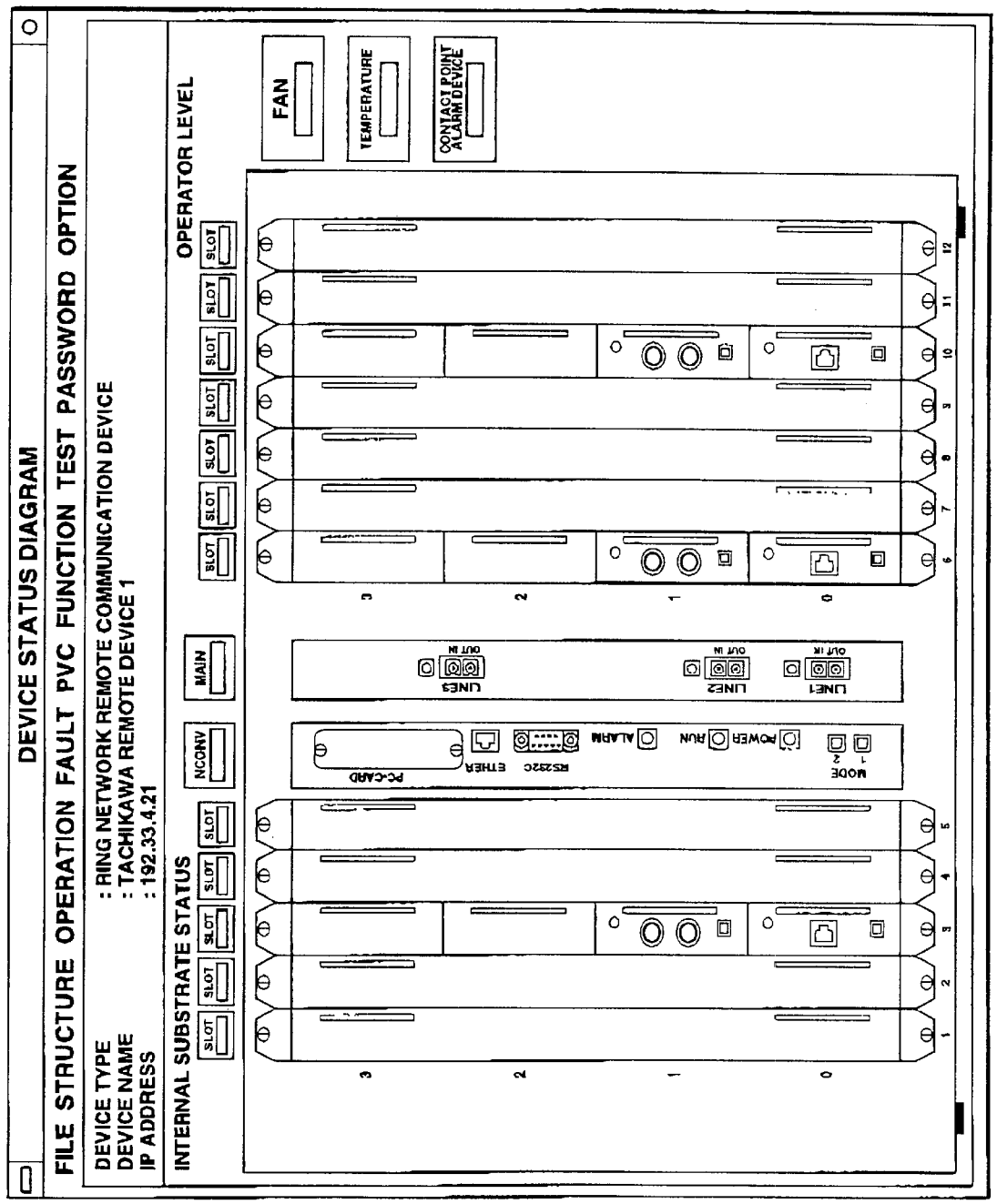
FIG. 25 shows another example of a structure/status display screen of a device to be managed for a network management device according to the third invention.

FIGS. 24 and 25 show examples of display of the structure and status of devices to be managed on the display unit 504 for the network management device 100. Specifically, FIG. 24 is an example of display when the device to be managed is a three slot version control ATM device, and FIG. 25 is an example of display when the device to be managed is a twelve slot version control ATM device.

As can be seen from these figures, for both the three slot version control ATM device and the twelve slot version control ATM device, the lighting status, etc. of the display elements that display the structure of the interface slot, etc., the operating status of the internal substrate connected to these interface slot, etc., the power supply status, or the alarm occurrence status, etc. is drawn the same way as the actual device image.

The screen display application 505b fetches

Structure information (sysObjectID, BrdBaseOperStatus, BrdBaseType, BrdIfOperStatus, BrdIfType) and Status information (BoardAlarmStatus, BrdBaseOperStatus, BrdBaseAlarmStatus, IndLinAlmLed, IfAlarmStatus, IndIfLed, LaImStatus) to be described later from the device to be managed (110E, 111E, 112E, and 113E), and according to rules such as those described below, performs drawing processing on the display unit 504 as an image of the contents such as are shown in FIGS. 24 and 25.

Here, for example, listing the display screen shown in FIG. 24 as an example, we will explain the screen structure and drawing rules. In FIG. 24, the numbers in parentheses attached by extended lines show each display item of the concerned display screen.

Of the display items (H1) through (H22) in this display screen, the screen name is displayed on the (H1) Title bar. The top level menu items are displayed on the (H2) Menu bar. A breakdown of the (H3) Top level menu items: (operation) includes multiple items such as file, structure, operation, etc., and by clicking each item, a pull down menu is displayed. The device type of the selected device is displayed in (H4) Device type. In this example, a ring network remote communication device is selected, but besides this, there are also a ring network center communication device, a star type connection remote device, etc. These device types are all fetched by (sysObjectID).

The device name of the selected device (in this example, remote device no. 1) is displayed in (H5) Device name: (display/operate) (NodeDescr). The maximum length of the label name character string is 32 full width characters (64 half width characters). If the character string is of a length that exceeds the screen width, a caret is displayed by a click in this display area, and it is possible to scroll horizontally for the character string using the arrow key. The IP address of the selected device is displayed in (H6) IP address. This IP address is fetched from the start source application.

The main power supply operating status is displayed by a color in (H7) POWER. For example, green is displayed for normal (IndPsStatus=normal (1) Normal), red is displayed for error (IndPsStatus=abnormal (2) Error), and blue is displayed for not recognizable (IndPsStatus=unknown (−1) Unknown).

The system running status is displayed by color in (H8) RUN (RUN-LED status). For example, green is displayed when blinking (Normal) (IndRunLed=ledGrnBlinkO (4) Blinking 0), red is displayed when in run not possible status (IndRunLed=ledOff(1), ledGrn (2) CPU stop status), and blue is displayed when not recognizable (IndRunLed=unknown (−1) Unknown).

The device status is displayed by color in (H9) ALARM (ALM-LED status). For example, green is displayed during normal operation (IndAlmLed=ledoff (1) OFF status), red is displayed when blinking (IndAlmLed=ledRedBlinkO (5) ledRedBlink (7) ledRedBlink5 (15) Blinking status), yellow is displayed when an error has occurred (IndAlmLed=ledRedOn (3) ON status), and blue is displayed when not recognizable (IndAlmLed=unknown (−1) Unknown).

A dotted line rectangle is overlapped over a device front image to represent that an NCONV substrate exists internally on (H10) NCONV substrate border: (Area within border: Operation). By clicking in the dotted line rectangle, a bold line rectangle appears that shows this is selected (FIG. 32).

The internal substrate status is displayed by color in (H11) NCONV substrate status. For example, green is displayed when normal (BoardAlarmStatus.n=normal (1) Normal), yellow is displayed when there is an alarm (BoardAlarmStatus.n=minAlm (2) Alarm), red is displayed when there is an error (BoardAlarmStatus.n=majAlm (3) Error), and blue is displayed when not recognizable (BoardAlarmStatus.n=unknown (−1) Unknown) and (BoardType=nconv (2)).

In the conditional expressions noted above, "n" means (n=instance index=index of entry applicable to NCONV substrate).

A dotted line rectangle is overlapped on a device front image to show that a MAIN substrate exists internally on (H12) MAIN substrate border: (Area in border: Operation). By clicking in the dotted line rectangle, a bold line rectangle appears that shows this is selected (FIG. 32). When there is a three slot image, when the device type is a star type connection remote communication device, there will be no display of the line interface image and LED image.

The internal substrate status is displayed by color in (H13) MAIN substrate status. For example, green is displayed when normal (BoardAlarmStatus.n=normal (1) Normal), yellow is displayed when there is an alarm (BoardAlarmStatus.n=minAlm (2) Alarm), red is displayed when there is an error (BoardAlarmStatus.n=majAlm (3) Error), and blue is displayed when not recognizable (BoardAlarmStatus.n=unknown (−1) Unknown) and (BoardType=mainb (1)).

In the conditional expressions noted above, "n" means (n=instance index=index of entry applicable to MAIN substrate).

Figure 26A:
FIGS. 26(a) to 26(c) show a display image of each type of base interface slot introduction substrate.

The base interface image corresponding to the applicable substrate mounting status or operating status is displayed in (H14) Base interface slot insertion substrate image: (display/operate). For example, when there is no substrate inserted in the concerned slot, as shown in FIG. 26(a), an image of the base interface dummy substrate front is displayed. The status judgment in this case is performed by referencing. (BrdBaseOperStatus.p=(3) H/W not recognizable) or (BrdBaseOperStatus.p=(−1) Unknown). However, in the abovementioned conditional expression, "p" means (p=instance index=BrdBaseIndex=base interface slot number). Also, after the concerned image is displayed, the next slot status is fetched.

When the operation status is incorporation status or cut off status, an image of the insertion substrate front is displayed. Judgments for each status in this case are performed by referencing (BrdBaseOperStatus.p=(1) Incorporation status) or (BrdBaseOperStatus.p=(2) Cut off status). However, in the abovementioned conditional expression, "p" means (p=instance index=BrdBaseIndex=base interface slot number).

Figure 26B:
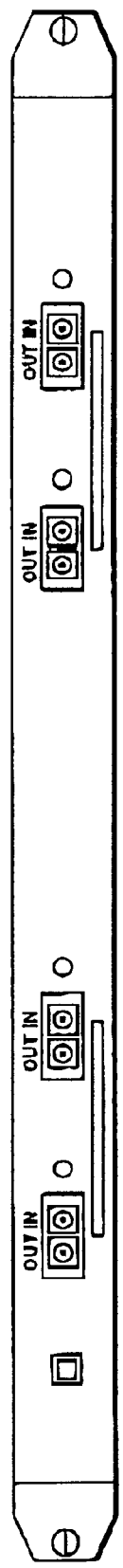
Figure 26C:
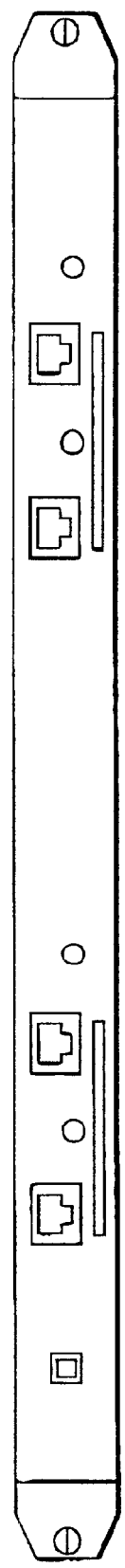

Also, when the operating status is incorporation status or cut off status, and when the following conditions are met, the user port image is also displayed on the base interface image. For example, when (BrdBaseType.p=sd151 (4)), an image is displayed as shown in FIG. 26(b). Also, when (BrdBaseType.p=sd15u (5)), an image is displayed as shown in FIG. 26(c).

Figure 27A:
FIGS. 27(a) to 27(e) show a display image of other types of base interface slot introduction substrate.
Figure 27B:
Figure 27C:
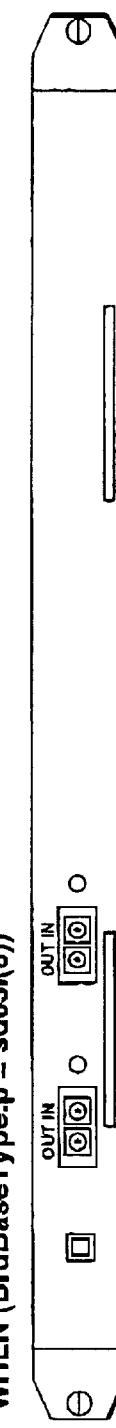
Figure 27D:
Figure 27E:

Similarly, when (BrdBaseType.p=is151 (6)), an image is displayed as shown in FIG. 27(a). When (BrdBaseType.p=is15u (7)), an image is displayed as shown in FIG. 27(b). When (BrdBaseType.p=sd631 (8)), an image is displayed as shown in FIG. 27(c). When (BrdBaseType.p=sd63u (9)), an image is displayed as shown in FIG. 27(d). When (BrdBaseType.p=cr63 (10)), an image is displayed as shown in FIG. 27(e).

Figure 28A:
FIGS. 28(a) to 28(c) show a display image of yet other types of base interface slot introduction substrate.
Figure 28B:

Furthermore, when (BrdBaseType.p=ifba (1)), (BrdBaseType.p=al1b (2)), or (BrdBaseType.p=brdNull (3)), a base interface image is displayed as shown in FIG. 28(a), and an interface substrate image is displayed on top of that. Also, when (BrdBaseType.p=Other than the above), an interface image is displayed as shown in FIG. 28(b). After display, the next slot status is fetched.

Figure 28C:
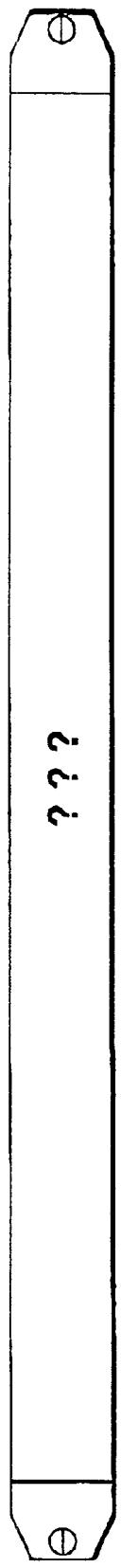

On the other hand, when the operating status is other than incorporation, cut off, hardware not recognized, or unknown, an interface image is displayed as shown in FIG. 28(c). Status judgments in this case are performed while referencing the fact that the status is other than (BrdBaseOperStatus.p=(1), (2), (3), (−1)). Also, after display of the concerned image, the next slot status is fetched.

A lamp image (does not actually exist) is displayed on (H15) slot insertion substrate status, and the substrate status is represented by a color. Specifically, the status of the base substrate and interface substrate housed in each slot is taken, and a color for the highest fault level is displayed.

As an example of display colors for the base substrate status, for example, green is displayed when normal status (BrdBaseOperStatus.p=up (1) Incorporation status) and (BrdBaseAlarmStatus.p=normal (1) Normal), yellow is displayed when there is alarm status (BrdBaseAlarmStatus.p=minAlm (2) Alarm status) and (BrdBaseOperStatus.p=up (1) Incorporation status), red is displayed when in error status (BrdBaseAlarmStatus.p=majAlm (3) Error status) and (BrdBaseOperStatus.p=up (1) Incorporation status), and orange is displayed when in stopped status (BrdBaseOperStatus.p=down (2) Stopped status), and there is no display when in unmounted status (brdBaseOperStatus.p=up (3) Hardware not recognized).

In the conditional expressions noted above, "p" means (p=instance index=BrdBaseIndex=base interface slot number).

Similarly, as an example of display color relating to the interface substrate status, for example, green is displayed when normal status (BrdBaseOperStatus.q=up (1) Incorporation status) and (BrdBaseAlarmStatus.q=normal (1) Normal), yellow is displayed when there is alarm status (BrdBaseAlarmStatus.q=minAlm (2) Alarm status) and (BrdBaseOperStatus.q=up (1) Incorporation status), red is displayed when there is error status (BrdBaseAlarmStatus.q=majAlm (3) Error status) and (BrdBaseOperStatus.q=up (1) Incorporation status), orange is displayed when there is stopped status (BrdBaseOperStatus.q=down (2) Stopped status), and there is no display when there is unmounted status (BrdBaseOperStatus.q=up (3) Hardware not recognized).

In the conditional expressions noted above, "q" means (q=instance index=BrdIfIndex=interface substrate slot number).

Each status of the trunk line transmission line interface port (1 to 2) and network management device interface port (3) is displayed by color in (H16) User ports 0 to 3: (display/operate). Here, the display image of each port is composed from a connector image that imitates the connector and an LED image that imitates the adjacent LED. For the concerned display item, a display color change process is performed according to the status of each applicable port on the abovementioned LED image. Thus, for example, green is displayed during operation (IndLinAlmLed.q=ledGrn (2) Operating), red is displayed when there is a line fault (IndLinAlmLed.q=ledRed (3) Line error), orange is displayed when there is stopped status (IndLinAlmLed.q=ledoff (1), ledRedBlink0 (5) Stopped status), and blue is displayed when unknown (IndLinAlmLed.q=unknown (−1) Unknown). In the abovementioned conditional expressions, "q" means (q=instance index=IfIndex=user port number). Furthermore, by clicking in the drawing area rectangle in relation to the concerned display item, a bold border line is displayed showing that a selection has been made in relation to the connector image.

The base interface type (BrdBaseType.n) is confirmed and then an interface substrate image is placed on the base interface slot image and this is displayed in (H17) Interface substrate X0 to X3 (X=Base interface slot number): (display/operate). In the abovementioned conditional expressions, "n" means (n=interface index=BrdBaseIndex=base substrate slot number).

As interface substrate images for this display item, there are the types shown in FIGS. 29 and 30. Based on each of the conditions as described below, a user port image is placed on top of a base interface image for display. Also, in the following conditional expressions, "m" means (m=instance index=BrdIfIndex=interface substrate slot number).

Figure 29A:
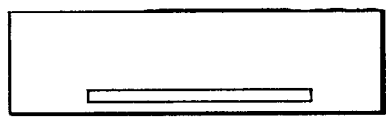
FIGS. 29(a) to 29(e) show a display image of each type of interface substrate.

First, when there is no substrate mounted in the concerned slot, as shown in FIG. 29(a), an image of a base interface dummy substrate front is displayed. Status judgment for this case is performed while referencing (BrdIfOperStatus.m=(3) Hardware not recognized) or (BrdIfOperStatus.m=(−1) Unknown).

Figure 29B:
Figure 29C:
Figure 29D:
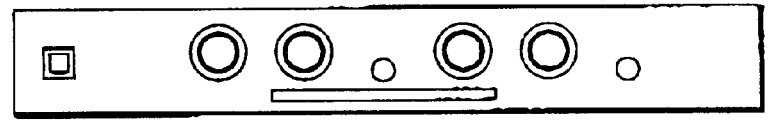

When the operating status is incorporation status or cut off status, an image of the insertion substrate front is displayed. Judgment of each status in this case is performed while referencing (BrdIfOperStatus.p=(1) Incorporation status) or (BrdIfOperStatus.p=(2) Cut off status). Also, when the operating status is incorporation status or cut off status and the following conditions have been met, a line image is placed on the interface substrate image and displayed. For example, when (BrdIfType.m=ifea (1)), an image is displayed as shown in FIG. 29(b). When (BrdIfType.m=ifeb (2)), an image is displayed as shown in FIG. 29(c). When (BrdIfType.m=if63hsd (3)), an image is displayed as shown in FIG. 29(d).

Figure 29E:
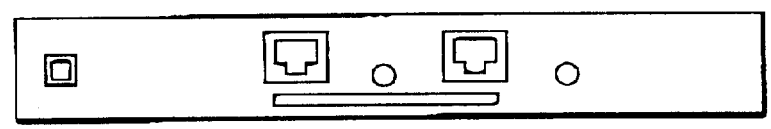

Also, when (BrdIfType.m=if4wtp (4)), an image is displayed as shown in FIG. 29(e).

Similarly, when (BrdIfType.m=a150ss (5)), an image is displayed as shown in FIG. 30(a), and when (BrdIfType.m=a150mm (6)), an image is displayed as shown in FIG. 30(b).

When (BrdIfType.m=a150sl (7)), an image is displayed as shown in FIG. 30(c). When (BrdIfType.m=clk (8)), an image is displayed as shown in FIG. 30(d). When (BrdIfType.m=clk1 (9)), an image is displayed as shown in FIG. 30(e). When (BrdIfType.m=clk2 (10)), an image is displayed as shown in FIG. 30(f).

Also, when (BrdIfType.m=Other than the above), an image is displayed as shown in FIG. 30(g). In this case, no user port image is displayed. On the other hand, when the operation status is other than incorporation, cut off, hardware not recognized, or unknown, an interface substrate image as shown in FIG. 30(h) is displayed. Status judgment in this case is performed while referencing the fact that status is other than (BrdIfOperStatus.m=(1), (2), (3), (−1)).

Figure 31A:
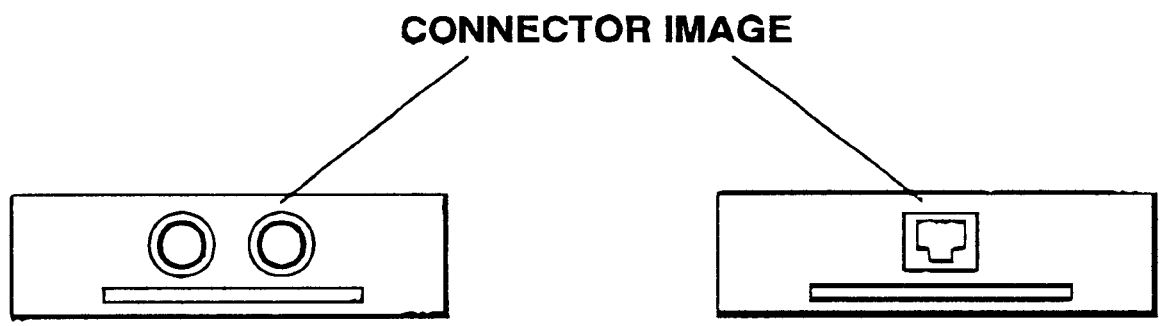
FIGS. 31(a) and 31(b) show a display image of a user port.
Figure 31B:
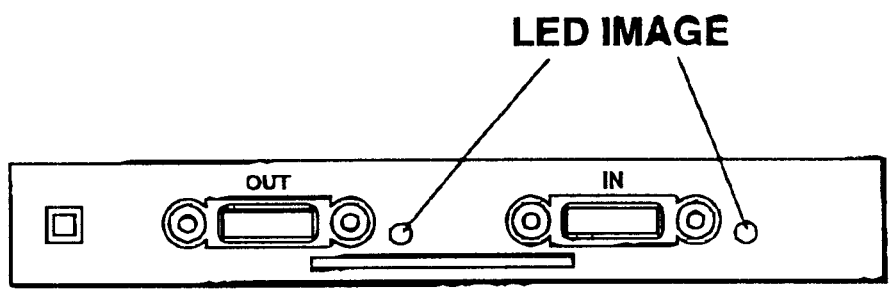

A color is displayed according to the interface substrate type in (H18) User port X0 to X3 (X=base interface slot number): (display/operate). Here, the display image for each port is composed from a connector image as shown in FIG. 31(a) and an LED image as shown in FIG. 31(b).

For the applicable display item, when (BrdIfType.m=ifea (1) or BrdIfType.m=ifeb (2)) the interface substrate type is represented as a line status color. This color display is handled by changing the connector color as noted below on the connector image shown in FIG. 31(a). For example, green is displayed when normal status (IfAlarmStatus.q= normal (1) Start status), red is displayed when there is error status (IfAlarmStatus.q=majAlm (3) major alarm level), yellow is displayed when there is stopped status (IfAlarmStatus.q=minAlm (2) minor alarm level), and blue is displayed when there is stopped status (IfAlarmStatus.q= unknown (−1) Unknown status).

In the abovementioned conditional expressions, "q" means (q=instance index=IfIndex=user port number).

Also, for the concerned display item, when the interface substrate type is other than (BrdIfType.m=ifea (1) or BrdIfType.m=ifeb (2)), LED status is shown by color. This color display is handled by changing the LED color as noted below on the LED image shown in FIG. 31(b). For example, green is displayed when there is normal status (IndIfLed.q= ledGrn (2) Start status), red is displayed when there is error status (IndIfLed.q=ledRed (3) Alarm status), blue is displayed when there is stopped status (IndIfLed.q=unknown (−1) Unknown status), and orange is displayed when there is stopped status (IndIfLed.q=ledOff (1), ledGrnBlink0 (4) Stopped status). In the abovementioned conditional expressions, "a" means (q=instance index=IfIndex=LED index). Furthermore, for the concerned display items as well, by clicking in the drawing area rectangle, a bold border is displayed showing selection for the connector image.

A lamp image (does not actually exist) is displayed in (H19) Fan, and the fan operating status is represented by a color. As an example of display colors for the fan operating status, for example, green is displayed for normal status (LaImStatus.t=normal (1) Normal), red is displayed for error status (LaImStatus.t=alarm (2) Error), and blue is displayed for not recognized (LaImStatus.t=unknown (−1) Unknown). Furthermore, in the abovementioned conditional expressions, "t" means (t=instance index=LaImObsId=fan alarm information applicable monitor point ID: h01090002)

A lamp image (does not actually exist) is displayed in (H20) Temperature, and the device internal temperature status is represented by a color. As an example of display colors for the temperature status, for example, green is displayed when there is normal status (within rated value range) (LaImStatus.u=normal (1) Normal), red is displayed when there is error status (outside rated value range) (LaImStatus.u=alarm (2) Error), and blue is displayed when not recognized (LaImStatus.u=unknown (−1) Unknown). Furthermore, in the abovementioned conditional expressions, "u" means (u=instance index=LaImObsId= temperature alarm information applicable monitor point ID: h01090000).

A lamp image (does not actually exist) is displayed in (H21) Contact point alarm, and device internal contact point alarm status is represented by colors. As an example of display colors for contact point alarm status, for example, green is displayed for normal status (CctBoxAlmStatus= normal (1) Normal) and (CctBoxConStatus=connect (1) Connect), yellow is displayed when there is alarm status (CctBoxAlmStatus=minAlm (2) Alarm) and (CctBoxConStatus=connect (1) Connect), and red is displayed when there is error status (CctBoxAlmStatus= majAlm (3) Error) and (CctBoxConStatus=connect (1) Connect), and there is no display when not recognized (CctBoxAlmStatus=unknown (−1) Unknown) or (CctBoxConStatus=disconnect (2) Disconnected).

Status is displayed in (H22) Status bar.

As described above, with the network management device 100 according to the third invention, by double clicking a specific device symbol 171 on the display screen shown in FIG. 17, it is possible to display structure/status information relating to the device to be managed corresponding to that device symbol 171 on the display unit 504 as an actual image (FIGS. 24 and 25).

This display control function corresponds to the processing function of item (II) described above. Furthermore, regarding the processing function of item (III), using a method such as inputting from the input unit 503 a specific control instruction after selecting a specific display area on the display screen shown in FIGS. 24 and 25, there is also support of a function that can implement operation, testing, etc. for structures displayed in the selected area.

We will explain the method of operating this function while referring to FIG. 32. FIG. 32 shows an image of the selection operation when, for example, on the device structure display screen shown in FIG. 24, a display area of specified display items among the display items (H1) through (H22) is selected, and operation, testing, etc. control instructions regarding the structure of the selected display area display items are given.

In FIG. 32(a), the initial state, specifically a state when the display area is not selected, is shown. In this state, by clicking after moving the mouse pointer to the concerned display area, the status changes to selected status. At this time, to see that the concerned display area is in a selected state, as shown in FIG. 32(b), for example, a bold border is displayed for the concerned display area. Specifically, FIG. 32(b) shows a state where the display item (H10) NCONV substrate border line on the device structure display screen of FIG. 24 is selected.

The system is such that multiple selections can be made for each display item of the (H14) Substrate image and (H18) User port image can be made on this device structure display screen. Also, once a selection operation has been performed in terms of the selection status on this device structure display screen some item is always in a selected state.

Specifically, for example, for selection of the (H14) substrate image, first, the obtained interface substrate slot number is X0 (note that X corresponds to the base interface slot number). If the obtained interface substrate type is mounted as one user port for one interface substrate, the next interface substrate slot number obtained is the user port number adjacent to the left. Also, if the type is mounted as two user ports for one interface substrate, the next interface substrate slot number obtained is X2.

When the obtained interface substrate type is (BrdIfType.m=other (−1) and undefined), as with the case when mounted as one user port on one interface substrate, the next interface substrate slot number obtained is the user port number adjacent to the left. Specifically, for (BrdIfType.m=other (−1) and undefined), when the interface substrate type obtained by interface substrate slot number X0 is mounted as one user port for one interface substrate, the next interface substrate slot number obtained is X1. When the interface substrate type obtained by interface substrate slot number X1 is mounted as one user port on one interface substrate, the next interface substrate slot number obtained is X2. When the interface substrate type obtained by interface substrate slot number X2 is mounted as one user port on one interface substrate, the next interface substrate slot number obtained is X3.

FIG. 32(c) shows an example of user port selection according to the abovementioned rules, and specifically shows a state where the (H18) User port display item is selected.

When the (H10) NCONV substrate border line display line is selected as in FIG. 32(b), by inputting from the input unit 503 ON or OFF control instructions, having also selected the (H7) POWER display item in the concerned item area, for example, it is possible to realize ON/OFF control for the concerned device to be managed. Similarly, when the (H18) User port display item in FIG. 32(c) is selected or when another display item is selected, it is possible to perform control such as operation or testing, etc. in relation to the structure corresponding to the concerned display item.

Furthermore, in FIGS. 24 and 26 through 32, we explained examples of display processing and display image and selection operations for structure/status management information when the device to be managed is a three slot version control ATM device, but it is obvious that this display processing and display image and selection operations can be similarly used when the subject is the twelve slot version control ATM device shown in FIG. 25 as well.

As explained above, with the third invention, for a network management device, while making an icon of the device to be managed and displaying this on a display screen, based on the self notification from the device to be managed, the system is such that a color is reflected on the icon of the device to be managed that is the source of the self notification, the color corresponding to occurrence or repair of a fault of the concerned device to be managed, so the administrator can of course recognize the occurrence of a fault at the device to be managed from the display contents on the abovementioned display screen, but can also recognize as appropriate when the fault has been repaired, so that network administration can be performed efficiently.

Also, with the third invention, for a network management device, information relating to the structure of the device to be managed as well as the status when this structure is prerequisite is fetched from the device to be managed, and based on this fetched information, the system is such that an image of the actual device itself showing the structure and status of the device to be managed that is the fetching source is displayed on the display screen, so the administrator can accurately recognize the structure and status of the device to be managed from the display contents on the abovementioned display screen with the same precision as when becoming an actual device, making it possible to prevent confusion about maintenance and management tasks.

Also, with the third invention, for a network management device, the system is such that device to be managed structure information and status information is regularly fetched from the device to be managed, and changes are reflected on the abovementioned display screen when there are changes compared to the previously fetched contents, so the administrator, by viewing these display contents, can understand as necessary the changes in structure and status of the device to be managed.

Figure 33:
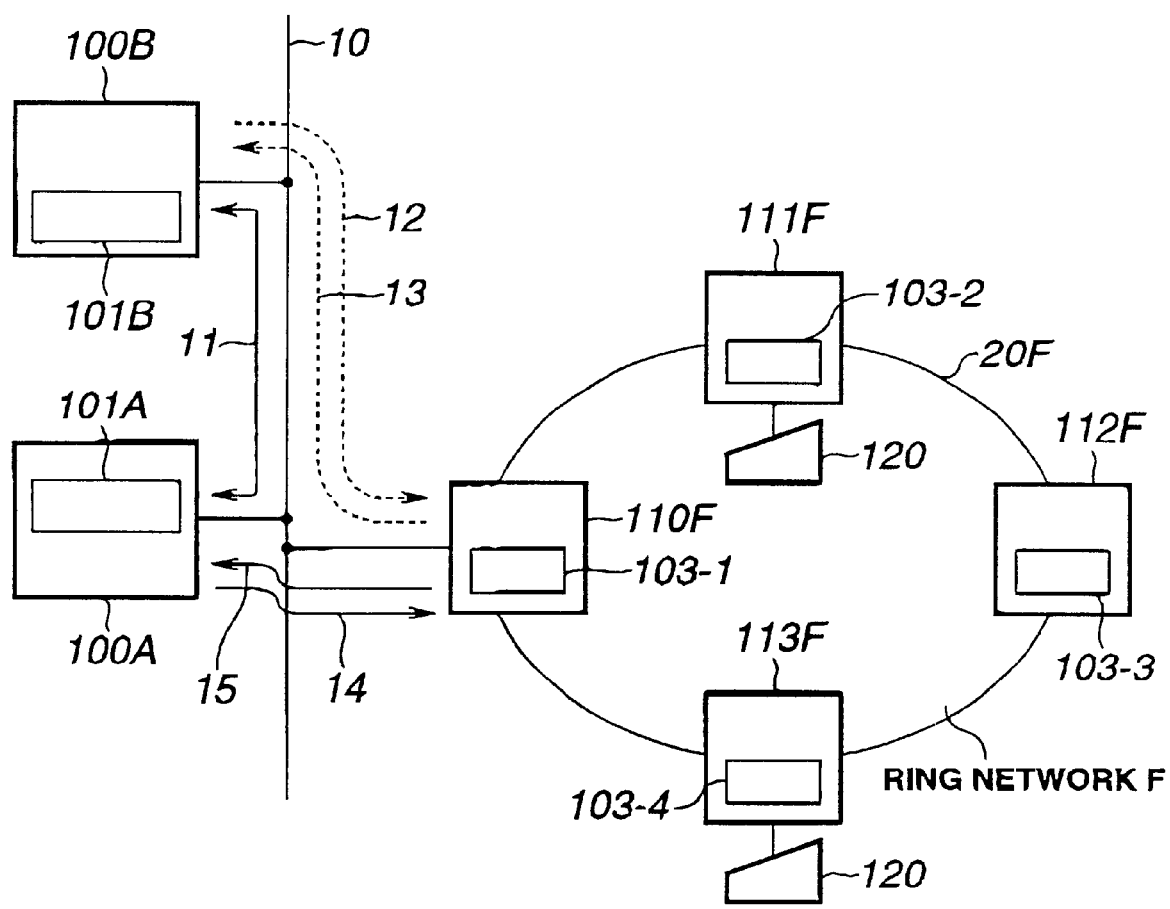
FIG. 33 is an overall structural diagram of an ATM network system according to the fourth invention.

Next, we will explain the fourth invention. FIG. 33 is a schematic diagram showing the overall structure of an ATM network system according to the fourth invention. A network management device 110A and 100B are provided on this ATM communication system to manage the devices to be managed 110F, 111F, 112F, and 113F within the ring network F.

The network management devices 100A and 100B are connected to each other via the Ethernet 10, and one of them operates as the current use system while the other operates as a spare system.

On one hand, the ring network F that is subject to management by the network management devices 100A and 100B is composed from the devices to be managed 110F, 111F, 112F, and 113F that are connected in ring form by the transmission line 20F, and this is connected to the Ethernet 10 via the device to be managed 110F.

Devices to be managed 110F, 111F, 112F, and 113F, when a fault occurs or when a fault is repaired in the concerned device, have a self notification function that notifies either the network management device 100A or 100B via the transmission line 20F and the Ethernet 10 with information indicating this status (fault management information).

On the other hand, the network management devices 100A and 100B receive fault management information self notified from the devices to be managed 110F, 111F, 112F, and 113F, and have a function that performs management of each of these devices by displaying the contents, etc.

For the fourth invention, the network management devices 100A and 100B perform control that gives instructions to switch self notification destinations to the devices to be managed 110F, 111F, 112F, and 113F within the ring network F. As the structure responsible for this control, the network management devices 100A and 100B each have self notification destination switching instruction control units 101A and 101B.

Also, for the fourth invention, the devices to be managed 110F, 111F, 112F, and 113F perform control to switch the notification destination of the self notification of the concerned device according to the self notification destination switching instructions from the self notification destination switching instruction control units 101A and 101B. As a structure responsible for this control, the devices to be managed 110F, 111F, 112F, and 113F each have a self notification destination switching control unit 103-1, 103-2, 103-3, and 103-4.

Following, we will explain the self notification operation for the system according to the fourth invention. In FIG. 33, the network management device 100A operates as the current use system, and monitors the operation of all the devices to be managed 110F, 111F, 112F, and 113F within the ring network F.

At this time, each device to be managed 110F, 111F, 112F, and 113F reports (self notifies) the fault management information of the concerned device through path 15 only to the current use system network management device 100A.

With this status, for the spare system network management device 100B, the self notification destination switching instruction control unit 101B monitors the operation of the network management device 100A through monitoring path 11 that is established via the Ethernet 10 between the network management device 100A.

Here, if the self notification destination switching instruction control unit 101B detects occurrence of a fault at the network management device 100A, it sends self notification destination switching instructions through path 12 to all devices to be managed 110F, 111F, 112F, and 113F within the ring network F to the effect that the self notification destination should be switched from the network management device 100A to the network management device 100B.

On one hand, with the devices to be managed 110F, 111F, 112F, and 113F within the ring network F, the abovementioned self notification destination switching instructions are received by the self notification destination switching control units 103-1, 103-2, 103-3, and 103-4. Thus, the self notification destination switching control units 103-1, 1032, 103-3, and 103-4 perform control to switch the self notification destination of the concerned device from what was the network management device 100A until now to the network management device 100B.

Thereafter, the self notification destination switching control units 103-1, 103-2, 103-3, and 103-4 report (self notify) fault management information for the concerned device through path 13 only to the network management device 100B.

On the other hand, with the network management device 100A which can not operate due to the occurrence of a fault, if fault repair ends, then the self notification destination switching instruction control unit 101A starts, and sends self notification destination switching instructions through path 14 to all the devices to be managed 110F, 111F, 112F, and 113F within the ring network F to the effect that the self notification destination should be changed from the network management device 100B to the network management device 100A.

In relation to this, the devices to be managed 100F, 111F, 112F, and 113F within the ring network F receive the abovementioned self notification destination switching instructions at the self notification destination switching control units 103-1, 103-2, 103-3, and 103-4. Thus, with the self notification destination switching control units 103-1, 103-2, 103-3, and 103-4, a process is performed to switch the self notification destination of the fault management information for the concerned device to be switched from the network management device 100B to the network management device 100A.

Thereafter, with the self notification destination switching control units 103-1, 103-2, 103-3, and 103-4, the fault management information of the concerned device is reported (self notified) through path 15 only to the network management device 100A.

Next, we will explain the specific structure of the network management devices 100A and 100B and the devices to be managed 110F, 111F, 112F, and 113F for this system.

Figure 34:
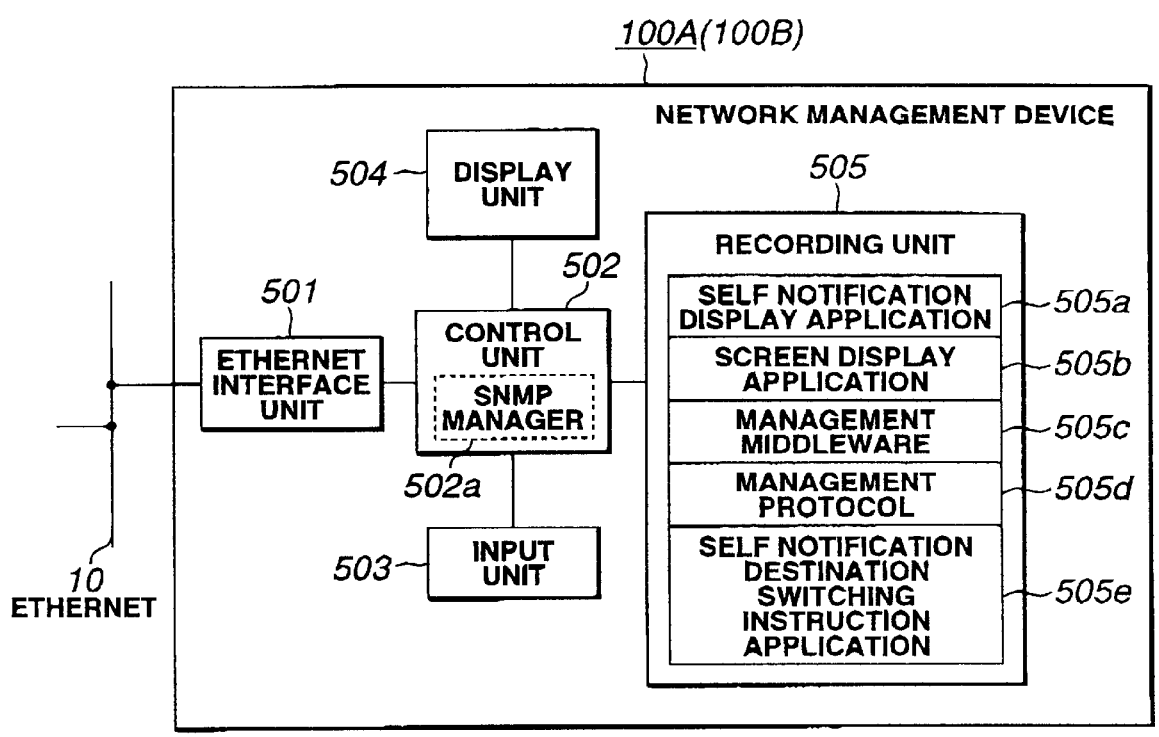
FIG. 34 is a block diagram showing the structure of a network management device according to the fourth invention.

FIG. 34 is a block diagram showing an example of the network management devices 100A and 100B of a system according to the fourth invention. FIG. 35 is a block diagram showing an example of the devices to be managed 110F, 111F, 112F, and 113F for the same system.

In FIG. 34, the network management devices 100A and 100B comprise the self notification destination switching instruction application 505e within the recording unit 505, but structures other than that are the same as the network management device 100 according to the third invention (FIG. 15).

The self notification destination switching instruction application 505e, by linking with the SNMP manager 502a, is responsible for control that issues instructions to switch the self notification destination to the concerned device side from the other network management device that has a redundant structure in relation to the devices to be managed 110F, 111F, 112F, and 113F, and correspond to the self notification destination switching instruction control units 101A and 101B in FIG. 33.

Figures 35A, 35B:
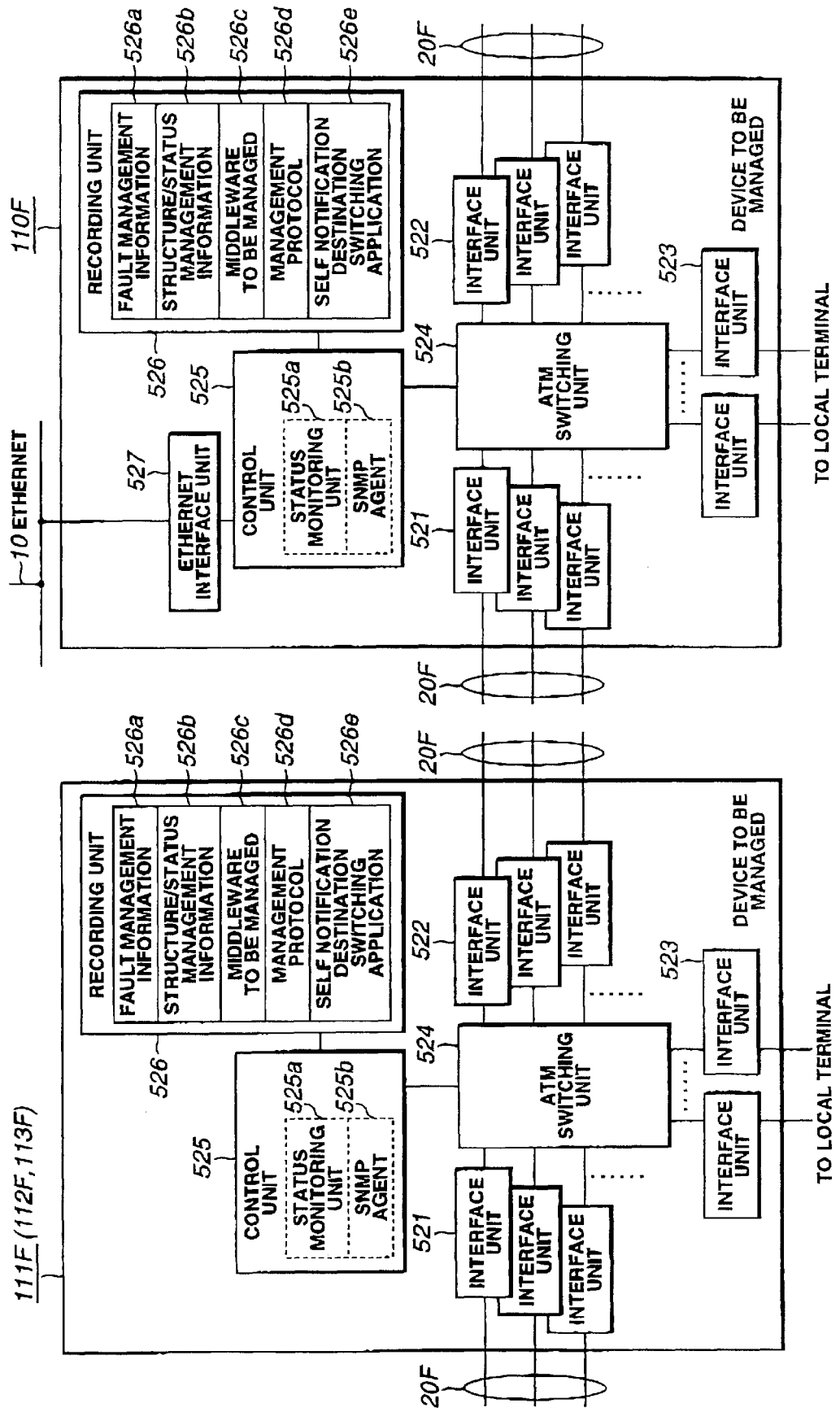
FIGS. 35(a) and 35(b) are block diagrams showing the structure of a device to be managed according to the fourth invention.

In FIG. 35, FIG. 35(a) shows the structure of devices to be managed 111F, 112F, and 113F that are not directly involved with communication with the Ethernet 10 within the network F, and FIG. 35(b) shows the structure of the device to be managed 110F that is directly involved with communication with the abovementioned Ethernet 10.

In FIG. 35(a), the devices to be managed 111F, 112F, and 113F comprise the self notification destination switching application 526e within the recording unit 526, but structures other than that are the same as for the device to be managed 111E, 112E, and 113E according to the third invention (FIG. 16(a)).

In FIG. 35(b), the device to be managed 110F comprises the self notification destination switching application 526e within the recording unit 526, but structures other than that are the same as the device to be managed 110E according to the third invention (FIG. 16(b)).

The self notification destination switching instruction application 526e, by linking with the SNMP agent 525b, performs the switching of the self notification destination in response to the abovementioned self notification destination switching instructions from the two network management devices 100A and 100B that have a redundant structure, and correspond to the self notification destination switching control units 103-1, 103-2, 103-3, and 103-4 of FIG. 33.

Following, we will explain the operation of the network management devices 100A and 100B and of the devices to be managed 110F, 111F, 112F, and 113F.

Furthermore, the self notification receiving process from each device to be managed 110F, 111F, 112F, and 113F for the network management devices 100A and 110B and the self notification process from the devices to be managed 110F, 111F, 112F, and 113F to the network management devices 100A and 100B are basically the same as that of the network management device 100 and devices to be managed 110E, 111E, 112E, and 113E of the third invention, so we will omit a detailed explanation.

Here, we will give an explanation focusing on the operation relating to the self notification destination switching control between the network management devices 100A and 100B that have a redundant structure.

Figure 36:
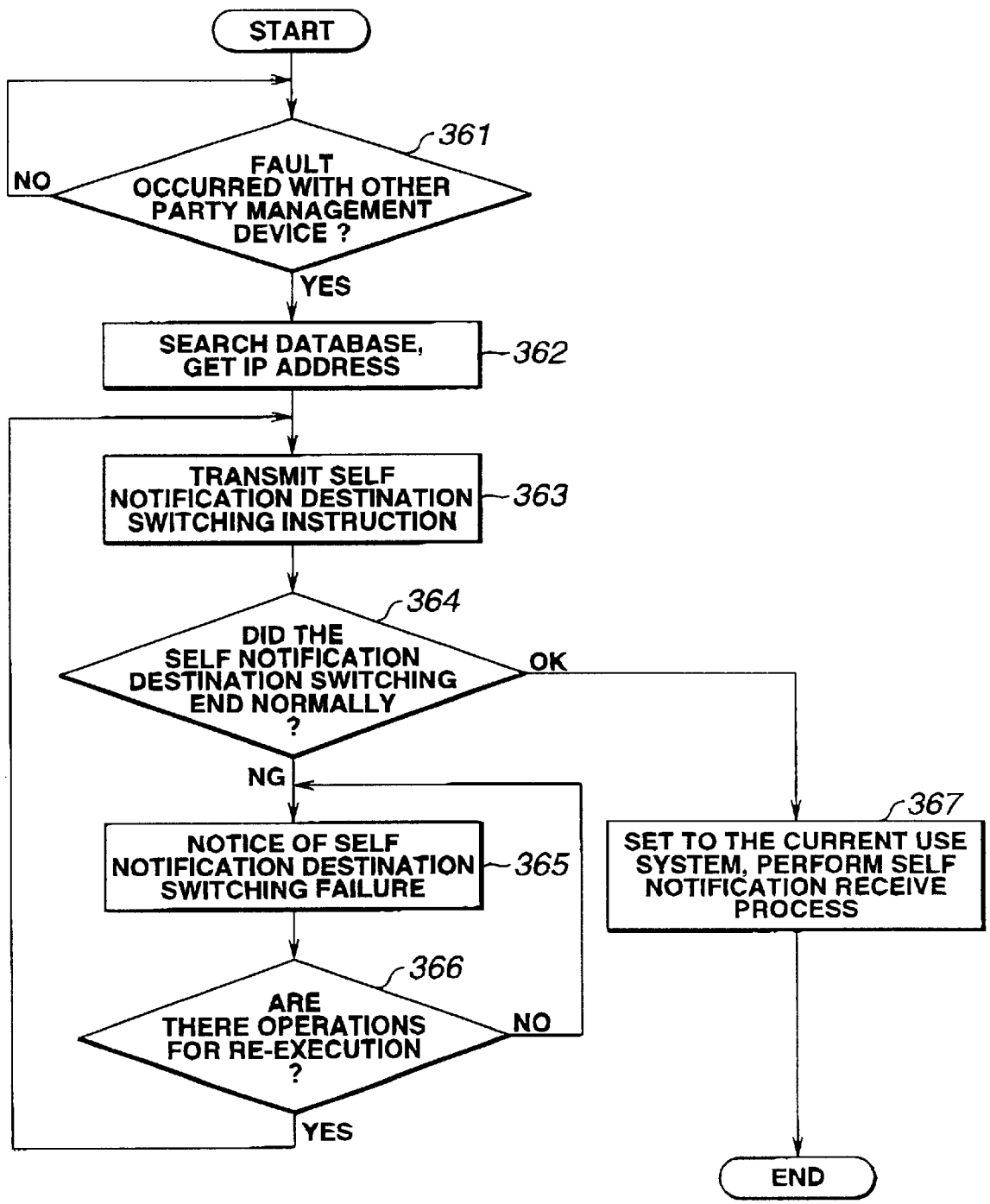
FIG. 36 is a flow chart showing the self notification destination switching control process of a network management device according to the fourth invention.

FIG. 36 is a flow chart showing the self notification destination switching control process for the spare system network management device 100B when the network management device 100A is performing management of the devices to be managed 110F, 111F, 112F, and 113F as the current use system under the conditions explained with reference to FIG. 33.

Specifically, in the abovementioned state, the SNMP manager 502a of the network management device 100B, by starting the self notification destination switching instruction application 505e, monitors whether or not a fault has occurred as the current use system network management device 100A (step 361).

Here, when a fault is detected for the network management device 100A, with the self notification destination switching instruction application 505e of the network management device 100B, the database is searched, and the IP address of the device to be managed 110F, 111F, 112F, and 113F are fetched (step 362).

The database has recorded the IP address of each device having correlated in advance an ID value for the devices to be managed 110F, 111F, 112F, and 113F that are subject to management according to the network structure. Therefore, with the process of step 362, an IP address search is performed based on the ID values of the devices to be managed registered in advance within the network.

After fetching the IP address, with the self notification destination switching instruction application 505e of the network management device 100B, based on the IP addresses fetched at step 362, a notification destination switching instructions are sent to all devices to be managed 110F, 111F, 112F, and 113F (step 363).

At this time, to make it possible for a network structure to exist that has a target node count of several hundred nodes, the self notification destination switching instruction application 505e sends the abovementioned self notification destination switching instructions asynchronously all at once.

In relation to this, with the devices to be managed 110F, 111F, 112F, and 113F, the SNMP agent 525b starts the self notification destination switching application 526e. This self notification destination switching application 526e performs the processes of receiving the self notification destination switching instructions from the network management device 100B as well as switching the self notification destination from the current use system network management device 100A to the spare system network management device 100B.

The self notification destination switching process can be realized, for example, by a method such as setting attribute values that show that an item is the self notification destination by correlating an IP address to a data base in which the IP addresses of the network management devices 100A and 100B are registered, while performing reporting of self notification to the IP addresses for which those attribute values are set, and when the self notification destination switching instructions are received, changing the abovementioned attribute values for the IP address to be switched.

When the abovementioned self notification destination switching ends normally, the self notification destination switching application 526e sends a normal response signal to the effect that switching has ended normally to the network management device 100B that is the notification source of the self notification destination switching instructions, and thereafter, the self notification of the fault management information for the concerned device is implemented only for the network management device 100b.

In relation to this, when the self notification destination switching has not ended normally, or when a time-out occurs before switching was completed, the self notification destination switching application 526e sends an abnormal end response signal that includes the reasons for these.

After sending the self notification destination switching instructions, with the network management device 100B, in correspondence to the asynchronous sending of the self notification destination switching instructions from the concerned device, the response signals from the devices to be managed 110F, 111F, 112F, and 113F in relation to the self notification destination switching instructions are received asynchronously.

For the network management device 100B, when the self notification destination switching instruction application 505e receives a response signal from the devices to be managed 110F, 111F, 112F, and 113F, a judgment is made whether or not the self notification destination switching was performed normally according to whether the response signal was a normal end signal or an abnormal end signal (step 364).

Here, when the self notification destination switching instruction was performed normally (OK at step 364), the self notification destination switching instruction application 505e sets the concerned device 100B as the current use system, and shifts to receive and management operations of self notification from the devices to be managed 110F, 111F, 112F, and 113F (step 367).

In contrast to this, when the self notification destination switching was not performed normally (NG at step 365), the self notification destination switching instruction application 505e performs notification to the effect that the self notification destination switching instruction was not performed normally (step 365), and re-executes the self notification destination switching instruction.

Figure 37:
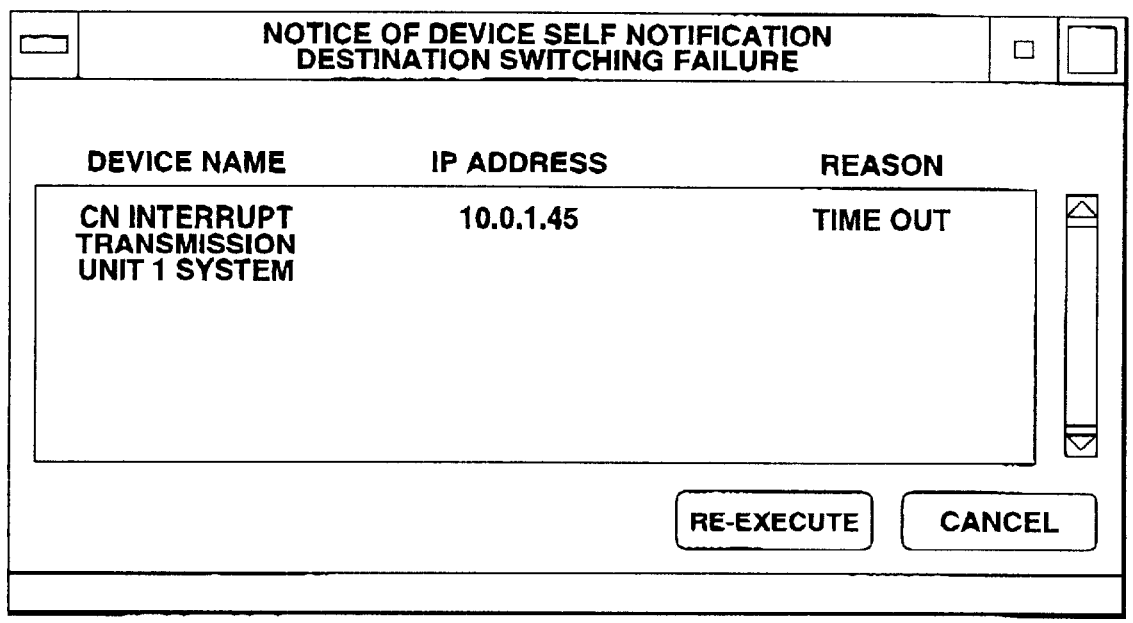
FIG. 37 shows an example of a display screen for giving self notification destination switching failure notification according to the fourth invention.

Self notification destination switching failure notification in this case, for example, is performed by displaying a pop up window as shown in FIG. 37 on the display unit 504 of the concerned device 100B. In the example in this FIG. 37, the names of all devices to be managed for which self notification destination switching did not end normally as well as the IP address thereof and reasons are displayed as a list in the pop up window.

Also, this pop up window, by pushing down a button called re-execute on the window, can also handle re-execution of the self notification destination switching instructions. When the re-execute button is pressed, self notification destination switching instructions are sent for all IP addresses within the list display.

After that, for the network management device 100B, the self notification destination switching instruction application 505e monitors whether or not the re-execution operation for the self notification destination switching instruction was performed (step 366), and when the re-execution operation was not performed (NO at step 366), the abovementioned pop up window failure notification is continued (step 365).

In contrast to this, when the abovementioned re-execution operation was performed (YES at step 366), the self notification destination switching instruction application 505e sends self notification destination switching instructions to the applicable devices to be managed based on the IP address displayed as a list on the abovementioned pop up window (step 363).

After this, for the network management device 100B, the self notification destination switching instruction application 505e judges whether or not the self notification destination switching was performed normally based on the response from the device to be managed that was the source of sending the abovementioned self notification destination switching instructions (step 364), and moves to the process of step 365 or step 367 according to this Judgment result.

Furthermore, with the abovementioned preferred embodiment, we described an example in which the self notification destination switching instruction application 505e that controls the self notification destination switching instruction of the network management device 100B detects the occurrence of a fault at the other party network management device 100A and is started, but the self notification destination switching instruction application 505e can also start based on startup of the concerned device or start using the menu.

Therefore, for example, when the network management device 100A returns to the current use system after a fault is repaired, after the self notification destination switching instruction application 505e is started by the menu, by performing the process after step 362 in FIG. 36, it is possible to perform control to switch the self notification destination from the network management device 100B to the concerned device 100A.

Also, with the abovementioned preferred embodiment, the system is such that when the spare system network management device 100B detects a fault at the current use system network management device 100A, self notification destination switching control (IP address search) starts unconditionally, but when operating as the current use system (primary station), attributes are set to indicate this, and when the spare system network management device 100B detects a fault in the current use system network management device 100A, when the abovementioned attribute values are set in the current use system network management device 100A, in other words with the condition the network management device 100A is operated as the primary station, the structure can be such that a search is started for IP addresses.

Also, with the abovementioned preferred embodiment, we explained an example in which after the spare system network management device 100B detects an error in the current use system network management device 100A, a self notification destination switching instruction is sent to all devices to be managed, but, for example, it is also possible to have a system where, using a method such as starting using the menu described above, by inputting the ID value of a specific device to be managed, by sending a self notification destination switching instruction to the IP address searched based on this input ID value, self notification destination switching control is executed for each individual device to be managed.

As described above, with the fourth invention, the devices to be managed perform self notification by switching the self notification destination according to self notification destination switching instructions from the network management device, so as a result of the self notification destination of the device to be managed always being limited to one network management device, even then a redundant structure is used for the network management device, it is possible to function without using extra traffic for network management, and that portion can be allocated to the original communication uses, making it possible to realize more efficient network operation.

Figure 38:
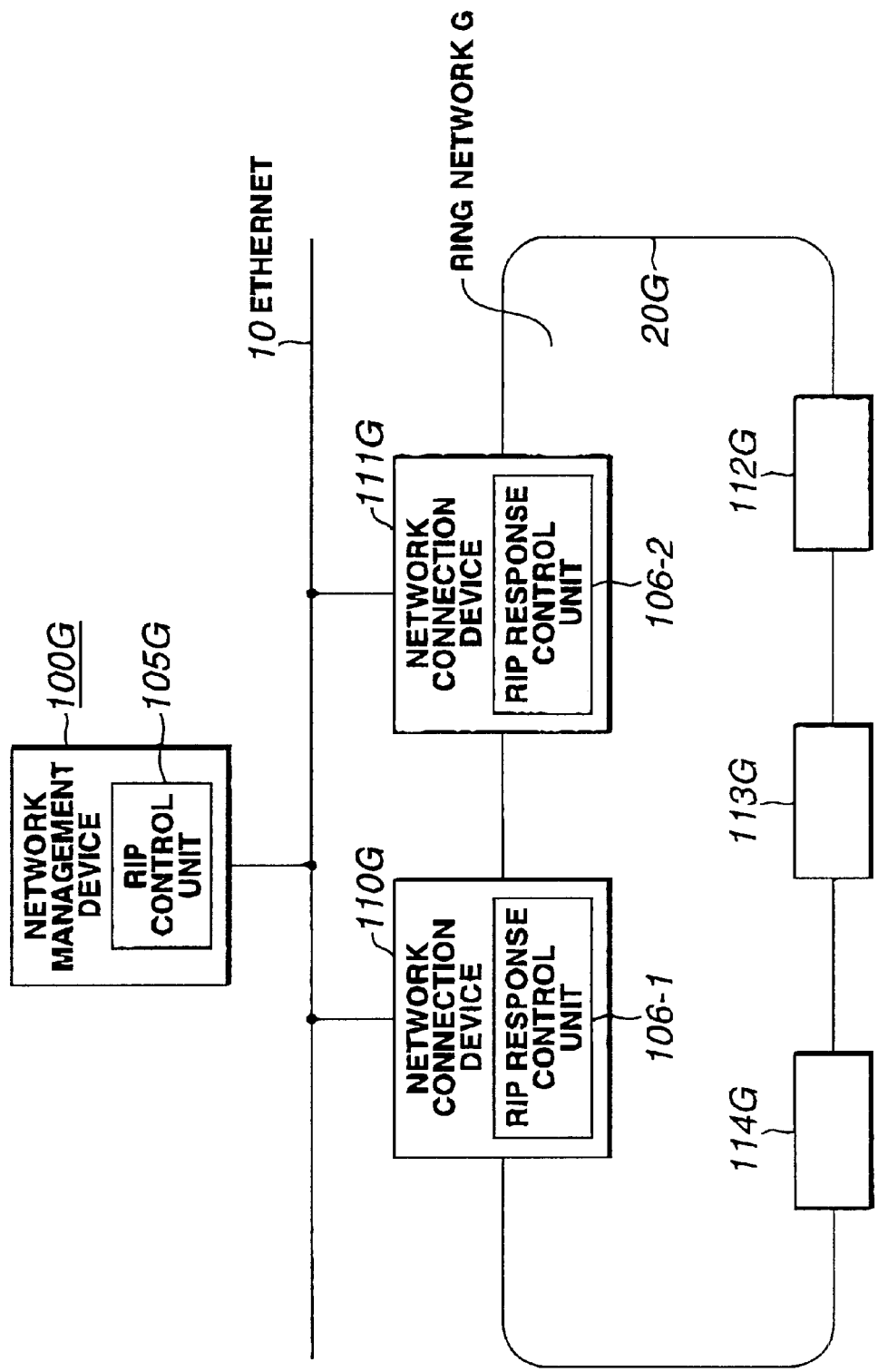
FIG. 38 is an overall structural diagram of an ATM network system according to the fifth invention.

Next, we will explain the fifth invention. FIG. 38 is a schematic diagram showing the overall structure of an ATM network system according to the fifth invention.

This system is composed from a ring network G made from node devices 110G, 111G, 112G, 113G, and 114G connected by an ATM ring transmission line 20G and a network management device 100G that manages all of the node devices 110G, 111G, 112G, 113G, and 114G within this ring network G.

The network management device 100G is physically connected to node devices 110G and 111G within the ring network G via the Ethernet 10. The node devices 110G and 111G are realized by ATM switching equipment (FIG. 39) that has an Ethernet interface that houses the Ethernet and that has an ATM interface that houses the ATM ring transmission line 200G.

Specifically, the node devices 110G and 111G have a function as the network connection devices that connect between the Ethernet 10 and the ring transmission line 20G, and are realized with a duplex structure where one operates as the current use system and the other operates as the current use system.

The other node devices 112G, 113G, and 114G besides 110G and 111G within the ring network G are realized by ATM equipment (FIG. 40) that has only an ATM interface that houses the ATM ring transmission 20G.

In this way, the system according to the fifth invention has a network structure that manages multiple ATM switching equipment (node devices 112G, 113G, and 114G) via ATM equipment (node devices 110G and 11G, hereafter referred to as network connection devices) for which one network management device 100G has a network connection function and has a redundant structure (duplex structure). This system can also use SNMP, etc. as a communication protocol for management.

For the system according to the fifth invention, the network connection devices 110G and 111G have one operating as the current use system and the other operating as the spare system, so on the network management device 100G side, it is recognized whether each network connection device 110G and 111G is operating as either the current use system or the spare system, and must switch the path via the Ethernet 10 for accessing the current use side.

As a path control protocol for switching this path, with this system, RIP is used, and this determines the optimal path based on the hop count passed through when reaching the ring transmission line 20G.

With normal RIP control, as shown in FIG. 38, with a connection structure (viewing from the network management device 100G, the metrics for reaching the ring transmission line 20G by the network connection devices 110G and 11G are equal), even after switching between the network connection devices 110G and 111G as the current use system and spare system, by having the period for which the path information to the side operating as the current use system up until then continue for a period of time, there was a characteristic of losing the immediacy of switching systems from the spare system to the current use system.

Thus, with the fifth invention, weighting is performed between the current use system and spare system for the path information (hop count) within the RIP response message reported from the network connection devices 110G and 111G to the network management device 100G, and when switching systems, the issue is handled by variably controlling the abovementioned path information weighting as appropriate using the network connection devices 110G and 111G.

In FIG. 38, an RIP response control unit 106-1 and 1061 2 having a function for variably controlling the abovementioned path information weighting is provided on the network connection devices 110G and 111G within the ring network G.

On the other hand, an RIP control unit 105G that performs control for selecting the path with the lowest cost (lowest hop count value) based on the path information notified from the RIP response control units 106-1 and 106-2 of the abovementioned network connection devices 110G and 111G is provided on the network management device 100G.

Figure 39:
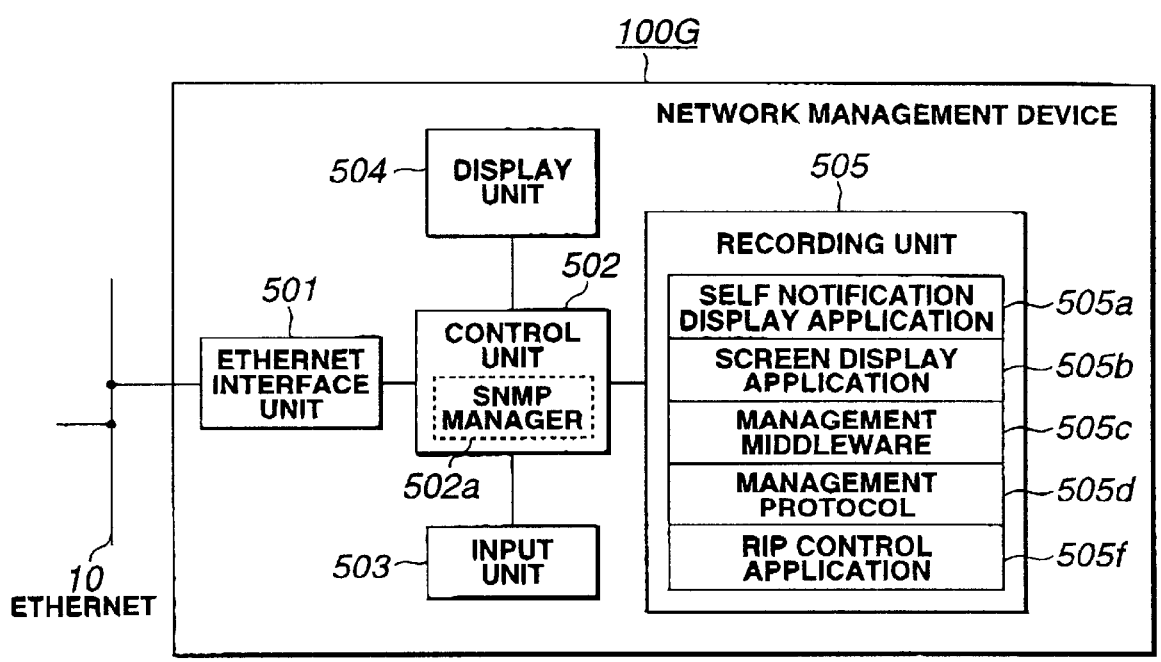
FIG. 39 is a block diagram showing the structure of a network management device according to the fifth invention.
Figure 40:
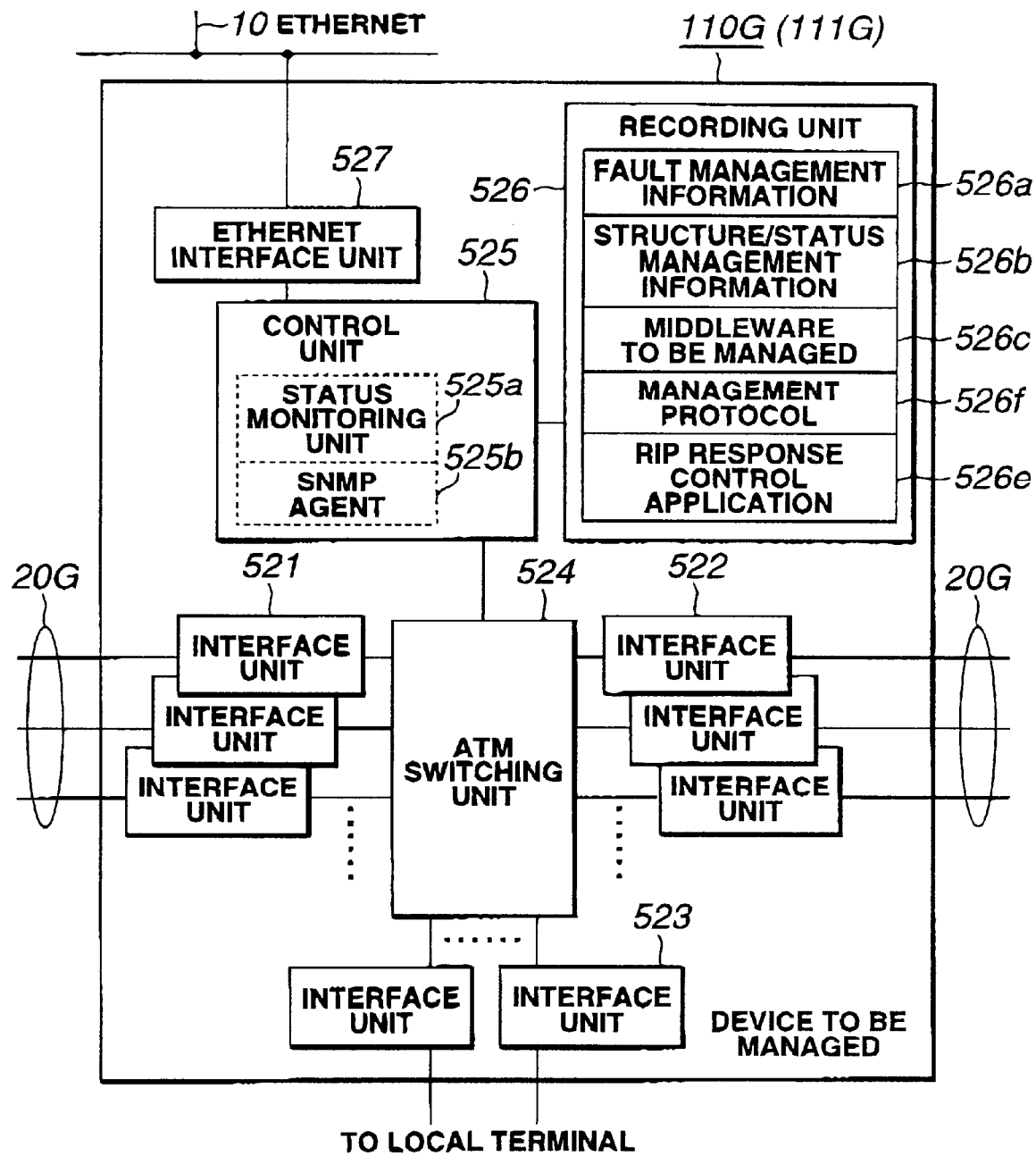
FIG. 40 is a block diagram showing the structure of a network connection device according to the fifth invention.

Specific structural examples of the network management A device 100G and the network connection devices 110G and 111G in FIG. 38 will be shown in FIGS. 39 and 40.

In FIG. 39, the network management device 100G has an RIP control application 505f within the recording unit 505, and structures other than that are basically the same as, for example, the network management devices 100A and 100B (FIG. 34) according to the fourth invention.

The RIP control application 505f extracts path information (hop count) from the RIP response message sent from the network connection devices 110G and 111G via the Ethernet 10 by communication control performed by the SNMP manager 502a within the control unit 502, and performs control to select the lowest cost path for reaching the ring transmission line 20G according to this hop count, and this corresponds to the RIP control unit 105G in FIG. 38.

Furthermore, the SNMP manager 502a, as described with regard to the fourth invention, uses the IP addresses allocated in advance to the node devices 110G, 111G, 112G, 113G, and 114G within the ring network G and performs control to send and receive information relating to network management, etc. between these node devices.

In FIG. 40, the network connection devices 110G and 111G have an RIP response control application 526f within the recording unit 526, and structures other than that are basically the same as, for example, the device to be managed 110F (FIG. 35(b)) for the fourth invention.

The RIP response control application 526f performs control to regularly send RIP response messages via the Ethernet 10 to the network management device 100G using communication control performed by the SNMP agent 525b within the control unit 525, and this corresponds to the RIP response control units 160-1 and 160-2 in FIG. 38.

Specifically, for the fifth invention, the abovementioned RIP response control application 526f has a control function that, when the concerned node device is operating as the current use system, broadcasts an RIP response message with N as the hop count to the Ethernet 10, and when the concerned node device is operating as the spare system, broadcasts an RIP response message with N+1 as the hop count to the Ethernet 10, while when the concerned node device is switched from the current use system to the spare system, broadcasts an RIP response message to the Ethernet 10 after changing the hop count from N to N+1, and when the concerned node device is switched from the spare system to the current use system, broadcasts an RIP response message to the Ethernet 10 after changing the hop count from N+1 to N−1.

Furthermore, the SNMP agent 525b works together with the SNMP manager 502a of the network management device 100G, performs control that adds the IP address of the concerned node device to information relating to faults, etc. of the concerned node device and sends this to the network management device 100G, and performs control that receives the control information, etc. sent from the network management device 100G when the IP address added to this information matches the IP address of the concerned device.

Furthermore, the node devices 112G, 113G, and 114G besides the network connection devices 110G and 111G are realized by the structure of the network connection devices 110G and 111G (FIG. 40) with the Ethernet interface unit 527 and the RIP response control application 526f removed.

Next, we will explain the RIP control operation of the network management device 100G and the network connection devices 110G and 111G of a system according to the fifth invention (FIG. 38).

Figure 41:
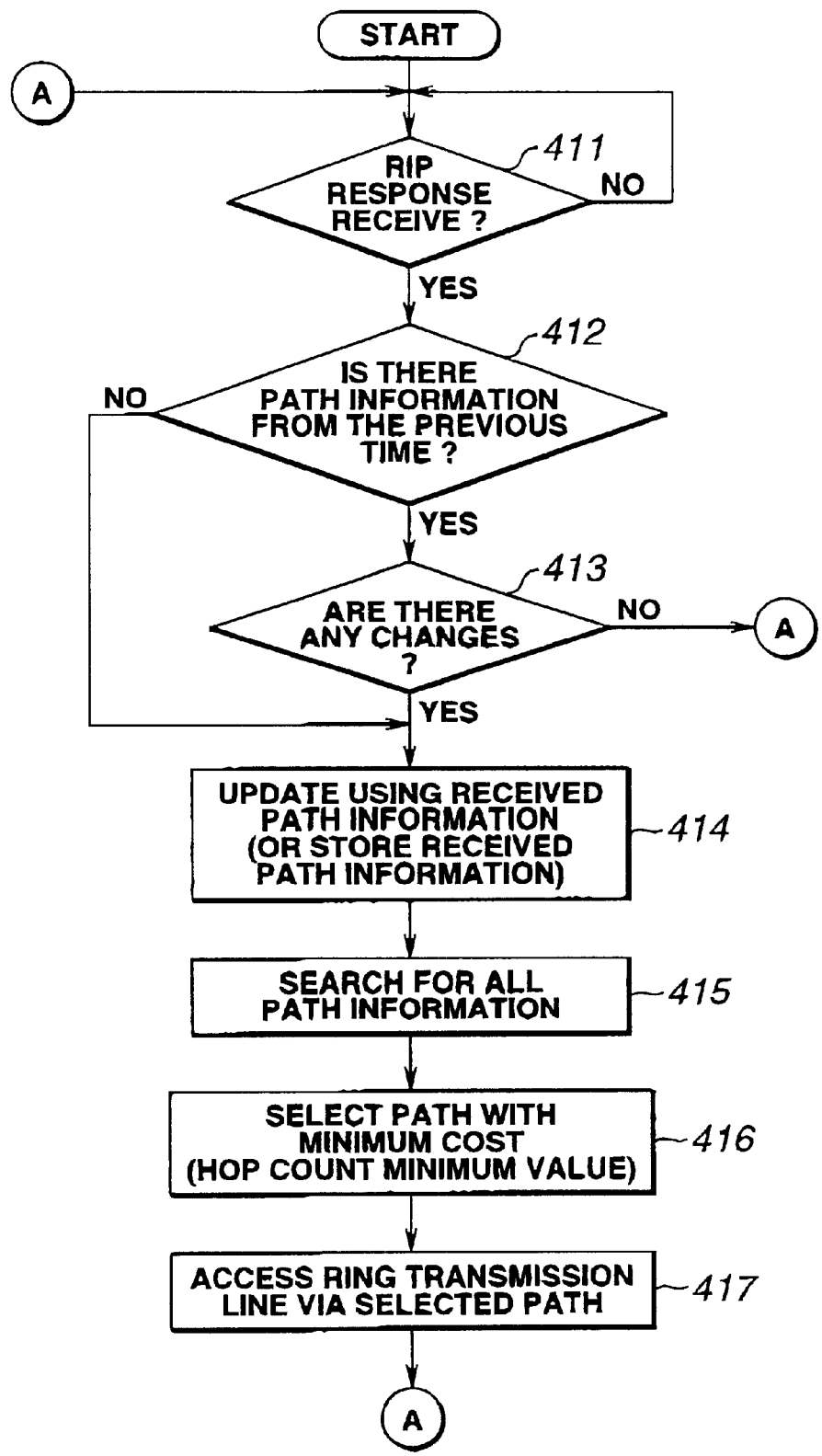
FIG. 41 is a flow chart showing the RIP control operation of a network management device according to the fifth invention.

FIG. 41 is a flow chart showing the RIP control operation using the RIP control unit 105G (corresponds to the RIP control application 505f of FIG. 39) of the network management device 100G.

As shown in FIG. 41, for the network management device 100G, the RIP control unit 105G monitors (step 411) whether or not an RIP response message is received from the network connection device 110G or 111G using the communication control at the NMP manager 502a, and when an RIP response message is received (YES at step 411), it is checked whether or not the path information (hop count) obtained from the previous RIP response message is recorded within the recording unit 505 (step 412).

Here, when the previous path information is not recorded (NO at step 412), the path information from the RIP response message received this time is extracted and newly recorded in recording unit 505 (step 414).

In contrast to this, when the previous path information is already stored (YES at step 412), this previous path information is compared with the path information extracted from the RIP response message received this time, and a judgment is made whether or not there is a change (step 413).

When there is no change (NO at step 413), the previous path information is held as is in the recording unit 505, and the process continues from after step 411.

On the other hand, when there is a change from the previous path information with the path information extracted from the RIP response message received this time (YES at step 413), the RIP control unit 105G overwrites the previous path information using the path information extracted from the RIP response message received this time (step 414).

After that, the RIP control unit 105G searches for all path information stored in the recording unit 505 (step 415), selects the path with the lowest hop count value, in other words, the lowest cost path for reaching the ring transmission line 20G, and uses this selected path to access the transmission line 20G via either the network connection device 110G or 111G (step 417). After this, the process returns to step 411, and the same process mentioned above is performed repeatedly.

Figure 42:
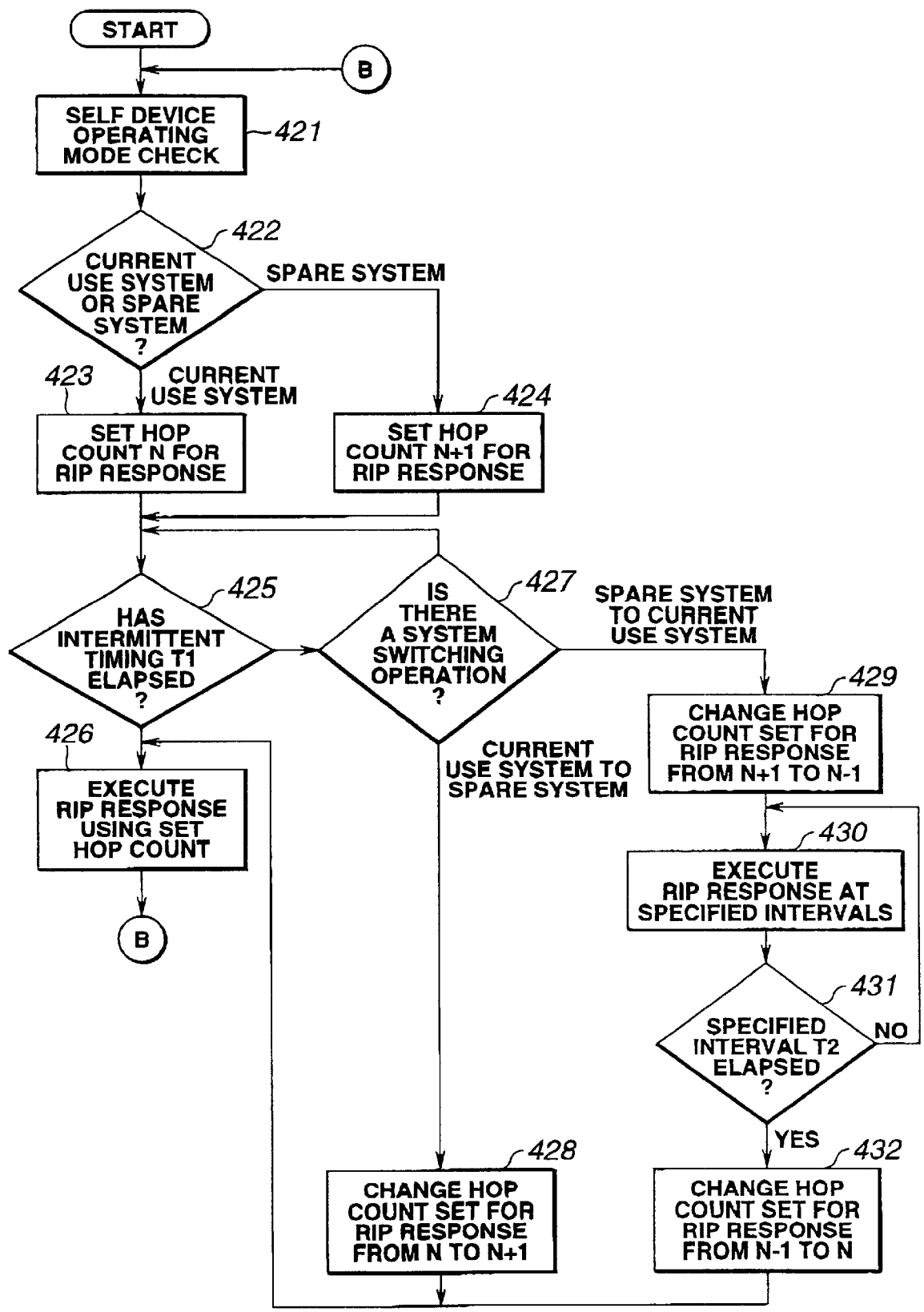
FIG. 42 is a flow chart showing the RIP control operation of a network connection device according to the fifth invention.

FIG. 42 is a flow chart showing the RIP response control operation using the RIP response control units 106-1 and 106-2 (corresponds to the RIP response control application 526f in FIG. 40) of the network connection devices 110G and 111G.

As shown in FIG. 42, for the network connection devices 110G and 111G, the RIP response control units 106-1 and 106-2 first check the operating mode of the concerned node device (step 421), and then judge in which mode, the current use system or spare system, the concerned node device is operating in (step 422).

Here, when the concerned node device is operating as the current use system (current use system at step 422), the RIP response control units 106-1 and 106-2 set a hop count N as the path information in the RIP response message (step 423). In contrast, when the concerned node device is operating as the spare system (spare system at step 422), hop count N+1 is set as the path information in the RIP response message (step 424).

After setting of the path information is completed at steps 423 and 424, the RIP response control units 106-1 and 106-2 judge whether the periodic timing t1 set for regularly performing RIP response has been reached (step 425), and when periodic timing t1 has been reached (YES at step 425), an RIP response message containing the abovementioned set path information is sent to the network management device 100G via the Ethernet 10 (step 426).

In contrast, after path information setting is completed at steps 423 and 424, when periodic timing t1 is not reached (NO at step 425), the RIP response control units 106-1 and 106-2 monitor whether or not the switching operation has been performed between the current use system and the spare system (step 427), and as long as the system switching operation has not been performed (NO at step 427), the process of step 425 is repeated.

Then, if periodic timing t1 is reached without the system switching operation having been performed (YES at step 425), an RIP response message containing the set path information as is sent to the network control device 100G via the Ethernet 10 (step 426).

On the other hand, when the system switching operation has not been performed before reaching the abovementioned periodic timing t1, the RIP response control units 106-1 and 106-2 judge if the switching operation was from the current use system to the spare system or from the spare system to the current use system (step 427).

Here, when the switching is from the current use system to the spare system (current use system to spare system at step 427), the RIP response control units 106-1 and 106-2 change the path information set at step 423 from hop count N to N+1 (step 428).

After this, the RIP response control units 106-1 and 106-2 send an RIP response message containing this changed path information to the network management device 100G via the Ethernet 10 (step 426).

In contrast, when the switching is from the spare system to the current use system (spare system to.current use system at step 427), the RIP response control units 106-1 and 106-2 change the path information set at step 424 from hop count N+1 to N−1 (step 429), and then send an RIP response message containing this changed path information to the network management device 100G via the Ethernet 10 (step 430).

Next, the RIP response control units 106-1 and 106-2 monitor whether specified time t2 has elapsed (step 431), and during the time specified time t2 has not yet elapsed (NO at step 431), continuously repeats at a specified interval the sending of the RIP response message at step 430.

During this time, if the abovementioned specified time t2 is reached (YES at step 431), the RIP response control units 106-1 and 106-2 again change the hop count that had changed from N+1 to N−1 at step 429 to N (step 432), and furthermore, an RIP response message containing this path information for which the hop count is changed is sent to the network management device 100G via the Ethernet 10 (step 426). After the RIP response message is sent at step 426, the process from step 421 is continued.

As described above, with the system according to the fifth invention, the system is such that in relation to the network management device 100G that extracts path information (hop count) from an RIP response message from the network connection devices 110G and 111G and selects the path with the lowest hop count value, at the network connection devices 110G and 111G, when the concerned node device is operating as the current use system, an RIP response message with N as the hop count is broadcast to the Ethernet 10, and when the concerned node device is operating as the spare system, an RIP response message with N+1 as the hop count is broadcast to the Ethernet 10, while on the other hand, after the concerned node device switches from the current use system to the spare system, an RIP response message with the hop count changed from N to N+1 is broadcast to the Ethernet 10, and after the concerned node device switches from the spare system to the current use system, during at least the time until specified time t2 has elapsed, and RIP response message with the hop count changed from N+1 to N−1 is broadcast to the Ethernet 10.

With the abovementioned control, immediately after switching from the current use system to the spare system is performed, a hop count of N+1 is notified from the network connection device (old current use system) that has newly become the spare system, and a hop count of N−1 is notified from the network connection device (old spare system) that has newly become the current use system, so immediately after system switching, even if there is a period where the hop count of the old current use system network connection device notified by the RIP response continues to be known as hop count N, during this time, as a result of notification of hop count N−1 that has a smaller value than this from the new current use system network connection device, at the network management device 100G, based on this smallest value hop count N−1, the path with the lowest cost via the new current use system network connection device can be selected immediately.

Figure 43:
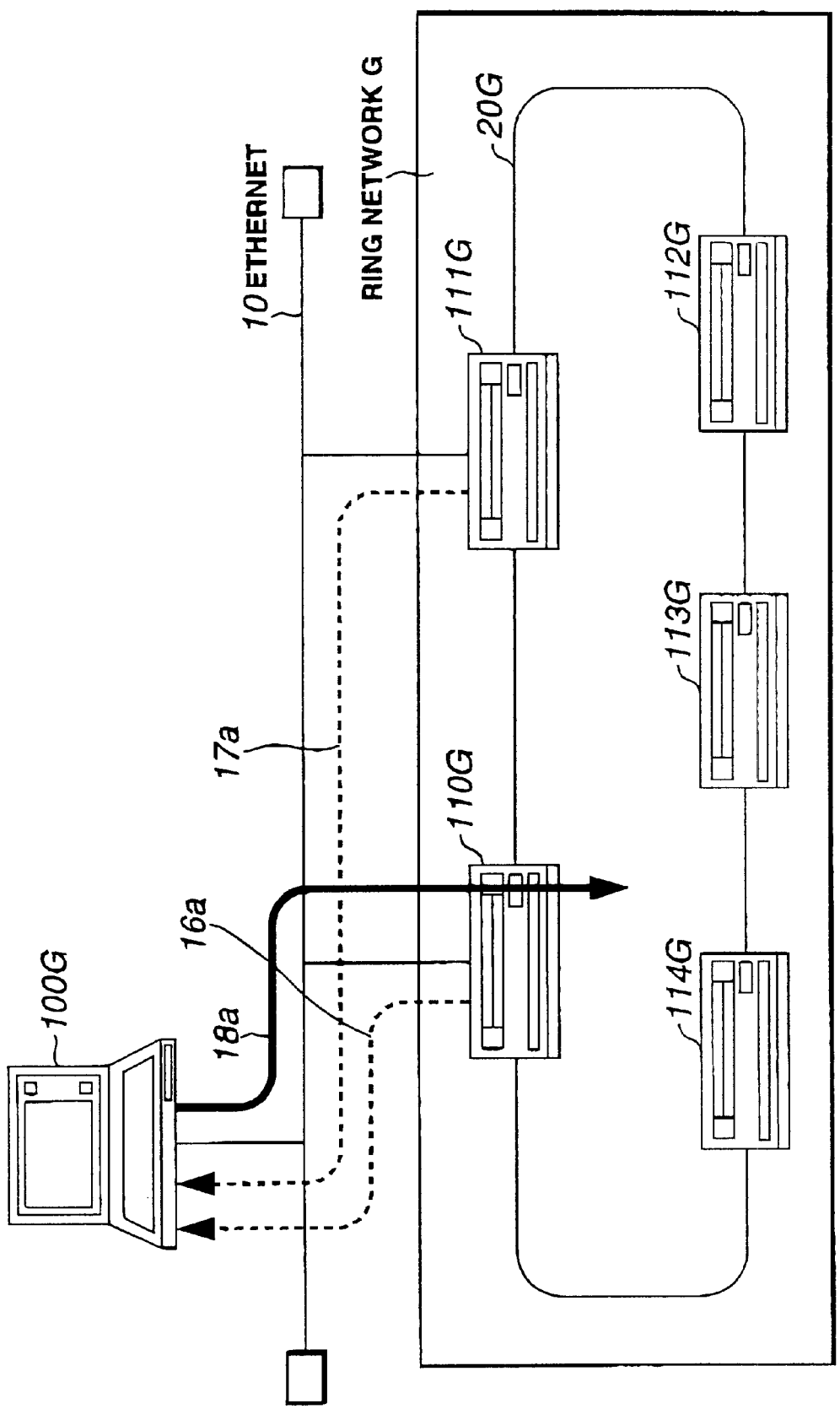
FIG. 43 shows the path selection status before switching systems between network connection devices for a preferred embodiment system according to the fifth invention.
Figure 44:
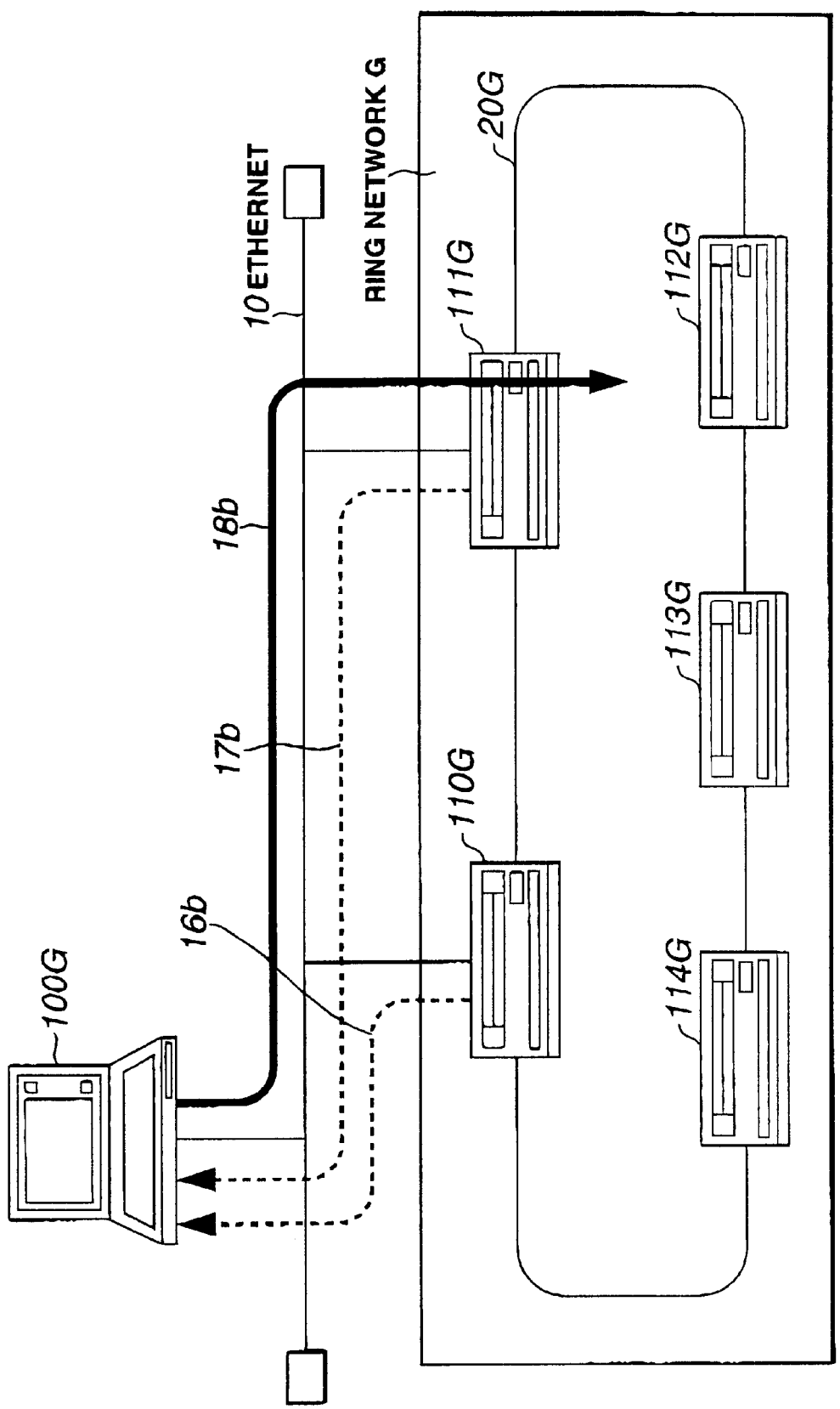
FIG. 44 shows the path selection status after switching systems between network connection devices for the same system.

Following, we will explain a specific preferred embodiment of the present invention while referring to FIGS. 43 and 44. The system structure shown in these FIGS. 43 and 44 is the same as the system structure shown in FIG. 38.

In FIG. 43, of the network connection devices 110G and 111G that have a duplex structure, 110G operates as the current use system and 111G operates as the spare system.

At this time, the current use system network connection device 110G has a hop count of 2 for the path to reach the ring transmission line 20G, and path information 16a is regularly reported by RIP on the Ethernet 10. Also, at this time, the current use system network connection device 111G has a hop count of 3 for the path to reach the ring transmission line 20G, and path information 17a is regularly reported by RIP on the Ethernet 10.

On the other hand, the network management device 100G receives the path information 16a and 17a from the network connection devices 110G and 111G via the Ethernet 10, and based on this path information 16a and 17a, selects the path 18a via the network connection device 110G with the lowest cost (smallest hop count) to reach the ring transmission line 20G, and executes access processing for network management on the Ethernet 10 via this path 18a.

After this, when the network connection device 110G switches from the current use system to the spare system, and the network connection device 111G switches from the spare system to the current use system, at the network management device 100G, control is performed to switching the access path to the ring transmission line 20G as shown in FIG. 44.

Specifically, in FIG. 44, the network connection device 110G that switched from the current use system to the spare system changes from a hop count of 2 for the path for reaching the ring transmission line 20G to a hop count of 3, and regularly reports path information 16b using RIP on the Ethernet 10. Also, the network connection device 111G that switches from the spare system to the current use system changes from a hop count of 3 for the path for reaching the ring transmission line 20G to a hop count of 1, and regularly reports path information 17b using RIP on the Ethernet 10.

On the other hand, when the network management device 100G receives the path information 16b and 17b from the network connection devices 110G and 111G via the Ethernet 10, it is confirmed that the contents of this path information 16b and 17b have changed and then update processing is performed. In this case, the network management device 100G, by receiving the path information 17b of hop count 1 from the network connection device 111G, changes from the hop count 3 recognized from the path information 17a received before the system switch to the newly recognized hop count 1, while also by receiving the path information 16b of hop count 3 from the network connection device 110G, changes the hop count 2 recognized from the path information 16a received before the system switched to the newly recognized hop count 3, and holds these.

After this, the network management device 100G, based on the path information 16b and 17b after changing, selects the path 18b via the network connection device 111G that has the lowest cost (lowest hop count value) for reaching the ring transmission line 20G, and executes access processing for network management on the Ethernet 10 through this path 18b.

With this preferred embodiment, immediately after switching systems between the current use system and the spare system, the hop count notified from the new current use system network connection device 111G becomes 1, and at this time, because this is smaller than the hop count of 3 notified from the old current use system network connection device 110G and the hop count of 2 notified before the abovementioned system switching from the old current use system network connection device 110G, at the network management device 100G, after the abovementioned system switch, it is possible to immediately select the path via the new current use system network connection device 111G that has the smallest hop count value (=1).

Furthermore, with the abovementioned preferred embodiment, we described a case when the network connection devices 110G and 111G both operate normally, it is recognized that both of the systems are switched (the system switching method in this case is not important), and the path information weighting is changed followed by RIP response, but the same results could be expected even if only one of the network connection devices 110G and 111G perform the changing of the weighting of the path information as described above and then perform RIP response.

Figure 45:
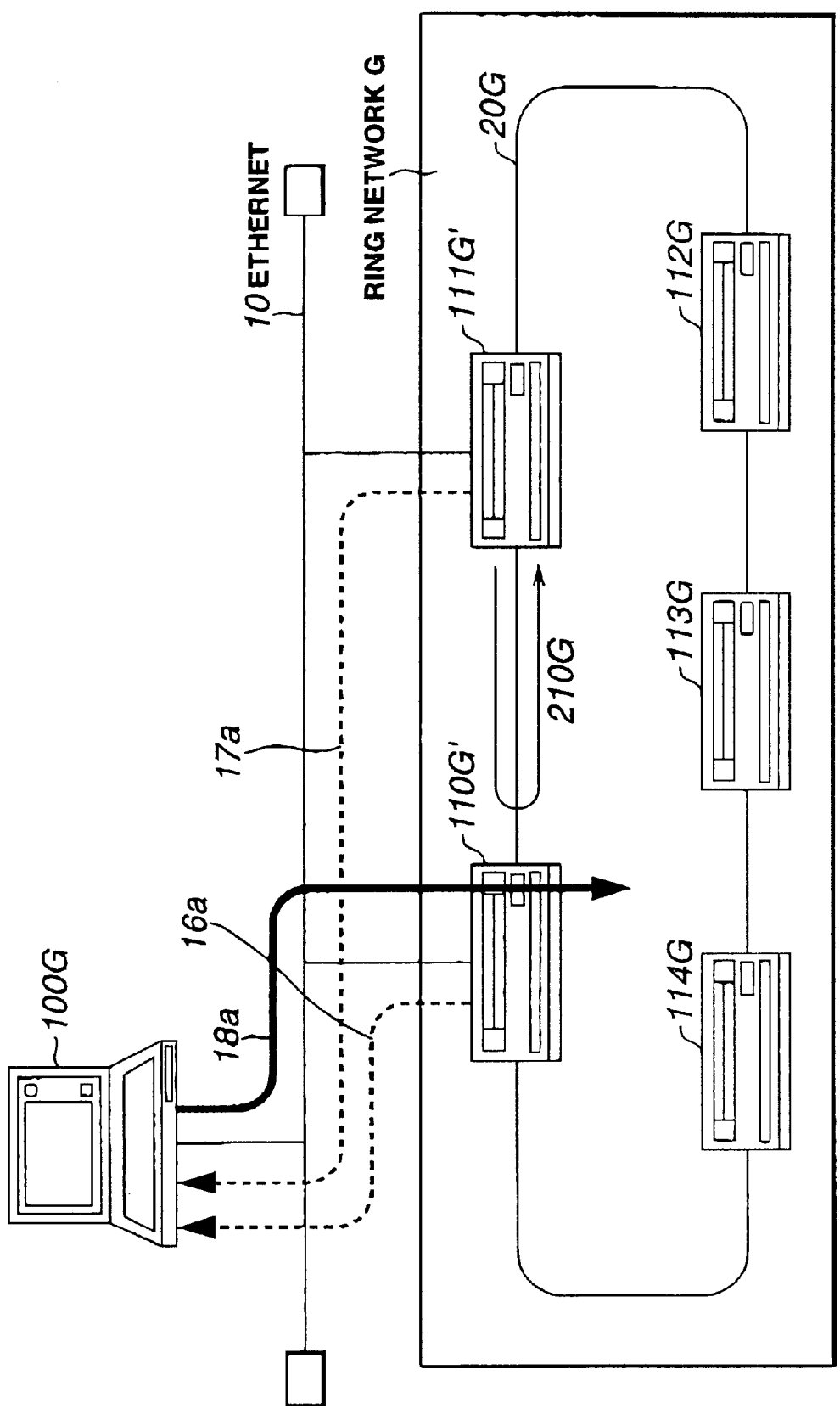
FIG. 45 shows the path selection status before switching systems between network connection devices for a different preferred embodiment system according to the fifth invention.
Figure 46:
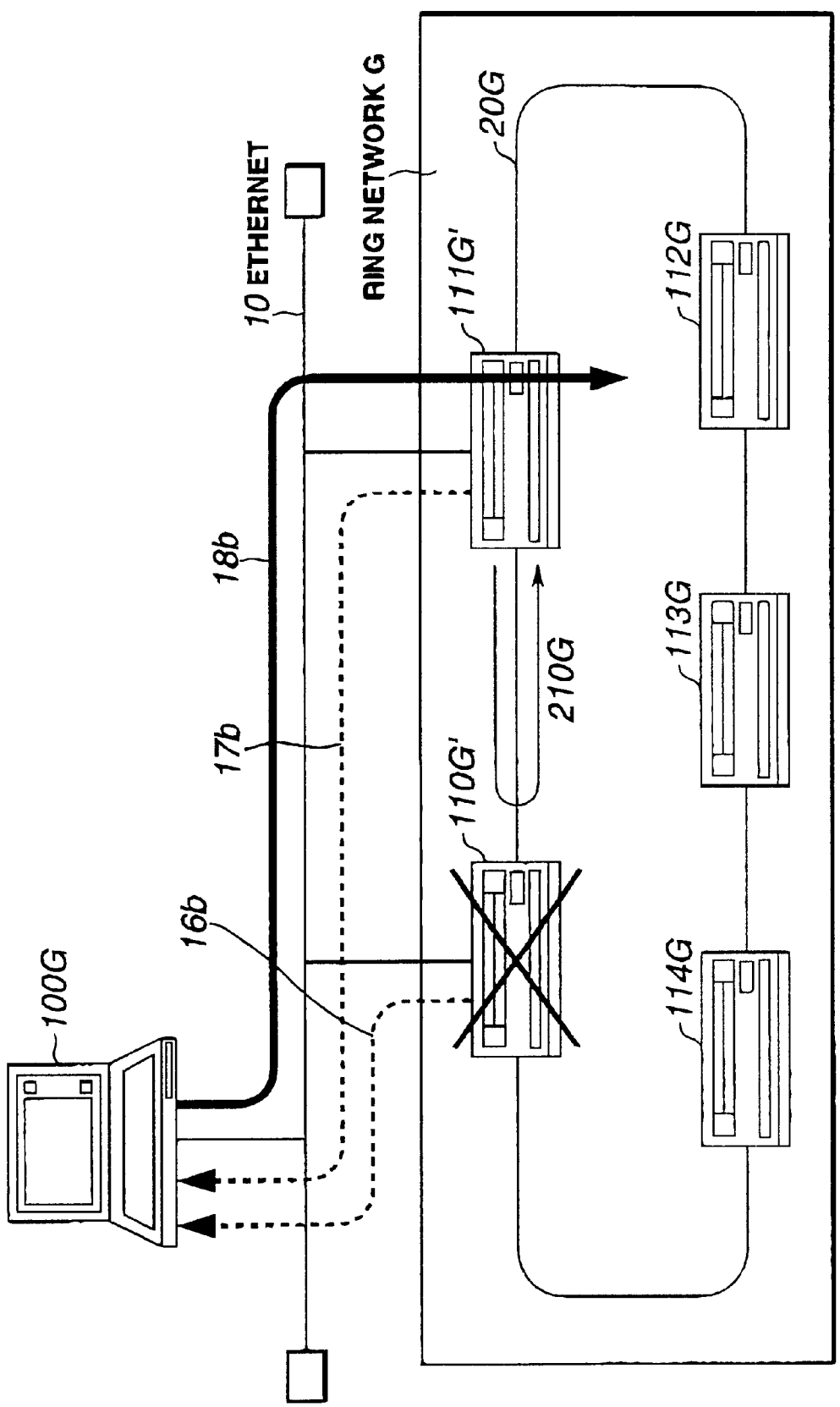
FIG. 46 shows the path selection status after switching systems between network connection devices for the same system.
Figure 47:
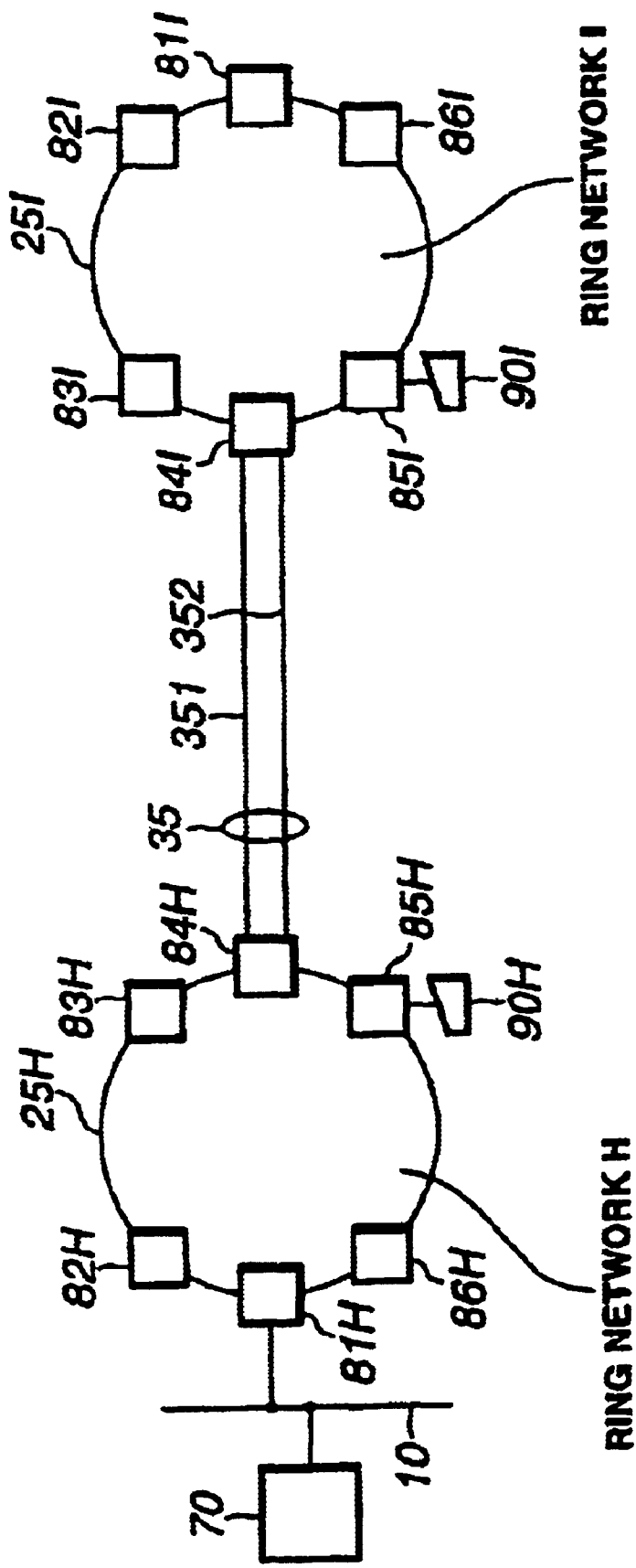
FIG. 47 is an overall structural diagram of a conventional system made by connecting two ring networks by a between-ring connection device.

We will explain a preferred embodiment that corresponds to this case while referring to FIGS. 45 and 46. The preferred embodiment shown in FIGS. 45 and 46 shows a system such that the current use system network connection device can not operate due to a fault, and when this is recognized as the spare system network connection device newly starts up as the current use system, only the concerned new current use system network connection device performs the path information weighting change described above and performs RIP response.

The basic structure of the system shown in FIGS. 45 and 46 is the same as the structure of the system shown in FIG. 38. However, in FIGS. 45 and 46, the duplex structure network connection devices 110g' and 111G' each comprise a function that can detect faults in the other party device through a virtual path 210G on the ring transmission path 20G.

In FIG. 45, of the duplex structure network connection devices 110G' and 111G', 110G' operates as the current use system, and 111G' operates as the spare system.

At this time, the spare system network connection device 111G' monitors the operating status of the current use system network connection device 110G' through the virtual path 210G on the ring transmission path 20.

With this state, when the network connection devices 110G' and 111G' are operating normally, the current use system network connection device 110G' has a hop count of 2 for the path for reaching the ring transmission line 20G, and regularly reports path information 16a using RIP on the Ethernet 10. Also, at this time, the spare system network connection device 111G' has a hop count of 3 for the path for reaching the ring transmission path 20G, and regularly reports path information 17a using RIP on the Ethernet 10.

On the other hand, the network management device 100G receives path information 16a and 17a from the network connection devices 110G' and 111G' via the Ethernet 10, and based on this path information 16a and 17a, selects the path 18a via the network connection device 110G' with the lowest cost (lowest hop count value) for reaching the ring transmission line 20G, and executes access processing for network management on the Ethernet 10 through this path 18a.

After this, if the spare system network connection device 111G' detects a fault on the current use system network connection device 110G' via the virtual path 210G using the abovementioned fault detection function, the concerned network connection device 111G' starts operating as the new current use system switched from the spare system to the current use system.

At this time, at the network management device 100G, control to switch the access path to the ring transmission line 20G is performed as shown in FIG. 46.

Specifically, in FIG. 46, the network connection device 111G' that switches from the spare system to the current use system by recognizing the occurrence of a fault at the current use system network connection device 110G' changes what was a hop count of 3 for the path to reach the ring transmission line 20G to a hop count of 1, and regularly reports the path information 17b using RIP on the Ethernet 10.

On the other hand, the network management device 100G, when it receives the path information 17b from the network connection device 111G' via the Ethernet 10, recognizes the fact that the content of this path information 17b differs from the previous one and then performs update processing. In this case, the network management device 100G, by receiving path information 17b of hop count 1 from the network connection device 111G', changes the hop count of 3 recognized from the path information 17a received before the system switch to a newly recognized hop count of 1.

At this time, reporting of path information 16a from the network connection device 110G' which is not capable of communicating due to fault occurrence is stopped, so with the network connection device 100G, regarding this network connection device 110G', the path information 16a reported before the occurrence of the fault is held as is.

Therefore, after that, for the network management device 100G, based on the path information 16a before fault occurrence for the network connection device 110G' and the path information 17b after changes related to the network connection device 11G', the path 18b via the network connection device 111G' with the lowest cost (lowest hop count value) for reaching the ring transmission line 20G is selected.

With this preferred embodiment, the hop count notified from the network connection device 111G' that has newly become the current use system becomes 1, and at this time, this is a smaller value than the hop count of 2 notified immediately before the fault occurrence from the network connection device 110G' where the fault occurs, so with the network management device 100G, after a fault occurs at the current use system network connection device 111G', the path via the new current use system network connection device 111G' for which the hop count is the smallest value (=1) can be selected immediately.

As described above, with the fifth invention, the system is such that weighting is performed on the path information notified by RIP to the network management device from the redundant structure network connection device, and when there is a switch between the current use system and spare system, etc. between the abovementioned network connection devices, variable control for the abovementioned weighting is done with each network connection device for notification to the network management device, so it is possible to immediately reflect the appropriate path information between the network connection devices that accompanies the abovementioned switching, etc. for the RIP control function of the network management device, and thus it is possible to immediately select the path with the lowest cost for reaching the ring transmission line for the concerned network management device.

What is claimed is:

1. A communication network system that has multiple switching devices connected on a ring transmission line, including first and second ring networks that perform communication via the multiple switching devices;

first and second ring networks comprising:
first and second between-ring connection devices, within the first ring network, each connected with a facing one of first and second between-ring connection devices within the second ring network by a between-ring transmission line that includes a duplex line, each of the first and second between-ring connection devices having a between-ring communication means that performs, between facing ones of the between-ring connection devices, mutual communication of first control information, and performs line switching control with the other one of the first and second ring networks through the between-ring communication means so as to make one of the duplex between-ring transmission lines to be a current use system and other one to be a standby system; and a control device that performs switching control for operating one of the between-ring connection devices as the current use system, and the other one as the standby system, the control device having a ring internal communication means that performs, between the first and second between-ring connection devices, mutual communication of second control information;

wherein, between the first and second ring networks, current use communication is performed via the between-ring transmission line that connects the between-ring connection devices that operate as the current use system, and the between-ring transmission line that connects the between-ring connection devices that operate as the standby system is used as a standby line.

2. The communication network system according to claim 1, wherein the control device comprises a survival confirmation means that confirms survival of the between-ring connection device through the ring internal communication means between the current use system and the between-ring connection device, and when it is not possible to confirm survival of the between-ring connection device, sends instructions to shift to the spare system to the between-ring connection device of the current use system and sends instructions to shift to the current use system to the between-ring connection device of the spare system through the ring internal communication means.

3. The communication network system according to claim 1, wherein the between-ring connection device, when operating as a current use system, comprises an operation recognition means that recognizes the operating status of the facing between-ring connection device during operation of a between-ring connection device as the current use system through the between-ring communication means; and an error notification means that notifies the control device through the ring internal communication means that an error has occurred at the facing between-ring connection device when such an error occurs; and the control device sends to the spare system between-ring connection device instructions to shift to the current use system based on notification from the notification from the error notification means.

4. The communication network system according to claim 1, wherein the between-ring connection device, when operating as a current use system, comprises a monitoring means that monitors the line switching control performed between facing between-ring connection devices through the between-ring communication means; and a switching failure notification means that notifies the control device that the line switching control has failed through the ring internal communication means when such a failure has occurred; and the control device sends instructions to shift to the current use system based on the notification of the switching failure notification means to the spare system between-ring connection device through the ring internal communication means.

5. The communication network system according to claim 1, wherein the between-ring connection device comprises a current use system shift instruction means that, when starting operation as the current use system, sends instructions to shift to the current use system through the between-ring communication means to the facing between-ring connection device;

a spare system shift instruction means that, when starting operation as the spare system, sends instructions to shift to the spare system through the between-ring communication means to the facing between-ring connection device; and a control means that starts the switching operation from the spare system to the current use system or from the current use system to the spare system by receiving from the control device or the facing between-ring connection device either the current use system instructions or the spare system instructions.

6. The communication network system according to claim 1, wherein the ring internal communication means sends and receives the first control information using user cells which have information on the open paths in the ring (VPI/VCI values) on a virtual path in the ring transmission path, and including in the first control information at least the information including requests to shift to either the current use system or the spare system to the facing between-ring connection device, the current operating status of an associated one of the between-ring connection device, and the time stamp that is updated with each communication.

7. The communication network system according to claim 1, wherein the between-ring communication means sends and receives the second control information using user cells which have information on the open paths between rings (VPI/VCI values) on a virtual path in the between-ring transmission path, and includes in the second control information at least the information including requests from the control device to shift to either the current use system or the spare system to the between-ring connection device, and information on facing between-ring connection device errors from the between-ring connection device to the control device.

8. The communication network system according to claim 1, wherein the control device comprises a priority level maintenance means that maintains the system switch priority level relating to the system switching control; and a priority switching control means that performs the system switching control when there is a system switching request to the between-ring connection device within one of the first and second ring networks, there is also a system switching request in the control device in the other one of the first and second ring networks, and the system switching priority level of the control device in the one ring network is higher than the system switching priority level of the control device in the other ring network.

9. The communication network system according to claim 1, wherein the switching device, the first and second between-ring connection devices, and the control devices are ATM switching equipment that performs asynchronous transfer mode (ATM) switching processing.

10. A communication network system, wherein multiple switching devices are connected on a ring transmission line, and the system has a ring network that performs communication via those multiple switching devices;

first and second control devices that control the multiple switching devices are installed on the ring transmission line;

the first control device operates as a current use system control device that actually controls the multiple switching devices; and the second control device monitors the first control device, when a fault occurs with that first control device, operates as a standby system control device that performs control of the multiple switching devices in place of the first control device, establishes a virtual channel connection for those multiple switching devices along with start of control of the multiple switching devices in place of the first control device, and at the same time notifies those multiple switching devices that the control device has been switched.

11. The communication network system according to claim 10, wherein the second control device performs polling for the first control device at specified intervals, and based on whether there is a response from the first control device for the polling, monitors whether or not there is a fault in that first control device.

12. The communication network system according to claim 10, wherein the first control device sends updated management information to the second control device for each update of the management information for controlling the multiple switching devices; and the second control device keeps as the latest management information the received management information when the management information is received.

13. The communication network system according to claim 10, wherein the first control device and second control device are placed adjacent to each other, and the second control device starts control of the multiple switching devices in place of the first control device, while loop back of the ring transmission line is performed on the opposite side of the first control device, and when the adjacent device is the first control device when the notification is received by the switching device from the second control device, loop back of the ring transmission line is performed on the opposite side of this first adjacent device.

14. The communication network system according to claim 10, wherein the first control device and second control device are placed with at least one switching device between them, and when the adjacent device is the first control device when the notification is received by the switching device from the second control device, loop back of the ring transmission line is performed on the opposite side of this first adjacent device.

15. The communication network system according to claim 10, wherein the switching devices, the first control device, and the second control device are ATM switching equipment that performs asynchronous transfer mode (ATM) switching processing.

16. A communication network system comprising multiple switching devices connected on a transmission line and being composed from a network that performs communication via these multiple switching devices;

a first management device and a second management device that are connected to the network via one of the switching devices, each of which manages all switching devices within this network;

the first and second management devices comprising a self notification destination switching instruction means that issues self notification destination switching instructions to the switching devices saying to switch the notification destination of the self notification;

and the switching devices each comprising a self notification means that performs self notification of an operating status thereof only to the management device instructed as the self notification destination of the first and second management devices; and a self notification destination switching means that switches the self notification destination according to the self notification destination switching instructions issued from the first or second management device.

17. The communication network system according to claim 16, wherein the first and second management devices each comprise a control means that operates an associated one of the first and second management devices as a current use system or a standby system;

a fault monitoring means that monitors whether there is a fault on another one of the first and second management devices operating as the current use system during operation as the standby system; and when starting operation as the current use system due to occurrence of a fault with the other one of the first and second management devices, issues to all of the switching devices self notification destination switching instructions saying to switch the self notification destination to the associated device.

18. The communication network system according to claim 17, wherein the first and second management devices comprise a means of setting attribute information that indicates when operating as the current use system, and when operating as the current use system, also monitors whether there is a fault on the other management device operating as the current use system as well as the setting status of the attribute information, and issues the self notification destination switching instructions only when an error occurs in the concerned other management device and when the attribute information is set.

19. The communication network system according to claim 16, wherein the first and second management devices each comprise an input means that inputs identification information for the switching devices, and when the identification information is input, issues self notification destination switching instructions saying to switch the self notification destination to an associated one of the first and second devices only to the switching device which has this identification information.

20. The communication network system according to claim 16, wherein the switching devices comprise an end status monitoring means that monitors whether the self notification destination switching ended normally or not, and at least when an error occurs, sends to the management device that was the source of the issue of the self notification destination switching instructions an error end response that includes the reason for this error.

21. The communication network system according to claim 20, wherein the first and second management devices comprise an error end reporting means that reports when the error end response is received.

22. The communication network system according to claim 21, wherein the error end notification means is a display control means that displays a screen that displays the name of the switching device for which the error occurred and the reason for the error.

23. The communication network system according to claim 22, wherein the display control means comprises a function that displays re-execution instruction information for giving instructions to re-execute the self notification switching instructions on the display screen; and the self notification destination switching instruction means re-issues self notification destination switching instructions to the switching device corresponding to the name of the switching device displayed on the display screen by the re-execution instruction information being selected on the display screen.

24. A communication network system having multiple switching devices connected on a transmission line, and being composed from a network that performs communication via these multiple switching devices;

a management device that manages all the switching devices within the network; and first and second network connection devices that are placed on the transmission line and that have a function for connecting the management device to the network;

the first and second network connection devices each comprising a path information notification means that notifies path information for reaching the transmission line via an associated one of the first and second networks devices at the management device; and a path information variable setting means that manages by weighting the path information while also making variable settings for the weighting;

the management device comprising a path selection means that selects a path via the path information notification source that has the smallest weight, having referred to the path information weighting notified from the first and second network connection devices.

25. The communication network system according to claim 24, wherein the first and second network connection devices each comprise a control means that operates an associated one of the first and second network connection devices as a standby system when the other one of the devices is a current use system, and when the other one of the devices is the standby system, switches the associated device to the current use system and operates it, where the path information variable setting means makes a variable setting of the path information weighting during the system switching.

26. The communication network system according to claim 24, wherein the first and second network connection devices each comprise a control means that operates an associated one of the first and second network connection devices as the standby system when the other devices is the current use system, and when the other one of the devices is the standby system, switches the associated device to the current use system and operates it;

a fault monitoring means that, when operating as the spare use system, monitors for the presence of a fault in the other network device operating as the current use system; and wherein the path information variable setting means, when starting to operate as the current use system when a fault occurs in the other one of the network connection devices, variable sets the weighting of the path information.

27. The communication network system according to claim 25, wherein each the first and second network connection devices, when operating as the current use system, notifies path information with a hop count of N, and when operating as the standby system, notifies path information with a hop count of N+1, while on the other hand when the switched from the current use system to the standby system, notifies path information with the hop count changed from N to N+1, and when switched from the standby system to the current use system, notifies path information with the hop count changed from N+1 to N−1.

28. The communication network system according to claim 24, wherein the management device manages receiving of path information for each of the first and second network connection devices, and when new path information is notified, updates the old information with the contents of the newly notified information and keeps that.

29. The communication network system according to claim 24, wherein the first and second network connection devices execute notification of the path information regularly at timed intervals.

30. The communication network system according to claim 27, wherein each the first and second network connection devices, after notifying path information for which the hop count has been changed from N+1 to N−1 along with switching from the standby system to the current use system, after a specified time has elapsed, notifies path information for which the hop count has been changed from N−1 to N.

31. A communication network system comprising a network that connects multiple switching devices on a transmission line, and performs communication via these multiple switching devices; and a management device that manages all switching devices within the network, the management device being connected to the network;

the switching devices comprising a means of processing management to be done that generates management information required by the management device in order to manage the switching devices and independently notifies the management information using a specified protocol to the management device;

the management device comprising a management processing means that manages the management information obtained by a specified protocol that is notified from the means of processing management to be done; and a display processing means that performs display processing for a display means based on the management information managed by the management processing means.

32. The communication network system according to claim 31, wherein the means of processing management to be done holds fault management information relating to faults of an associated one of the switching devices as the management information, and when a fault occurs or is repaired for the associated device, makes self notification to the management device the fault management information relating to the fault occurrence or repair.

33. The communication network system according to claim 32, wherein the management processing means obtains fault management information self notified from the switching device while also correlating this fault management information with a device icon representing the switching device which was the source of sending the self notification and managing this, and the display processing means, based on the fault management information managed by the management processing means, displays the device icon that corresponds to the switching device that was the source of sending the self notification in a color that indicates that the concerned fault either occurred or was repaired.

34. The communication network system according to claim 31, wherein the means for processing management to be done holds structure and status management information relating to the structure of an associated one of the switching devices and the status of the structure as the management information, and transmits the structure/status management information to the management device according to a fetch request from the management device.

35. The communication network system according to claim 34, wherein the management processing means, by issuing the fetch request to the device to be managed, obtains the structure/status management information from the means for processing management to be done, and the display processing means, based on the obtained abovementioned structure/status management information, draws on the display means an actual device image of the same actual structure and status of the concerned switching device with the structure and status of the switching device that was the source of the fetching.

36. The communication network system according to claim 35, wherein the management control means regularly fetches the structure/status management information, and when there is a change in this fetched abovementioned structure/status management information, updates already fetched structure and status management information with those contents, and the display processing means, based on the updated abovementioned structure/status management information, the display means updates and displays the image currently being displayed.

37. The communication network system according to claim 34, wherein the structure/status management information includes at least the interface slot structure, the structure and operating status of the internal substrate connected to the interface slot, the power supply status, and alarm occurrence status for the switching device.

38. The communication network system according to claim 31, wherein the means of processing management to be done holds as the management information fault management information relating to faults in an associated one of the switching devices and structure/status management information relating to the structure of the associated device and status of the structure, and when a fault occurs or is repaired for the associated device, self notifies the fault management information relating to the occurrence or repair of a fault to the management device while also transmitting the structure/status management information to the management device according to a fetch request from the management device.

39. The communication network system according to claim 38, wherein the management processing means fetches the fault management information with self notification from the switching device, while also correlating and managing the fetched fault management information with a device icon corresponding to all switching devices subject to management; and the display processing means, based on the management means management results, displays the device icons that correspond to all switching devices in a form for which the connection structure of the concerned switching devices within the network is identifiable, and performs display processing on the display screen so that each of the device icons is shown in a color that reflects fault occurrence, fault repair, or normal status for the switching device corresponding to that icon.

40. The communication network system according to claim 39, wherein the management device comprises a first selection means that selects by a first operation the device icon displayed on the display screen; and the display processing means, when the device icon is selected by the first operation, detects fault management information corresponding to the selected device icon, and displays the contents of that fault management information as character information.

41. The communication network system according to claim 39, wherein the management device comprises a second selection means that selects by a second operation the device icon displayed on the display screen;

the management processing means, when the device icon is selected by the second operation, detects fault management information corresponding to the selected device icon, obtains the structure/status management information from the means for processing management to be done by issuing the fetch request to the applicable switching device; and the display processing means, based on the fetched abovementioned structure/status management information, draws on the display means an image of the actual device that is the same as the actual structure and status of the applicable switching device for the structure and status of the switching device of the source of fetching.

42. The communication network system according to claim 41, wherein the management device comprises a third selection means that selects the applicable structural element on the display screen of the actual device image; and the display processing means, when the structural element is selected by the third selection means, detects information corresponding to the structural element of the structure/status information, and based on this information displays a detailed structural image of the concerned structural element.

43. The communication network system according to claim 42, wherein the management device comprises an operation instruction input means that inputs specified operating instructions on the display screen of the detailed structural image; and the management processing means, according to the operating instructions input by the operation instruction input means, sends control signals for controlling the structural element to the means for processing management to be done of the applicable switching device.

44. The communication network system according to claim 43, wherein the means of processing management to be done, by receiving the control signals, executes a specified control according to the operating instructions on the structural element.

45. The communication network system according to claim 44, wherein the specified control is a control to start or stop operation of the structural element.

* * * * *

UNITED STATES PATENT AND TRADEMARK OFFICE
CERTIFICATE OF CORRECTION

PATENT NO. : 6,639,893 B1
DATED : October 28, 2003
INVENTOR(S) : Chikenji et al.

It is certified that error appears in the above-identified patent and that said Letters Patent is hereby corrected as shown below:

<u>Column 58,</u>
Line 63, "first and second ring" should read -- the first and second ring --.

<u>Column 63,</u>
Line 18, "networks devices" should read -- network connection devices --.
Line 42, "other devices" should read -- other one of the devices --.
Line 56, "each the" should read -- each of the --.
Lines 60-61, "when the switched" should read -- when switched --.

<u>Column 64,</u>
Line 10, "each the" should read -- each of the --.

Signed and Sealed this

Thirtieth Day of March, 2004

JON W. DUDAS
*Acting Director of the United States Patent and Trademark Office*